(12) United States Patent
Chen et al.

(10) Patent No.: US 6,978,016 B2
(45) Date of Patent: Dec. 20, 2005

(54) CIRCUITS FOR CALCULATING MODULAR MULTIPLICATIVE INVERSE

(75) Inventors: Chin-Long Chen, Fishkill, NY (US); Vincenzo Condorelli, Poughkeepsie, NY (US); Camil Fayad, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 09/740,245

(22) Filed: Dec. 19, 2000

(65) Prior Publication Data

US 2005/0185791 A1   Aug. 25, 2005

(51) Int. Cl.[7] .............................. G06F 7/52; H04L 9/30
(52) U.S. Cl. ........................ 380/28; 708/135; 708/209; 708/103; 380/30
(58) Field of Search ............................... 708/103, 135, 708/209; 380/28–30

(56) References Cited

U.S. PATENT DOCUMENTS

| | | | | |
|---|---|---|---|---|
| 5,321,752 A | | 6/1994 | Iwamura et al. | 380/24 |
| 5,448,639 A | * | 9/1995 | Arazi | 380/30 |
| 5,513,133 A | | 4/1996 | Cressel et al. | 364/754 |
| 5,764,554 A | | 6/1998 | Monier | 364/746 |
| 6,546,104 B1 | * | 4/2003 | Shimbo et al. | 380/28 |
| 2002/0059353 A1 | * | 5/2002 | Koc et al. | 708/491 |

OTHER PUBLICATIONS

Modular Multiplication Without Trial Division (Montgomery, Mathematics of Computation, vol. 44, No. 170, pp. 519-521, Apr. 1985).*

Kornerup, Peter, "A Systolic, Linear-Array Multiplier for a Class of Right-Shift Algorithms," IEEE Transacti ns on Computers, vol. 43, No. 8, Aug., 1994, pp. 892-898.
Montgomery, Peter, "Modular Multiplication Without Trial Division, " Mathematics of Computation, vol. 44, No. 170, Apr. 1985, pp 519-521.

* cited by examiner

Primary Examiner—Gilberto Barrón, Jr.
Assistant Examiner—Longbit Chai
(74) Attorney, Agent, or Firm—Lawrence D. Cutter

(57) ABSTRACT

The modular exponentiation function used in public key encryption and decryption systems is implemented in a standalone engine having at its core modular multiplication circuits which operate in two phases which share overlapping hardware structures. The partitioning of large arrays in the hardware structure, for multiplication and addition, into smaller structures results in a multiplier design which includes a series of nearly identical processing elements linked together in a chained fashion. As a result of the two-phase operation and the chaining together of partitioned processing elements, the overall structure is operable in a pipelined fashion to improve throughput and speed. The chained processing elements are constructed so as to provide a partitionable chain with separate parts for processing factors of the modulus. In this mode, the system is particularly useful for exploiting characteristics of the Chinese Remainder Theorem to perform rapid exponentiation operations. A checksum mechanism is also provided to insure accurate operation without impacting speed and without significantly increasing complexity. While the present disclosure is directed to a complex system which includes a number of features, the present application is particularly directed to the incorporation and integration of circuits used for calculating a modular multiplicative inverse used as an input parameter to the process.

3 Claims, 29 Drawing Sheets

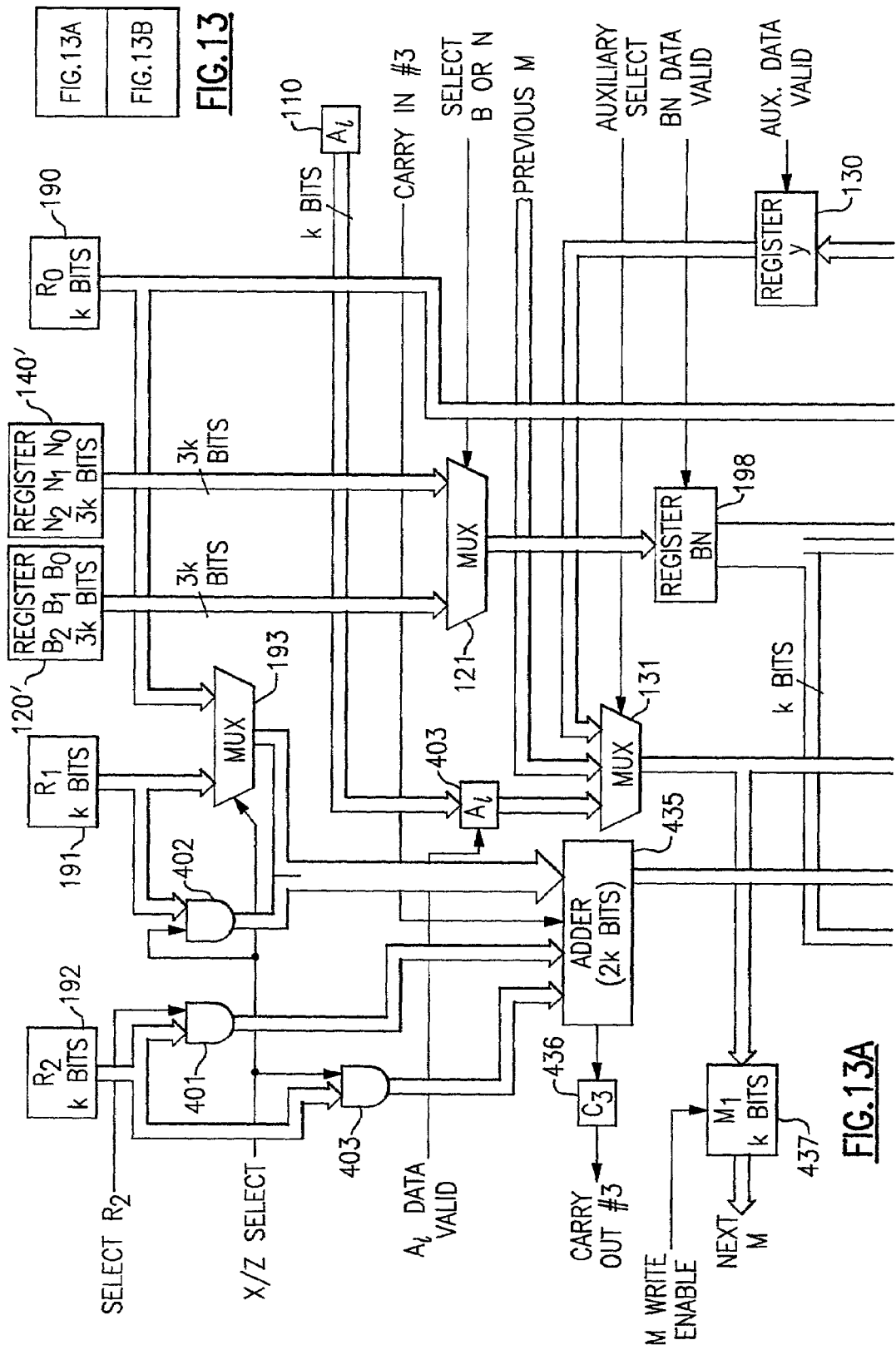

US 6,978,016 B2

CIRCUITS FOR CALCULATING MODULAR MULTIPLICATIVE INVERSE

BACKGROUND OF THE INVENTION

The present application is directed to a method and apparatus for performing encryption and decryption. The application discloses several inventions relating to an overall system for the use of exponentiation modulo N as a mechanism for carrying out the desired cryptological goals and functions in a rapid, efficient, accurate and reliable manner. A first part of the disclosure is related to the construction of a method and its associated apparatus for carrying out modular multiplication. A second part of the disclosure is directed to an improved apparatus for carrying out modular multiplication through the partitioning of the problem into more manageable pieces and thus results in the construction of individual identical (if so desired) Processing Elements. A third part of the disclosure is directed to the utilization of the resulting series of Processing Elements in a pipelined fashion for increased speed and throughput. A fourth part of the disclosure is directed to an apparatus and method for calculating a unique inverse operation that is desirable as an input step or stage to the modular multiplication operation. A fifth part of the disclosure is directed to the use of the modular multiplication system described herein in its originally intended function of performing an exponentiation operation. A sixth part of the disclosure is directed to the use of the Chinese Remainder Theorem in conjunction with the exponentiation operation. A seventh part of the this disclosure is directed to the construction and utilization of checksum circuitry which is employed to insure reliable and accurate operation of the entire system. The present application is particularly directed the invention described in the fourth part of the disclosure.

More particularly, the present invention is directed to circuits, systems and methods for multiplying two binary numbers having up to n bits each with the multiplication being modulo, N an odd number. In particular, the present invention partitions one of the factors into m blocks with k bits in each block with the natural constraint that $mk \geq n+2$. Even more particularly, the present invention is directed to multiplication modulo N when the factors being multiplied have a large number of bits. The present invention is also particularly directed to the use of the modular multiplication function hardware described herein in the calculation of a modular exponentiation function for use in cryptography. Ancillary functions, such as the calculation of a convenient inverse and a checksum mechanism for the entire apparatus are also provided herein. The partitioning employed herein also results in the construction of Processing Elements which can be cascaded to provide significant expansion capabilities for larger values of N. This, in turn, leads to a modality of Processor Element use in a pipelined fashion. The cascade of Processor Elements is also advantageously controllable so as to effectively partition the Processor Element chain into separate pieces which independently work on distinct and separate factors of N.

Those wishing an optimal understanding from this disclosure should appreciate at the outset that the purpose of the methods and circuits shown herein is the performance of certain arithmetic functions needed in modern cryptography and that these operations are not standard multiplication, inversion and/or exponentiation, but rather are modulo N operations. The fact that the present application is directed to modular arithmetic circuits and methods, as opposed to standard arithmetic operations, is a fact which would be best to keep firmly in mind, particularly since modular arithmetic, with it implied division operations, is much more difficult to perform and to calculate, particularly where exponentiation modulo N is involved.

In a preferred system for implementation which takes advantage of certain aspects of the present invention, this application is also directed to a circuit and method of practice in which an adder array and a multiplier array are effectively partitioned into in a series of nearly identical processor elements with each processor element (PE) in the series operating on a sub-block of data. The multiplier array and adder array are thus partitioned. Thus, having recognized the ability to reconfigure the generic structure into a plurality of serially connected processor elements, the present invention is also directed to a method of operation in which each processor element operates as part of a pipeline over a plurality of operational cycles. The pipelining mode of operation is even further extended to the multiplication of a series of numbers in a fashion in which all of the processor elements are continuously actively generating results.

The multiplication of binary numbers module N is an important operation in modern, public-key cryptography. The security of any cryptographic system which is based upon the multiplication and subsequent factoring of large integers is directly related to the size of the numbers employed, that is, the number of bits or digits in the number. For example, each of the two multiplying factors may have up to 1,024 bits. However, for cryptographic purposes, it is necessary to carry out this multiplication modulo a number N. Accordingly, it should be understood that the multiplication considered herein multiplies two n bit numbers to produce a result with n bits or less rather than the usual 2n bits in conventional multiplication.

However, even though there is a desire for inclusion of a large number of bits in each factor, the speed of calculation becomes significantly slower as the number of digits or bits increase. However, for real-time cryptographic purposes, speed of encryption and decryption are important concerns. In particular, real-time cryptographic processing is a desirable result.

Different methods have been proposed for carrying out modular multiplication. In particular, in an article appearing in "The Mathematics of Computation," Vol. 44, No. 170, April 1985, pp. 519–521, Peter L. Montgomery describes an algorithm for "Modular Multiplication without Trial Division." However, this article describes operations that are impractical to implement in hardware for a large value of N. Furthermore, the method described by Montgomery operates only in a single phase. In contrast, the system and method presented herein partitions operational cycles into two phases. From a hardware perspective, the partitioning provides a mechanism for hardware sharing which provides significant advantages.

SUMMARY OF THE INVENTION

In accordance with a preferred embodiment of the present invention, an initial zero value is stored in a result register $Z_0$. The integers A and B which are to be multiplied using the present process are partitioned into m blocks with k bits in each block. The multiplication is carried out modulo N. Additionally, the value R is set equal to $2^k$. In this way, the integer A is representable as $A = A_{m-1}R^{m-1} + \ldots + A_2R^2 + A_1R + A_0$. This is the partitioning of the integer A into m blocks.

In one embodiment of the present invention, a method and circuit are shown for computing a function $Z = f(A, B) = AB$ $2^{-mk}$ mod N. Later, it will be shown how this function is used to calculate AB mod N itself.

The system, methods, and circuits of the present invention are best understood in the context of the underlying algorithm employed. Furthermore, for purposes of understanding this algorithm, it is noted that modular computation is carried out modulo N, which is an odd number and n is the number of bits in the binary representation of N. Additionally, $N_0$ represents the least significant k bits of N. Also, a constant s is employed which is equal to $-1/N_0$ mod R=1/$(R-N_0)$ mod R. With this convention, the algorithm is expressed in pseudo code as follows:

$Z_0=0$
  for i=0 to m−1
    $X_I=Z_I+A_IB$
    $y_I=S\,X_{I,0}$ mod R ($x_{I,0}$ is the least significant k bits of $X_I$)
    $Z_{1+I}=(X_I+y_IN)/R$
end.

There are two items to note in particular about this method for carrying out modulo N multiplication. The first thing to note is that the multiplication is based upon a partitioning of one of the factors into sub-blocks with k bits in each block. This greatly simplifies the size of multiplier arrays which need to be constructed. It furthermore creates a significant degree of parallelism which permits the multiplication operation be carried out in a much shorter period of time. The second item to note is that the partitioning also results in the splitting of the process not only into a plurality of m cycles, but also, splits the method into two phases that occur in each cycle. In the first phase (X-phase), the values $X_I$ and $y_I$ are computed. In the second phase (Z-phase), the intermediate result value $Z_{1+I}$, is calculated. It should be noted that, in the calculation of $X_I$ and in the calculation of $Z_{1+I}$, there is an addition operation and a multiplication operation. This fact allows the same hardware which performs the multiplication and addition in each of these steps to be shared rather than duplicated. With respect to the division by R in the formation of $Z_{1+I}$, it is noted that this is accomplishable by simply discarding the low order k bits. Other advantages of this structure will also become apparent.

The output of the above hardware and method produces the product AB $2^{-mk}$ mod N. To produce the more desirable result AB mod N, the method and circuit employed above is used a second time. In particular, the original output from this circuit is supplied to one of its input registers with the other register containing the factor $2^{2mk}$ mod N. This factor eliminates the first factor of $2^{-mk}$ added during the first calculation and also cancels the additional factor of $2^{-mk}$ included when the circuit is run the second time. This produces the result AB mod N.

For those who wish to practice the processes of the present invention via software, it is noted that the algorithm for multiplication provided above is readily implementable in any standard procedure-based programming language with the resulting code, in either source or object form, being readily storable on any convenient storage medium, including, but certainly not limited to, magnetic or optical disks. This process is also eminently exploitable along with the use of the exponentiation processes described below, including processes for exponentiation based on the Chinese Remainder Theorem.

In the process described above it is noted that one of the process inputs is the variable "s". This value is calculated as a negative inverse modulo R. In order to facilitate the generation of this input signal, a special circuit for its generation is described herein. This circuit also takes advantage of existing hardware used in other parts of a processing element. In particular, it forms a part of the rightmost processor element in a chain.

Note that, in the calculation shown above for $X_I$ and $Z_I$, these are more than n bit numbers. Accordingly, the multiplication and addition operations are carried out in relatively large circuits which are referred to herein as multiplier and adder arrays. In accordance with a preferred method of practicing the present invention, the adder array and multiplier array are split into sub-blocks. While this partitioning of hardware may be done using any convenient number of blocks, partitioning into blocks capable of processing k bits at a time is convenient. Thus, in the preferred embodiment, instead of employing one large multiplier array for processing two numbers having n+l bits and k bits; with n being much greater than k, a plurality of separate k bit by k bit multipliers are employed. Additionally, it is noted that partitioning into processor element sub-blocks, while useful in and of itself particularly for circuit layout efficiency, also ultimately makes it possible to operate the circuit in several pipelined modes.

In a first pipelined mode, the circuit is operated through a plurality of cycles, m, in which adjacent processor elements are operated in alternate phases. That is, in a first pipelined mode, if a processor element is in the X-phase, its immediate neighbors are operating in the Z-phase, and vice versa. In a second pipelined mode, the pipelined operation is continued but with new entries in the input registers (A and B) which now are also preferably partitioned in the same manner as the multiplier and adder arrays.

Since n is generally much greater than k (1,024 as compared to 32, for example) and since carry propagation through adder stages can contribute significantly to processing delays, the partitioning and pipelining together eliminate this source of circuit delay and the corresponding dependence of circuit operation times on the significant parameter n whose size, in cryptographic contexts, determines the difficulty of unwarranted code deciphering.

The pipelined circuit of the present invention is also particularly useful in carrying out exponentiation modulo N, an operation that is also very useful in cryptographic applications. Such an operation involves repeated multiplication operations. Accordingly, even though pipelining may introduce an initial delay, significant improvements in performance of exponentiation operations are produced.

In one embodiment found within the disclosure herein it has been noted that the chaining together of individually operating Processing Elements introduces an addition operation in a critical timing path, that is, into a path whose delayed execution delays the whole process. The present invention provides an improvement in the design of the individual Processing Elements through the placement of this addition operation in an earlier portion of the Processing Element's operation. In doing so, however, new control signals are also provided to make up for the fact that some signals in some of the Processing Elements are not yet available at this earlier stage and accordingly are, where convenient, provided from operations occurring or which have already occurred in adjacent Processing Elements.

The Processing Elements used herein are also specifically designed so that they may function in different capacities. In particular, it is noted that the rightmost Processing Element performs some operations that are unique to its position as the lower order Processing Element in the chain. Likewise the leftmost element has a unique role and can assume a simpler form. However, the Processing Elements employed herein are also specially designed and constructed so as to be able to adapt to different roles in the chain. In particular, the middle Processing Element is controllable so that it takes on the functional and operational characteristics of a rightmost Processing Element. In this way the entire chain is partitionable so that it forms two (or more, if needed) separate and independent chains operating (in preferred modalities) on factors of the large odd integer N.

While an intermediate object of the present invention is the construction of a modular multiplication engine, a more final goal is providing an apparatus for modular exponentiation. In the present invention this is carried out using the disclosed modular multiplier in a repeated fashion based on the binary representation of the exponent. A further improvement on this process involves use of the Chinese Remainder Theorem for those parts of the exponentiation operation in which the factors of N are known. The capability of the Processing Element chain of the present invention to be partitioned into two portions is particularly useful here since each portion of the controllably partitioned chain is able to work on each of the factors of N in an independent and parallel manner.

Since one wishes to operate computational circuits at as high a speed as possible and since this can some times lead to erroneous operations, there is provided a challenge in how to detect errors when the operations being performed are not based on standard arithmetic, but are rather based on modular arithmetic (addition, subtraction, inversion and multiplication and exponentiation). However, the present invention solves this problem through the use of circuits and methods which are not only consonant with the complicating requirements of modular arithmetic operations but which are also capable of being generated on the fly with the addition of only a very small amount of additional hardware and with no penalty in time of execution or throughput.

Accordingly, it is seen that it is an object of the present invention to produce a multiplier for multiplying two large integers modulo N.

It is yet another object of the present invention to improve the performance and capabilities of cryptographic circuits and systems.

It is a still further object of the present invention to create a multiplier circuit which operates at high speed.

It is yet another object of the present invention to create a multiplier circuit which performs multiplication modulo N without having to perform division operations.

It is also an object of the present invention to provide a multiplier which is scaleable for various values of N and n.

It is also another object of the present invention to provide a method for computing a product of two integers modulo N in a multi-phase process which permits sharing of hardware circuitry across the two phases.

It is yet another object of the present invention to provide a system and method in which the factors are partitioned into a plurality of m sub-blocks with each sub-block having k bits, whereby values for m and k are selectable so as to provide additional flexibility in hardware structure.

It is also another object of the present invention to increase the speed of multiplication calculations in cryptographic processes.

It is also an object of the present invention to provide an implementation for a multiplier circuit which uses macro components as building blocks so as to avoid the costs associated with custom design.

It is also an object of the present invention to provide a design which is flexible and scaleable.

It is also an object of the present invention to provide a word-oriented, as opposed to a bit-oriented, multiplication system and circuit.

It is a still further object of the present invention to construct a circuit for multiplication modulo N which comprises a plurality of nearly identical processor elements.

It is yet another object of the present invention to partition the multiplication of an n bit number into a plurality of pieces for quasi-independent calculation.

It is still another object of the present invention to operate the circuit herein in a pipelined mode.

It is an even further object of the present invention to operate the circuit herein so as to process sequences of distinct operands (factors) in a pipelined mode.

It is yet another object of the present invention to improve the performance of a sequence of chained Processing Elements by removing addition functions from critical paths.

It is a still further object of the present invention to operate the circuit herein so as to process sequences of identical or repeated operands in a pipelined mode, as for example, in the calculation of the exponential function modulo N.

It is yet another object of the present invention to increase the speed of exponentiation operations in cryptographic processes.

It is a still further object of the present invention to provide Processing Elements whose character as beginning, middle or end units in the chain may be controlled so as to enable the partitioning of the chain into a plurality of sub-chains each of which is capable of independent parallel processing based on a factor of N.

It is also an object of the present invention to provide a mechanism for calculating an inverse operation which is useful as an input to the method of modular multiplication employed herein.

It is yet another object of the present innovation to provide an apparatus and method for generating useful checksums which are useful for indicating that the system has operated in a proper fashion and has produced no errors.

It is a still further object of the present invention to provide a checksum circuit and method which is consonant with modular arithmetic.

It is also an object of the present invention to provide an engine which is capable of data encryption through the use of exponentiation modulo N, a large prime or the product of two large primes.

It is a further object of the present invention to provide an engine which is capable of data decryption through the use of exponentiation modulo N.

It is yet another object of the present invention to employ the Chinese Remainder Theorem to facilitate the exponentiation operation modulo N when factors for N are known.

It is also an object of the present invention to provide an encryption/decryption engine which is capable of operating in the mode of public key cryptographic systems.

It is also an object of the present invention to provide an engine which is capable of generating and receiving documents having coded digital signatures.

It is also an object of the present invention to provide an engine which is capable of generating keys to be exchanged between any two users for data encryption and decryption.

It is also an object of the present invention to produce a high-speed, high-performance cryptographic engine.

Lastly, but not limited hereto, it is an object of the present invention to provide a cryptographic engine for encryption and for decryption which can be included as part of a larger processing system and therefore possesses communication capabilities for the transfer of data and command information from other parts of a larger scale data processing system with which the present engine is coupled.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
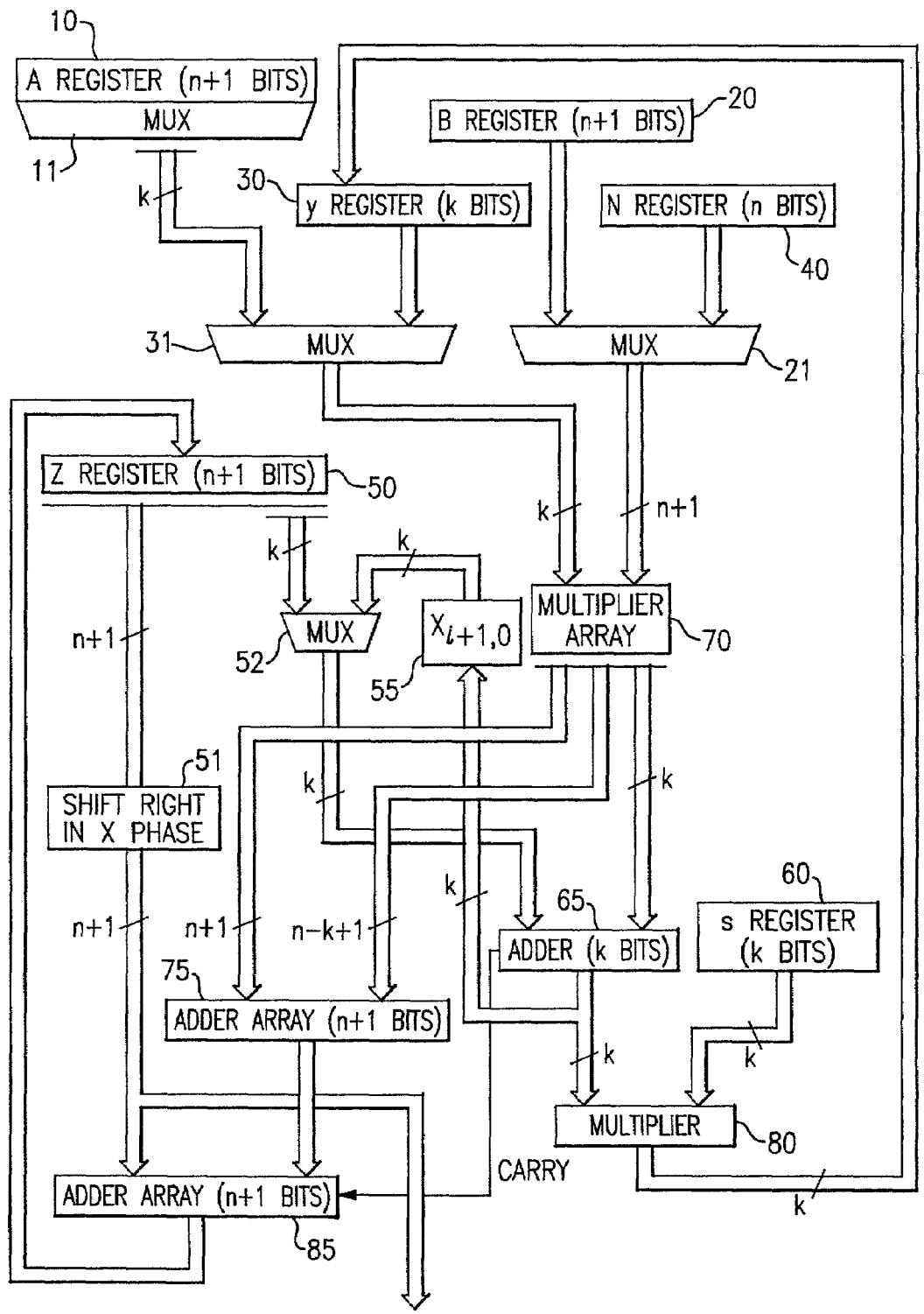
FIG. 1 is a block diagram illustrating the circuits employed in the method and system for multiplication modulo N described herein.

The structure and operation of the present invention is dependent upon the partitioning of one of the multiplying factors into a plurality of k bit-wide pieces. Thus, instead of representing a binary number A as $$\sum_{i=0}^{n-1} a_i 2^i,$$

one of the multiplying factors in the present invention is represented instead in the form $$A_{m-1}R^{m-1} + \ldots + A_2R^2 + A_1R + A_0 = \sum_{j=0}^{m-1} A_j R^j,$$

where $R=2^k$. In this representation, the number A is represented in block form where each of the m blocks includes k bits. That is, each $A_j$ represents an integer having k bits.

In the present system, multiplication modulo an odd number N is a significant object. Also, for purposes of understanding the present invention, the symbol n is used to denote the number of bits in the binary representation for N. Also, for present purposes, it is assumed that the number A, as stored in Register A (reference numeral 10 in FIG. 1), is the number that is partitioned into m blocks. In general, the number of blocks m is selected to be the smallest integer for which $mk \geq n+2$. Additionally, it is understood that $N_0$ represents the least significant k bits of the number N. Likewise, the constant s is equal to the negative reciprocal of $N_0$ taken modulo R (that is, $-1/N_0$ mod R).

From a mathematical point of view, the present applicants have employed an algorithm for which the input variables are the two numbers being multiplied, namely, A and B, the modulo number N, the constant s associated with N, and the parameters m, k and $R=2^k$. The output of the function provided by the present invention Z is given by $Z=f(A, B)=AB\ 2^{-mk}$ mod N. The procedure specified by applicants' method initializes the value $Z_0$ to be zero and, for the integer i ranging from 0 to m−1, calculations are carried out to produce $X_I$ and $y_I$ and $Z_{1+I}$. The values for $X_I$ and $y_I$ are computed during a first operational phase of each one of m cycles. The value $Z_I$ is computed during a second phase of each cycle. The adders and multipliers used to calculate $X_I$ are "time shared" to also carry out the calculation needed to produce $Z_I$. In particular, at each stage i, $X_I$ is given by $Z_I + A_I B$. At this stage, the value of $y_I$ is also computed as the constant s times the least significant k bits of $X_I$ modulo R. If one represents the least significant k bits of $X_i$ as $X_{I,0}$ then $y_I = s\ x_{I,0}$. This completes the operations that are carried out in a first phase (X-phase) during one of the cycles of the present process. In the second phase (Z-phase), an updated value for Z register (50 in FIG. 1) is computed as $(X_I + y_I N)/R$. At the last stage of processing, the desired value of Z is present in the Z register. In particular, at this stage, $Z_m = AB\ 2^{-mk}$ mod N. At each stage (cycle), values for $X_I$, $y_I$, and $Z_I$ are stored for purposes of computation in subsequent steps.

It is noted that if both input variables A and B have n+1 bits, the output of the function provided by the present invention $Z=f(A, B)=AB\ 2^{-mk}$ mod N, for N being an n-bit odd number, has no more than n+1 significant bits. That is, the output is less than $2^{n+1}$. The hardware circuit described herein takes as inputs A and B of n+1 bits each and generates as output Z of n+1 bits.

A hardware circuit for carrying out this process is illustrated in FIG. 1. In particular, the factor A of n+1 bits, which is the factor which is treated as being in partitioned form, is stored in A register (10). Multiplexor 11 supplies sequential blocks of k bits from register 10 to multiplexor 31, with k=32 bits for illustration. Multiplexors 31, 21, and 52 operate in conjunction with one another selecting one of two possible input values depending upon whether or not the circuit is operating in the X-phase or the Z-phase. Accordingly, during the first phase of its operation, multiplexor 11 provides the k bits in $A_0$. In the first phase of the second cycle, the next k bits $A_I$ in A are supplied via multiplexor 11. A sub-block of k bits from A is provided during the initial or X phase portion of each cycle. In the third cycle, multiplexor 11, therefore, provides the next k bits in A, namely, the bits denoted above and herein as $A_2$. Accordingly, multiplexor 11 is seen to operate selectively as a function of the cycle number (namely, cycles 0 through m−1).

During the X-phase of each cycle, the value $A_I$ is selected from the A Register (10) via multiplexor 11 and correspondingly multiplexor 21 selects the contents of the B Register (20). Thus, in accordance with the present invention, the numbers to be multiplied are stored in registers 10 and 20. It does not matter which number is stored in which register.

It is also noted that, whether or not the circuit is operating in the initial X-phase or in the final Z-phase in each cycle, multiplexors 31 and 21 supply k bits and n+1 bits, respectively, to multiplier array 70 in each phase. It is thus seen that, during the X-phase, multiplexors 31 and 21 select contents from the B register and part of the A register. It is also noted that, in typical situations, the value of n is often around 512 or more and the value of k is approximately 32. Accordingly, it is seen that multiplier array 70 strikes a balance between 1 bit×n bit multiplication and full n bit×n bit multiplication. It is also noted that increases in the value of n are almost always, in practice, an increase by a factor of at least a power of 2.

As with any binary multiplier with inputs that are n+1 bits wide and k bits wide respectively, multiplier array 70 produces an output which is n+1+k bits wide. The lower order k bits from multiplier array 70 are supplied to adder 65 which is designed to add two k bit addends at a time. In this regard, it is noted that adder 65 is present in the circuit for computing $y_I$. As such, and given that the value of $y_I$ is dependent upon the last k bits of the value $X_I$ which is a sum which has not yet been fully computed, it is necessary to perform this addition which is essentially the addition for the low order k bits of $X_I$. The first addend comes from the rightmost k bits in the Z register as selected by multiplexor 52. These bits are added to the k bits in the rightmost portion of the product $A_I B$. The output of adder 65 is $x_{I,0}$ which is the least significant k bits of $X_I = Z_I + A_I B$. This output is stored in register 55 and is also supplied to multiplier 80 which multiplies two k bit numbers together. This is not, however, a multiplication modulo N. The other factor supplied to multiplier 80 is the number s from the s register (60). Since this result is required modulo R, only the rightmost k bits from multiplier 80 are supplied back to the y register (30) in this X-phase. The value stored in this register is used during the calculation carried out in the Z-phase as discussed below.

The rest of the X-phase calculation is devoted to calculation of the high order n+1 bits of the sum $Z_I + A_I B$. Multiplier 70 is configured as a circuit for multiplying together the bits from the B Register (20) and a sequence of m blocks of k bits each from selected k bit blocks A, from the A register. Multiplication of two k bit numbers generally produces a number having 2k bits and, in particular, this is the situation with respect to applicants' multiplier 80. However, it is noted that the calculation of y, is computed modulo R. The modulo requirement of the computation is easily accomplished simply by returning only the rightmost k bits from the output of multiplier 80 to the input of they Register (30).

As pointed out above, multiplication of numbers generally produces outputs having bit lengths greater than either of the two input number bit lengths. In particular, with respect to multiplier 70, the output is considered to be n+1+k bits in length. The low order (rightmost) k bit output is supplied from multiplier 70 to adder 65. However, each k bit block multiplication carried out in multiplier array 70 produces 2k bits formed as a k bit "result" and a k bit "carry" into the next position. The summation to produce the desired intermediate output $A_I$ is carried out in adder 75 which adds together two portions, the first portion which is n+1 bits long and the second portion which is only n+1−k bits long. The n+1−k bits represent the "carry" portion of the multiplication. Accordingly, the output of adder array 75 is the result of the high order n+1 bits of $A_I B$. This result is supplied directly to adder array 85 which adds to it a shifted value of $Z_I$ from Z register 50. And appropriately, this high order n+1 bits of $X_I=Z_I+A_IB$ is stored in Z register 50 in preparation for the Z-phase calculation. The low order k bits of $X_I$ are stored in register 55 as described above.

In the Z-phase of an operation cycle, multiplier array 70 and adders 75 and 85 are again employed except that now the inputs to multiplier array 70 are the contents of the y Register (30) as selected by multiplexor 31. The other factor supplied to multiplier array 70 is the contents of the N register (40) which is selected during the Z-phase of an operation cycle by means of multiplexor 21. As before, multiplier array 70 computes the product of an n+1 bit number and a k bit number. Adder array 75 performs the natural addition operation associated with multiplication in which there is an effective carry-like operation from one k bit subfield to the next k bit subfield. Accordingly, the output of adder array 75 during the Z-phase of operation is the high order n+1 bits of the product $y_IN$. The addition of $y_IN$ and the value $X_I$ together with its division by R in the present method is accomplished by discarding the low order k bits from the output of adder 65 and storing only the high order n+1 bits from adder 85 to register 50.

Figure 2:
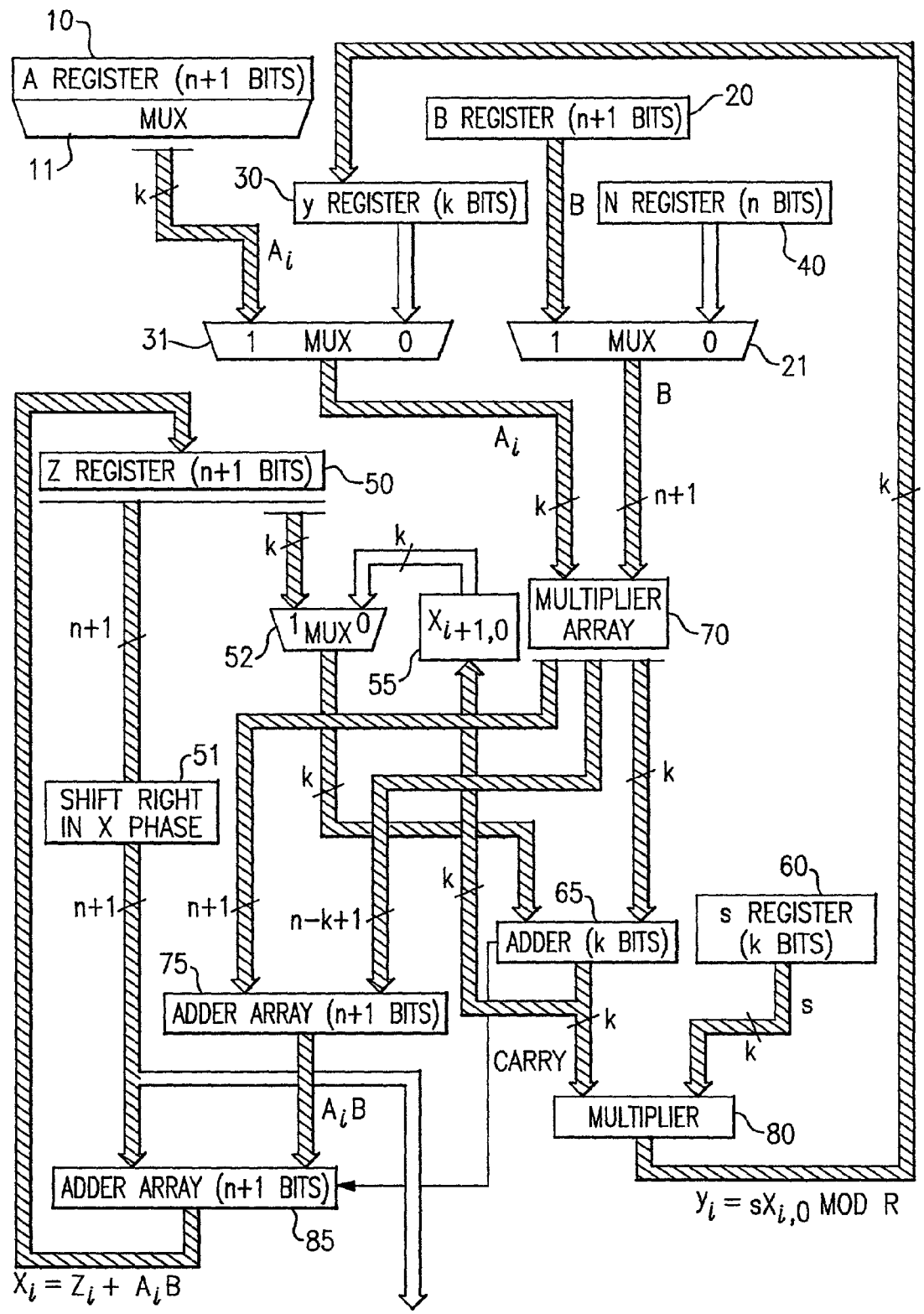
FIG. 2 is a block diagram identical to FIG. 1 except more particularly showing those data flow paths which are active during a first or X-phase of calculation.
Figure 3:
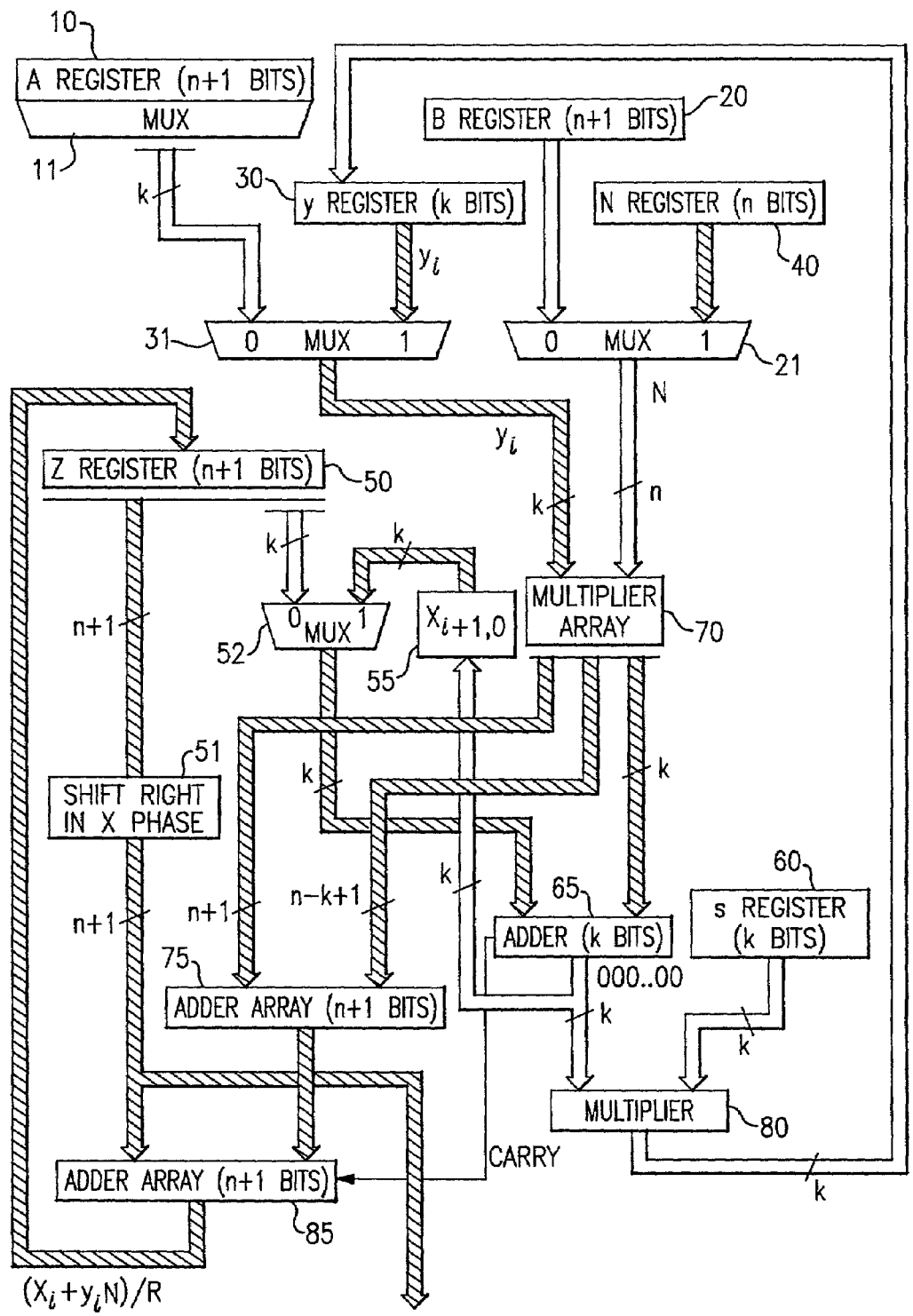
FIG. 3 is a block diagram similar to FIGS. 1 and 2 except more particularly showing those data flow paths which are active during the second or Z-phase of calculation.

The differences in the X-phases and Z-phases of operation are more fully appreciated from an inspection of the differences between FIGS. 2 and 3. In particular, FIG. 2 illustrates the active data flow paths that are present in the first or X phase of each operational cycle. Likewise, FIG. 3 illustrates the data flow paths which are active during the second or a Z-phase of each operational cycle. The calculations that are carried out in the X-phases and Z-phases are repeated a total of m times with the final result $Z_m$ being one of the desired results at the end of m cycles of operation with each cycle including an X-phase and a Z-phase. At this stage of operation, the value present in Z register 50 is AB $2^{-mk}$ mod N.

The circuit illustrated in FIGS. 1–3 is also capable of producing the multiplicative result AB mod N. This is accomplished by first using the circuit shown to compute AB $2^{-mk}$ mod N and then by using the circuit again with either the A or B register being provided with the output from the first operational stage and multiplying this value by $2^{2mk}$ mod N. Since each operation of the circuit (through m cycles) introduces the factor of $2^{-mk}$, the multiplication by $2^{2mk}$ cancels the first factor $2^{-mk}$ introduced during the first stage of operation of the circuit and also cancels the other factor of $2^{-mk}$ introduced during the second multiplicative stage of operation. Thus, using two passes (two stages) with m cycles each through the circuit of FIGS. 1–3, the result AB mod N is computed. For purposes of clarity and ease of understanding and description as used herein, an operational stage of the process of the present invention refers to m cycles of circuit operation following the loading of the factors into the A and B registers.

The operation of the above circuit is perhaps more easily understood by means of the following example in which k=3, $R=2^3$, $N=107=R^2+5R+3=(1, 5, 3)$ $(N_2, N_1, N_0)$, $N_0 = 3$, m=3, $s=-1/N_0$ mod R=5, $A=83=R^2+2R+3=(1, 2, 3)$, $B=70=R^2+0R+6=(1, 0, 6)$. Decimal digits are employed here merely for the sake of example and for an easier understanding of the process. For a more detailed illustration, the decimal numbers may be represented as blocks containing 3 bits each. The process carried out by the circuit disclosed above occurs in three steps as follows (i=0, i=1, and i=2):

Step 1.
$X_0=Z_0+A_0B=(3, 2, 2)$, $y_0=2s$ mod R=2
$y_0N=(2, 10, 6)=(3, 2, 6)$
$X_0+y_0N=(6, 5, 0)$ $Z_I=(X_0+y_0N)/R=(0, 6, 5)$
Step 2.
$A_IB=(2,0,12)=(2, 1, 4)$
$X_I=Z_I+A_IB=(3, 0, 1)$, $y_I s=5$
$y_IN=(5, 25, 15)=(1, 0, 2, 7)$
$X_I+y_IN=(1, 3, 3, 0)$
$Z_2=(1, 3, 3)$
Step 3.
$A_2B==(1, 0, 6)$
$X_2=Z_2+A_2B=(2, 4, 1)$, $y_I=s=5$
$y_2N=(5, 25, 15)=(1, 0, 2, 7)$
$X_2+y_2N=(1, 2, 7, 0)$
$Z_3=(1, 2, 7)87$
$87 \times R^3 = A \times B$ mod N=32.

Although it is the objective to compute AB mod N where AB and N are all n bits long, for convenience, the process herein employs A, B, and Z registers that are n+1 bits or mk bits long. This avoids the necessity for checking the final and intermediate results to determine whether or not they are in fact greater than N. This aspect, for example, shows up in Step 2 in the example provided above.

Figure 4:
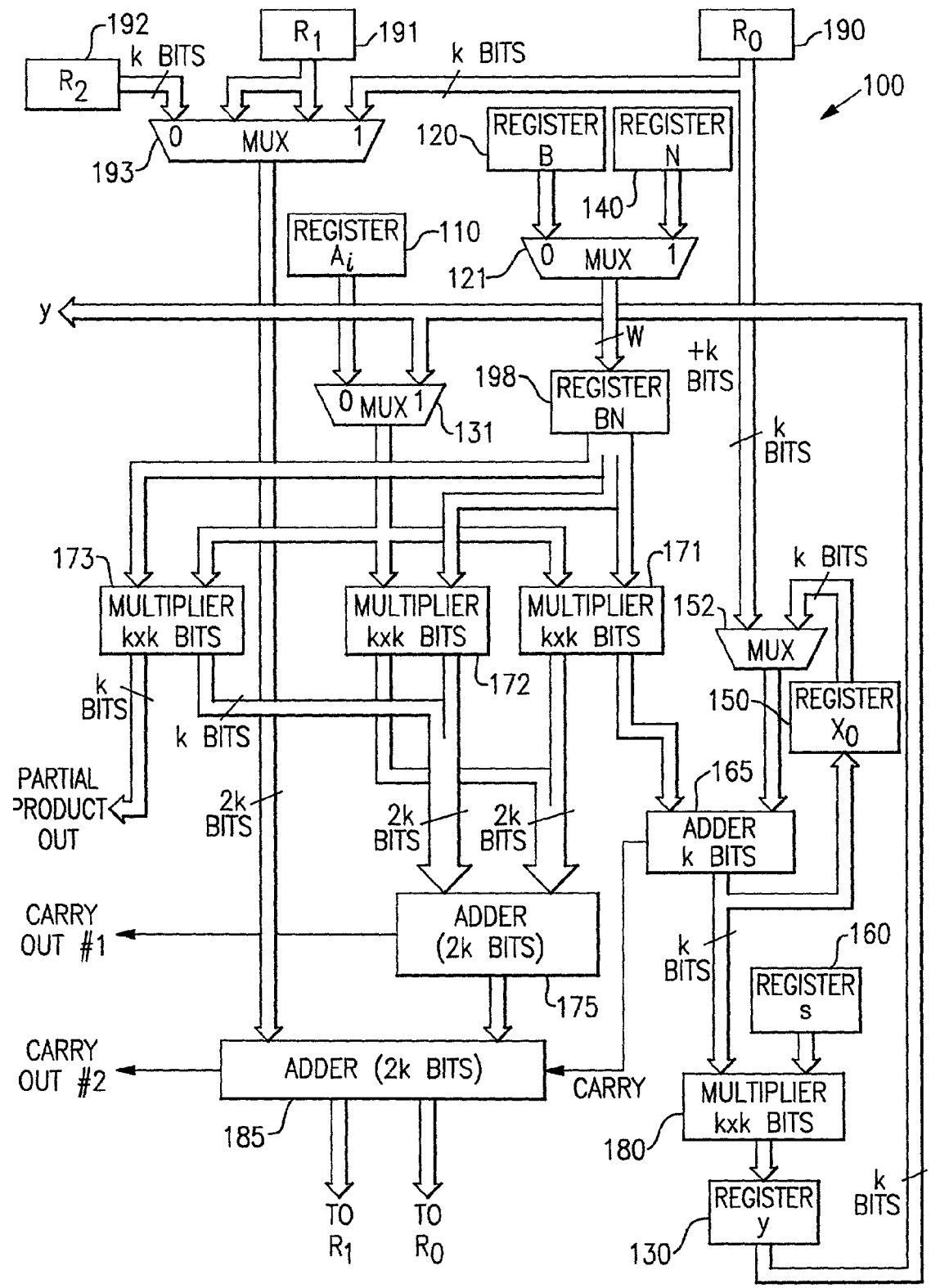
FIG. 4 is a block diagram of the rightmost processing element in a series of processing elements in a partitioned embodiment of the circuit of FIG. 1.
Figure 5:
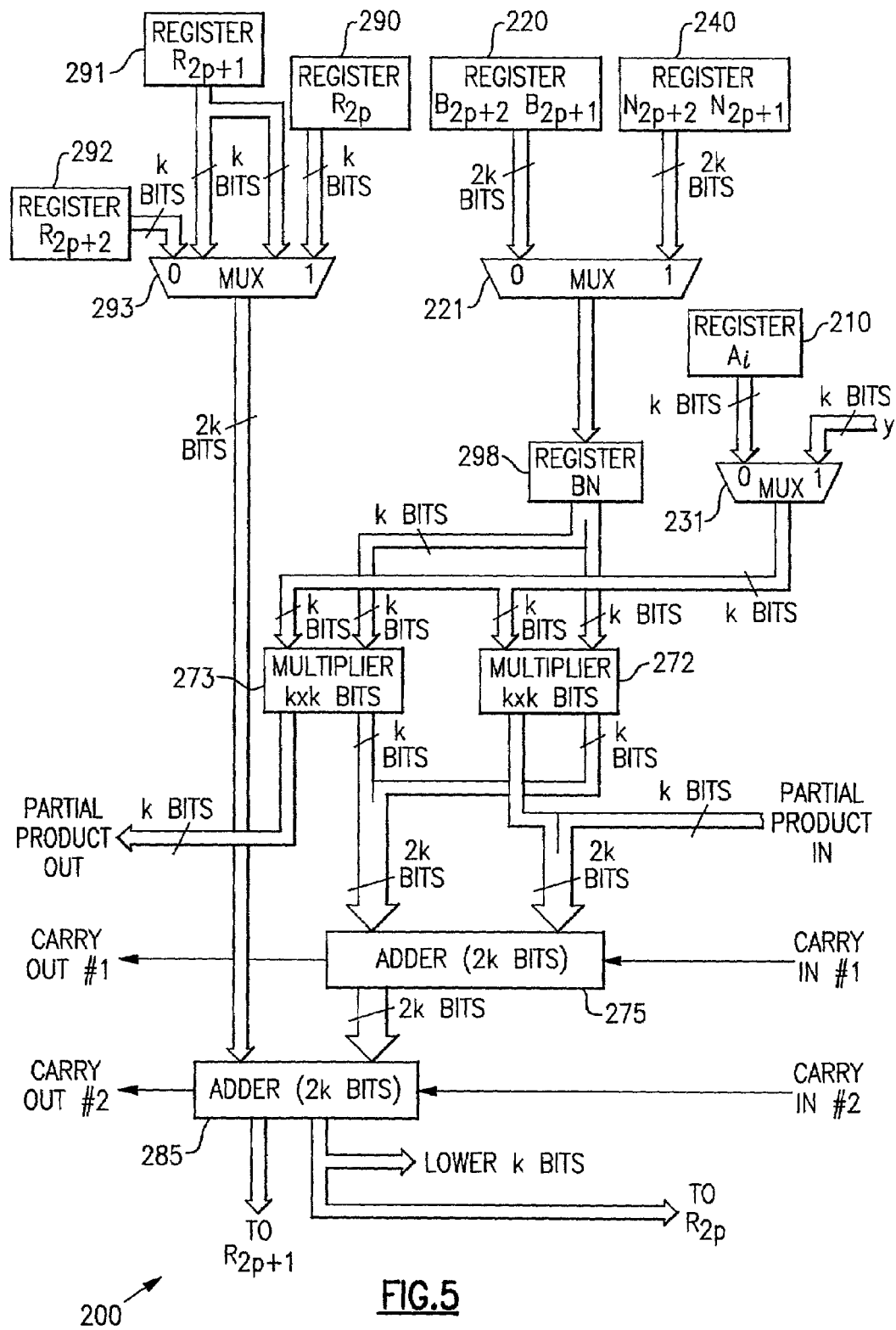
FIG. 5 is a block diagram illustrating one of a plurality of identical processing elements which are configurable as a series of processor elements capable of performing the same operation as the circuit shown in FIG. 1.
Figure 6:
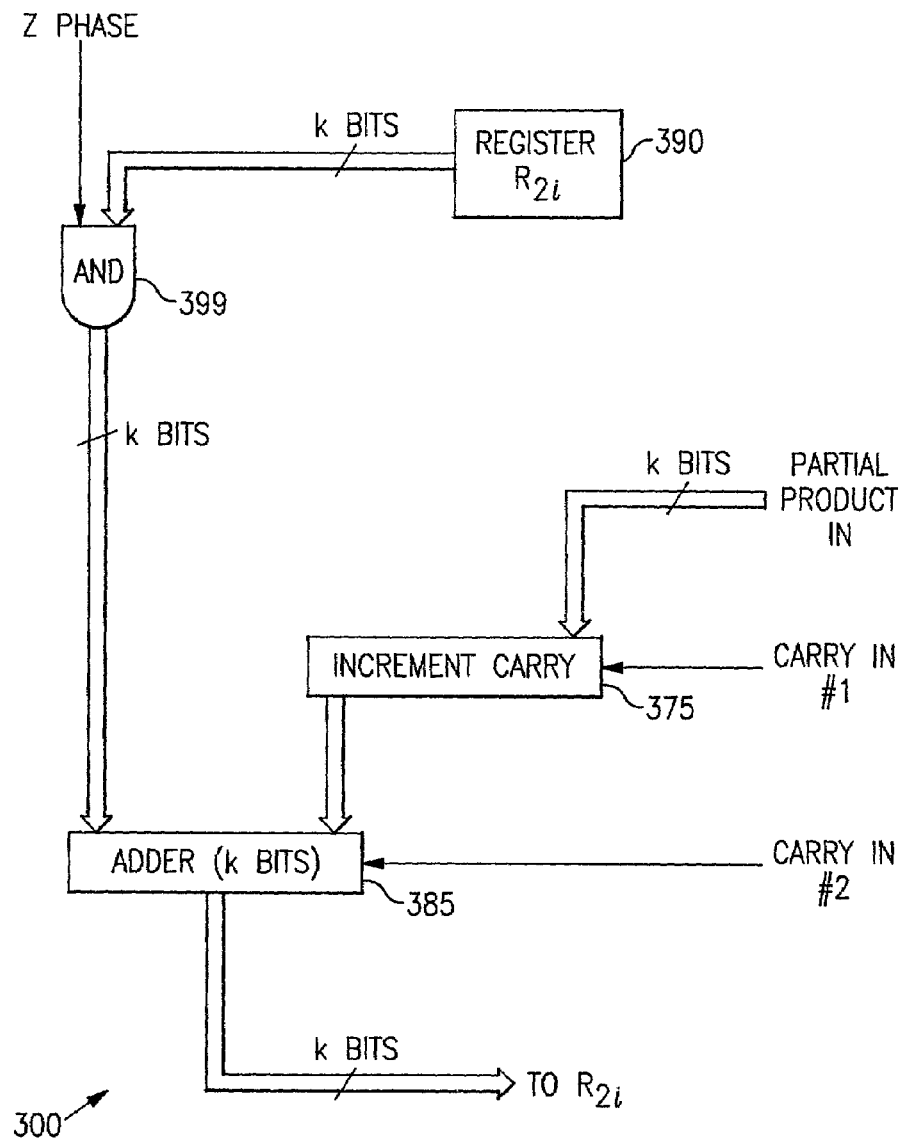
FIG. 6 is a block diagram illustrating the form of a processing element that could expeditiously be employed as the last or leftmost processor element in a series of processor elements for carrying out the same calculations as the circuit of FIG. 1.

The present inventors have also recognized that, at least partly due to the typically large difference between the size of n and k, there is a certain disparity in processing that occurs in the construction of an n by k multiplier. Accordingly, it is possible to partition the calculation carried out in the circuit shown in FIGS. 1–3. In particular, the circuit shown in FIG. 1 is in fact constructable in the form a plurality, d+1, of processor elements (PE) which are connected together in a chained or cascaded fashion. Each of the processing elements is constructed in the same way. However, the processing element for the rightmost portion of the data, herein referred to as $PE_0$, has a somewhat more complicated structure, as shown in FIG. 4. A simpler circuit is employed for processing elements 1 through d. However, in preferred embodiments, the leftmost or last processor element $PE_d$ can in fact be constructed much more simply as shown in FIG. 6. Accordingly, FIG. 4 shows a structure for a processing element circuit for the rightmost portion of the data. FIG. 5 illustrates a circuit for a processing element which is usable in a repeated fashion which utilizes as many individual processing elements as necessary and thus, illustrating the scalability aspects of the present invention. Lastly, FIG. 6 illustrates a preferred, simplified embodiment for the last or leftmost processing element.

For purposes of understanding and appreciating the present invention, the registers $R_0$ through $R_d$, as illustrated in FIGS. 4, 5, and 6, are not considered as a part of the processing elements per se but rather are best understood as part of a separate, partitioned register structure. It is these registers that contain the desired results of the modulo N multiplication operation. These registers thus serve the same function as the Z register in FIG. 1.

With specific reference to FIG. 4, it is seen that multiplexor 193 operates during the X-phase to supply a 2k bit augend to adder 185. During the first or X-phase of operation, multiplexor 193 supplies a 2k bit number which has leftmost bits from register $R_2$ (reference numeral 192) and rightmost bits from register $R_1$ (reference numeral 191). During the second or Z-phase of prosecution, multiplexor 193 supplies a different 2k bits of data to adder 185. In particular, during the Z-phase multiplexor 193 supplies as its leftmost k bits the contents of register $R_1$, and as its rightmost k bits the contents of register $R_0$ (reference numeral 190).

In contrast to the full-width registers 10, 20, 40, and 50 in FIG. 1, the corresponding registers in a partitioned system have fewer bits. In particular, the corresponding B and N variable registers in a general processing element PE preferably employs a width equal to 2k bits. However, for the rightmost processing element, a larger number of bits is desired. In particular, in the case in which n equals 512, registers 120 and 140 in FIG. 4 preferably have a width of 96 bits. Multiplexor 121 selects the contents of register B (reference numeral 120) during the X-phase of computation and likewise selects the contents of register N (reference numeral 140) during the Z-phase of computation. In general, the overall n-bit wide series of computations is broken down into partitions of any convenient size. It is not even necessary that all of the processor elements are the same size or process the same data width. However, for conveniences of circuit design and circuit layout, it is preferable that each of the individual processing elements (except for the rightmost element, $PE_0$) have the same data processing capability in terms of data width. Therefore, in general, for purposes of consideration and discussion herein, it is assumed that there are a total of d+1 processing elements labeled from $PE_0$ through $PE_d$. Processing element $PE_0$ preferably has a structure such as that shown in FIG. 4, $PE_d$ has the preferred structure illustrated in FIG. 6, although it is noted that a more generic structure, such as that shown in FIG. 5, may be employed for the leftmost processor element $Pe_d$ though it is not necessary that this leftmost processing element be any more complicated than that shown in FIG. 6.

Figure 5A:
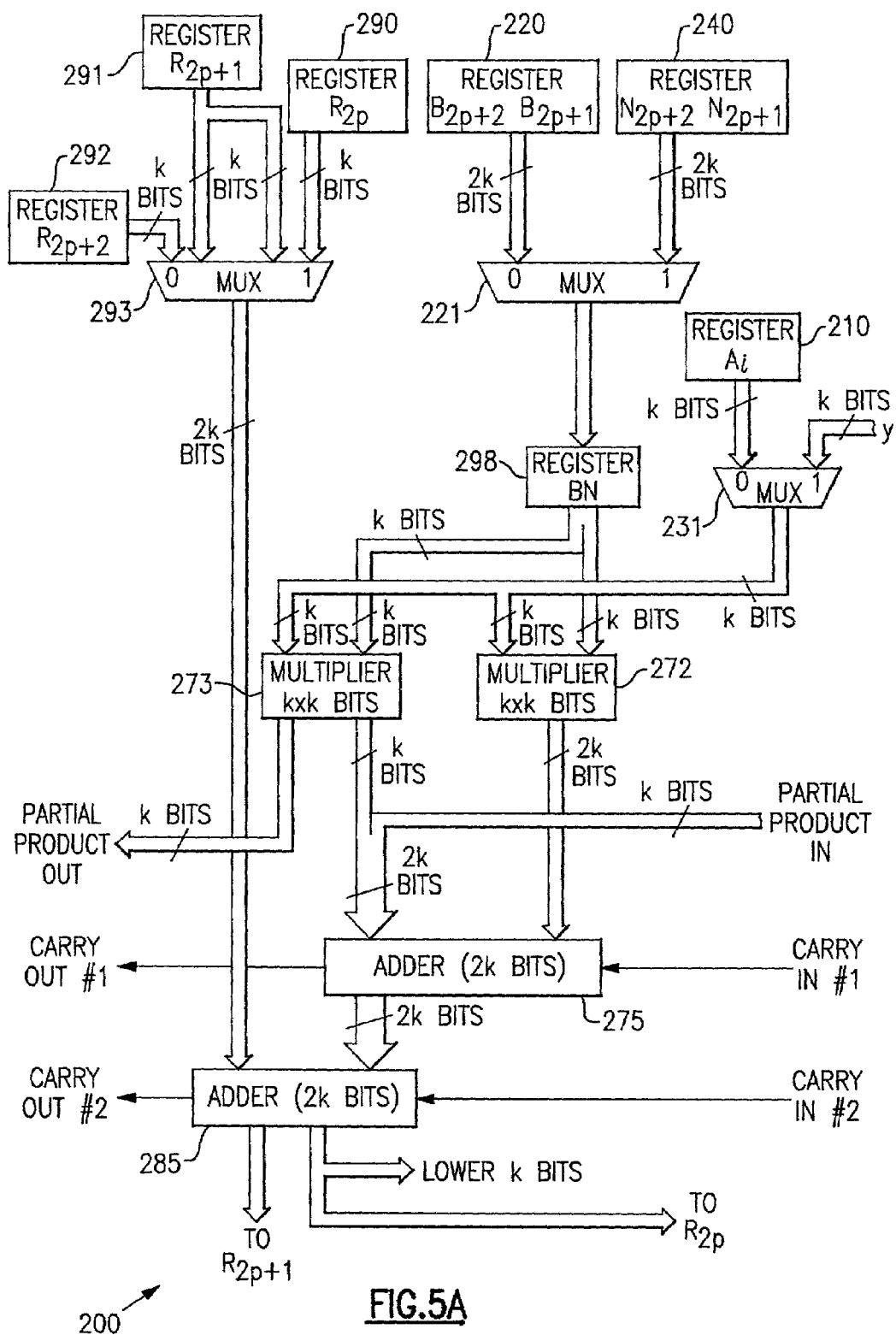
FIG. 5A is a block diagram similar to FIG. 5 but which also illustrates an alternate multiplier-to-adder connection.

Also, for purposes of convenience of circuit design, layout, and packaging efficiency, it is generally desirable that the data width, W, of each processing element be an integer multiple of k. In the designs presented herein for a value of n=512, processor elements $PE_1$ through $PE_{d-1}$, each process data in 2k bit wide chunks. Thus, in this example, W=2k, where W is the width of the data in each of the typical or generic forms of processing element, as illustrated in FIGS. 5 and 5A. It is noted that processor element $PE_0$ as shown in FIG. 4 possesses an extra k bit processing capability, as is more particularly described below. Thus, if each typical processing element $PE_1$ processes data in W bit wide chunks and if there are d+1 processing elements with the rightmost processing element processing an extra k bits, then it is the preferred case that n= Wd+k. Thus, in general, the output of multiplexor 121 preferably comprises W+k bits. The leftmost third of these bits are supplied to multiplier 173, the middle third of the bits in register BN (reference numeral 198) are supplied to multiplier 172, and the rightmost third bits are supplied to multiplier 171. Multipliers 171, 172, and 173 are thus each k bit by k bit multipliers. In this regard, it is noted that the original relatively large multiplier array 70 in FIG. 1 employs an n by k multiplier. However, it is noted that the partitioning of the computation into a system employing a plurality of nearly identical processing elements results in the construction of circuits which now utilize multipliers which operate much more quickly since each multiplier now is typically only k bits by k bits. And clearly, since k is typically much less than n, processing takes place significantly faster.

Figure 4A:
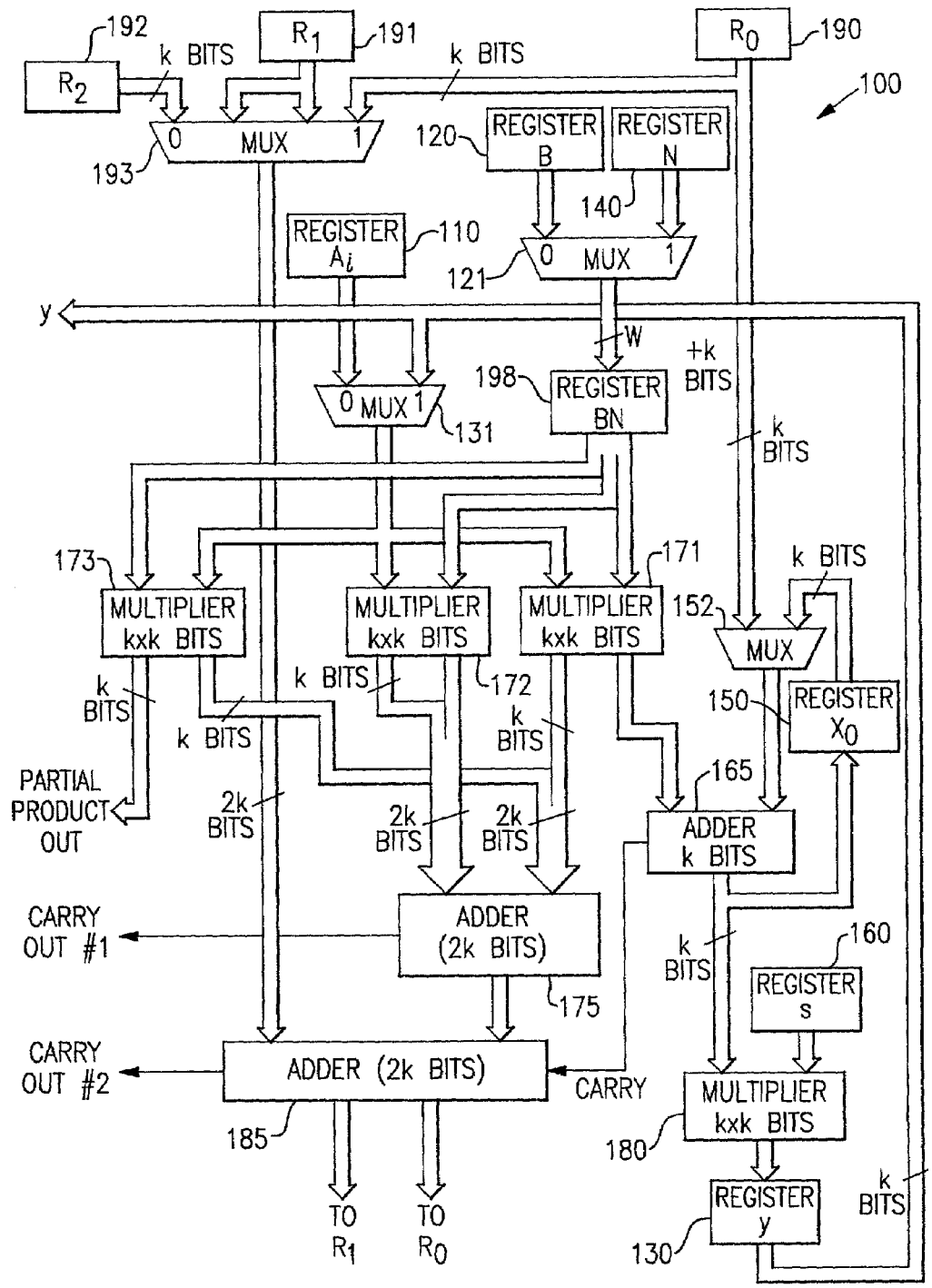
FIG. 4A is a block diagram similar to FIG. 4 but which illustrates an alternate multiplier-to-adder connection.

The leftmost of the 2k bits output from multiplier 173 are supplied as a partial product out (PPO) to the next unit in the chain. In particular, it should be appreciated that in the discussions herein, that the natural order of processing is from the rightmost on through to the leftmost processing element in the chain (see FIG. 7). Thus, data is passed from one processing element to the processing element on its immediate left. However, it should be noted that left and right are relative terms useful essentially only for descriptive and understanding purposes. The rightmost k bits from multiplier 173 are supplied as the leftmost k bits of a 2k bit augend supplied to adder 175. The rightmost k bits of this 2k bit augend are supplied from the lower or rightmost k bits of multiplier 172. Thus, the rightmost k bits of multipliers 173 and 172, respectively, are combined, as shown in FIG. 4, to supply a 2k bit wide augend to adder 175. Adder 175 also has as its other input a 2k bit augend which is supplied from the leftmost k bits of multiplier 172 and 171, respectively, with multiplier 172 supplying the leftmost k bits of the 2k bit augend and with multiplier 171 supplying the rightmost k bits of the 2k bit augend supplied to adder 175. Thus, adder 175 is a 2k bit wide adder. An equivalent but alternate connection arrangement is shown in FIG. 4A.

Multiplexor 152 operates to select, during the X-phase of computation, k bits from register $R_0$ (reference numeral 190). During the Z-phase, multiplexor 152 selects as its input the contents of temporary register 150 containing the variable $x_0$. The output of multiplexor 152 is supplied to adder 165 which is k bits in width. Adder 165 receives two augends, namely, the rightmost k bits from multiplier 171 and the k bits supplied from multiplexor 152. The output of adder 165 is stored in temporary register 150 and is also supplied to multiplier 180 which is also a k bit by k bit multiplier. The other factor supplied to multiplier 180 is the contents of register 160 which contains the variable s. (The calculation of s as $-1/N_0$ mod R is efficiently carried out in the circuit shown in FIG. 17 which is discussed in detail below.) The output of multiplier 180 is supplied to register 130 which thus contains the value y as defined by the algorithm set out above.

The output of register 130 is supplied to multiplexor 131 and is also supplied to the next processing element $PE_1$ (see FIG. 5). Multiplexor 131 operates to select a portion of the variable A which is one of the factors in the multiplication operation. (Other k bit wide portions of variable A are selected by their respective processing elements.) In particular, register 110 contains the rightmost k bits of the variable A. Thus, during the X-phase of operation, multiplexor 131 operates to select the contents of register 110 to be supplied to multipliers 173, 172, and 171, as shown. Likewise, during the Z-phase of computation, multiplexor 131 operates to select the variable y from register 130 to be supplied to this same set of multipliers as the other factor.

A carry-out signal line from adder 165 is also supplied as a carry input to the lowest order position in adder 185, as shown. Additionally, adder 175 supplies a first carry-out signal line to the next processing element in the chain; similarly, adder 185 also supplies a second carry-out signal line to the next processing element in the chain. In particular, since FIG. 4 illustrates processing element $PE_0$, carry-out signal line 1 and carry-out signal line 2 are both provided to processing element $PE_1$. The connections between $PE_0$ and $PE_1$ are readily apparent simply by placing FIG. 4 to the right of FIG. 5. In particular, processing element $PE_0$ supplies the variable y, the partial product out, and the two carry-out signal lines to the inputs shown in $PE_1$ of FIG. 5. In particular, it is also noted that the variable y (that is, the contents of register 130) is supplied to each one of the individual processing elements. And lastly, with respect to FIG. 4, it is noted that the output of adder 185 is supplied to registers $R_0$ and $R_1$ shown at the top of FIG. 4. As indicated above, it is the register set (containing $R_1$ and $R_0$ on the right) which ultimately contains the desired calculation result. Accordingly, reference numeral 100 in FIG. 4 describing processing element $PE_0$ does not include this register set. This register set is discussed separately below in terms of some of the other variations and structures that are employed in the present invention.

Attention is now directed to a discussion of FIG. 5 which illustrates a more typical processor element and, in particular, which illustrates the form of a processor element which may be repeated in a circuit/system chain which is as long as is required to process factors which are n bits wide.

With specific reference to FIG. 5, it is noted that it is similar to FIG. 4 except that the part of the processing dealing with k bit wide operations involving s and $N_0$ need not be present in any processing elements except the rightmost one, namely, $PE_0$. In particular, FIG. 5 indicates that the generic form of a processing element $PE_p$ bearing reference numeral 200 specifically does include register BN (reference numeral 298) but does not include the other registers shown. One of the significant differences between FIGS. 4 and 5 is that register 220 contains only a portion of the bits for the second factor B. In particular, register 220 contains 2k bit wide chunks designated as $B_{2p+2}$ and $B_{2p+1}$, where p ranges from 1 to d−1. Again, as above, multiplexor 221 selects either the 2k bits from register 220 or the 2k bits from register 240 which has corresponding portions (here 2k bits chunks) of the variable N. Accordingly, register BN is 2k bits wide. Unlike register 198 in FIG. 4, register 298 (BN) in FIG. 5 is only 2k bits wide. In one preferred embodiment of the present invention when n=512, register BN is 64 bits wide.

Figure 7:
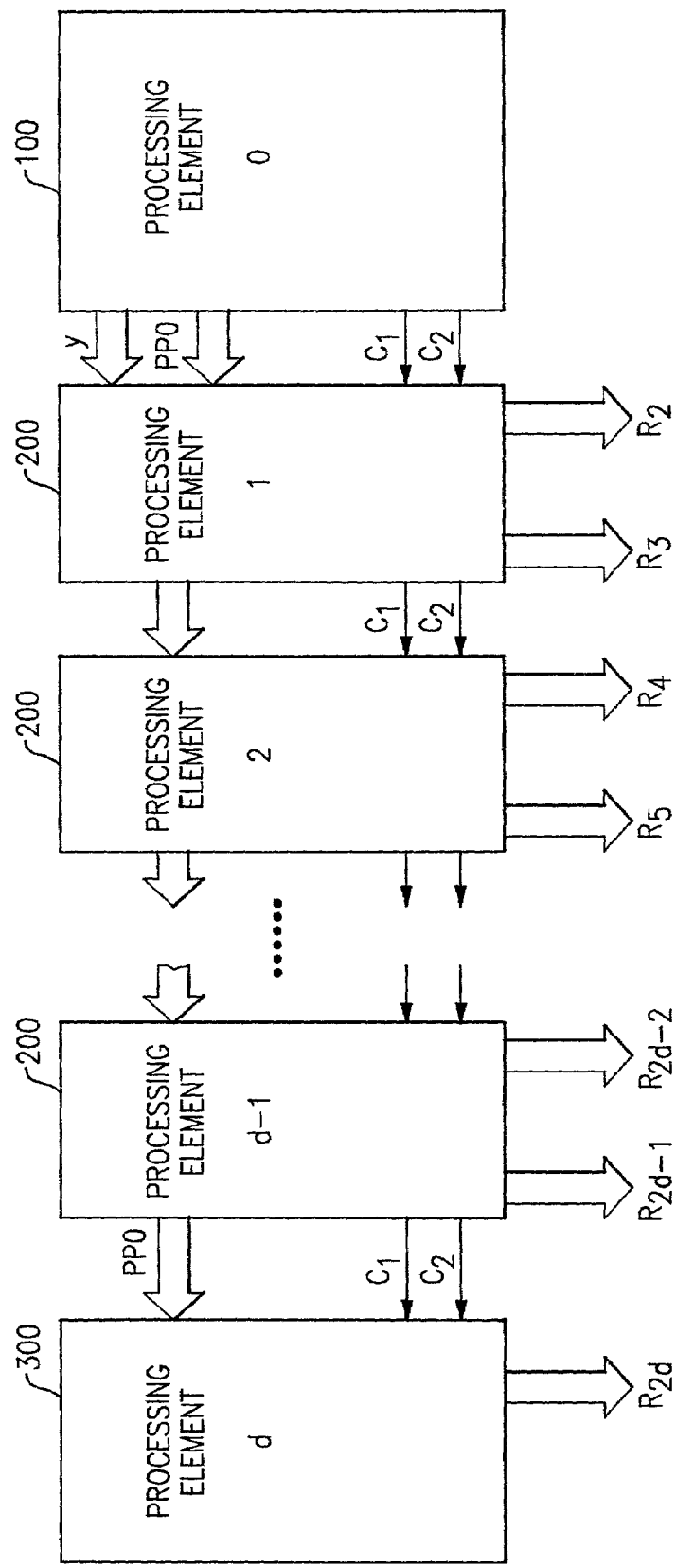
FIG. 7 is a block diagram illustrating how the processor elements described in FIGS. 4, 5, and 6 are connected to produce the same results as the circuit shown in FIG. 1.

From an overall perspective, general processing element $PE_1$ (reference numeral 200 as shown in FIG. 5) accepts, as input from the right, the value of y, the partial product in, carry-in 1 and carry-in 2. Processor element $PE_1$ also has as an input the corresponding portion of the k bits of the multiplier factor A from register 210. The register involvement for registers, 292, 291, and 290 is substantially as shown in FIG. 4 except now shown in the generic version of a processor element. It is these registers that store intermediate values between phases and ultimately store the completed product, AB mod N. Also, from an overall perspective, processor element 200 produces, as an output, a k bit partial product out which is supplied to the processor element on its left together with carryout signals 1 and 2 which are supplied to the corresponding adders 275 and 285 in the processor element on the left. The output of adder 285 is supplied back to registers $R_{2p+1}$ and $R_{2p}$. Accordingly, other than the connections to the register sets for R, B, N, and A, the processing elements are connected simply by matching partial products in and out and carries in and out 1 and 2. Accordingly, in systems constructed in accordance with those aspects of the present invention which employ a plurality of similar processing units, the overall system is constructed by starting with the circuit shown in FIG. 4 or 4A as a rightmost position and placing, in adjacent positions, processing elements similar to those shown in FIG. 5 or 5A. The overall configuration, therefore, is seen in FIG. 7.

However, before proceeding, it is useful to consider the fact that the leftmost processor element $PE_d$ does not have to be as complicated as the processing elements to its right such as these shown in FIG. 5 or 5A. In particular, the leftmost processing element only needs to process k bits. In the X-phase of operation, the circuit shown in FIG. 6 acts to add carry-in 1 to the partial product input to the leftmost processing element via increment-carry circuit 375. Likewise, adder 385 adds carry-in 2 to the other input to adder 385 to produce an output which is supplied to register $R_{2d}$ in the immediate preceding processor element. In the Z-phase of operation as controlled by AND-gate 399, the contents of register $R_{2l}$, (reference numeral 390) are added to the output of increment carry circuit 375 and this is also supplied to register $R_{2l}$ in the feedback configuration as shown. Accordingly, it is seen that in partitioned embodiments of the present invention, it is preferable to employ a leftmost processing element which is simpler than that which is generally required in one of the generic processing elements between the rightmost and leftmost elements. However, while preferable, this substitution is not mandatory.

The partitioning of the computational problem as provided in one embodiment of the present invention into a solution having a plurality of nearly identical processing elements provides significant advantages in terms of design, efficiency, layout, and structure. Concomitantly, these advantages also lead to advantages in circuit speed and throughput.

However, it is also very important to note that the partitioning into a plurality of processing elements also provides significant advantages in terms of the fact that a pipelined operation is now possible. In particular, while pipelined operations generally introduce a small initial delay, the total throughput, as measured in terms of modulo N multiplications per time unit is significantly improved. Accordingly, a significant portion of the description below is devoted to a discussion of the use of the described partitioned processing element structure in conjunction with a pipelined method for operating the circuits shown in FIGS. 4, 5, and 6, and variations thereof.

Figure 8:
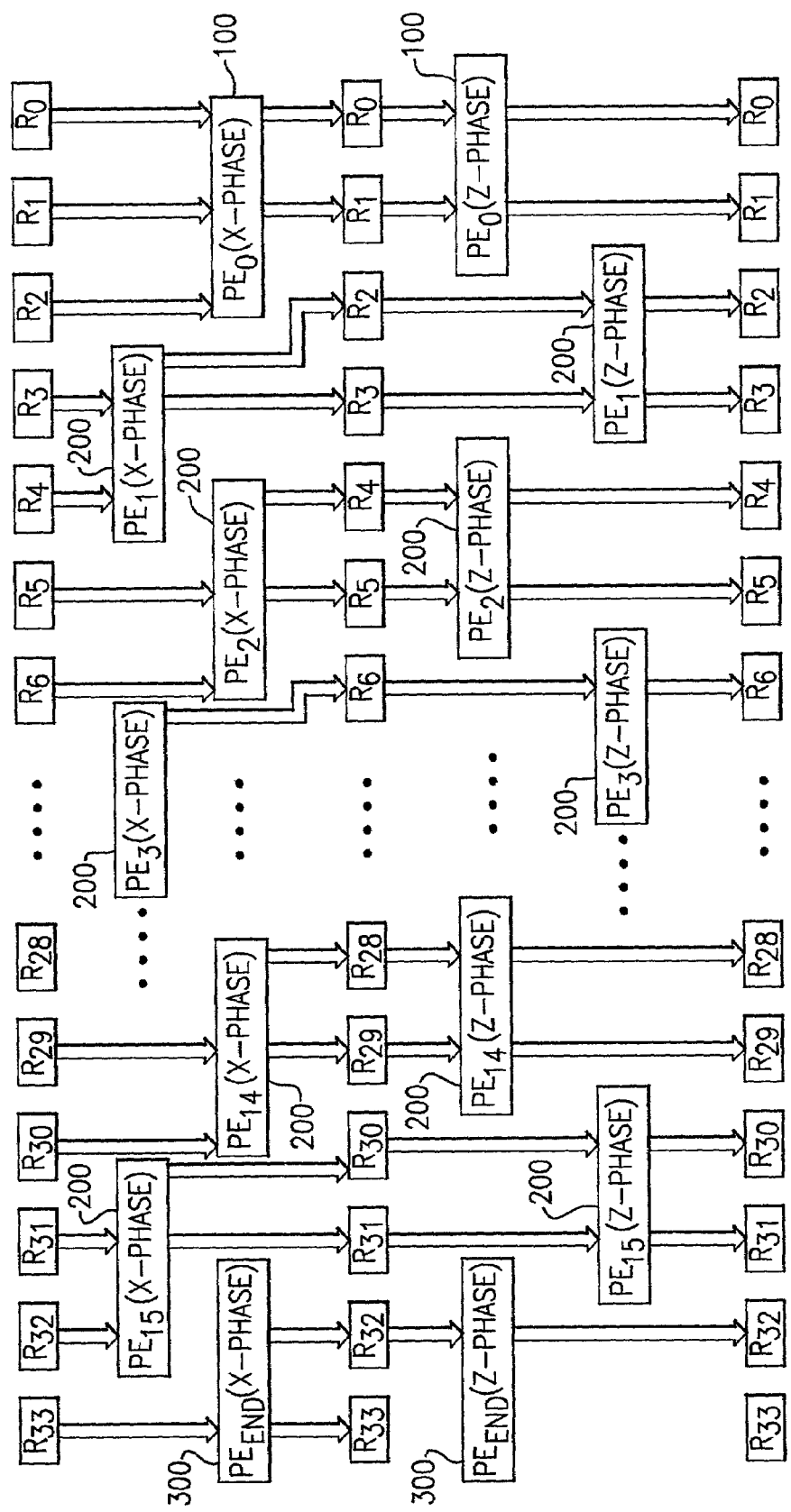
FIG. 8 is a block diagram illustrating the logical connection of processor elements over time with particular reference to register storage and the X and Z phases of operation.

However, before embarking on a discussion regarding the pipelining aspects of the present invention, it is also useful to note that the circuits shown in FIGS. 4–7 are perfectly capable of operation in a non-pipelined fashion. Such a mode of operation is illustrated in FIG. 8. In particular, it is noted that FIG. 8 is a logical time-sequence diagram illustrating the use of the register set $R_0$ through $R_{33}$ as a final and temporary storage medium for passing information between the X-phase of computation and the Z-phase of computation. FIG. 8 also more particularly illustrates the distinction pointed out above between the register set and the individual processing elements. This figure also illustrates the unique positions for the rightmost and leftmost processing elements wherein the rightmost element is supplied with information from three registers and wherein the leftmost processing element receives direct information only from the leftmost portion of the register set, namely, $R_{33}$ since, in this particular case, n is assumed to be 1,024 and k is assumed to be 32. Not shown in FIG. 8 are the signal connections between the processing elements. Rather, FIG. 8 is meant to be illustrative of time sequencing and the utilization of the register set. In particular, it should also be noted that, in FIG. 8, the processor elements in the upper half of the illustration are all operating in the X-phase at the same time, and likewise, all of the processing elements in the lower portion are operating in the Z-phase. Variations of this operational modality are more particularly described below with respect to FIG. 9 and considerations relating to pipelining of the information into and out of the circuit. In the case of no pipelining, such as shown in FIG. 8, all of the processing elements start to process data at the same time and finish at the same time. In any given clock cycle, all of the processing elements are either all in the X-phase or are all in the Z-phase of calculation. In this node, each processing element updates a fixed slice of the complete partial result register (two $R_i$ registers). Since all of the partial product registers are updated at the same time, everything works smoothly in accordance with the algorithm described above.

Attention is now directed to that aspect of the present invention in which the processing elements are operated in a pipelined fashion. In order to achieve this result, certain hardware modifications are made to the circuits shown in FIGS. 4 and 5. These modifications are more particularly illustrated in FIGS. 10 and 11, respectively, to be discussed more particularly below.

Figure 9:
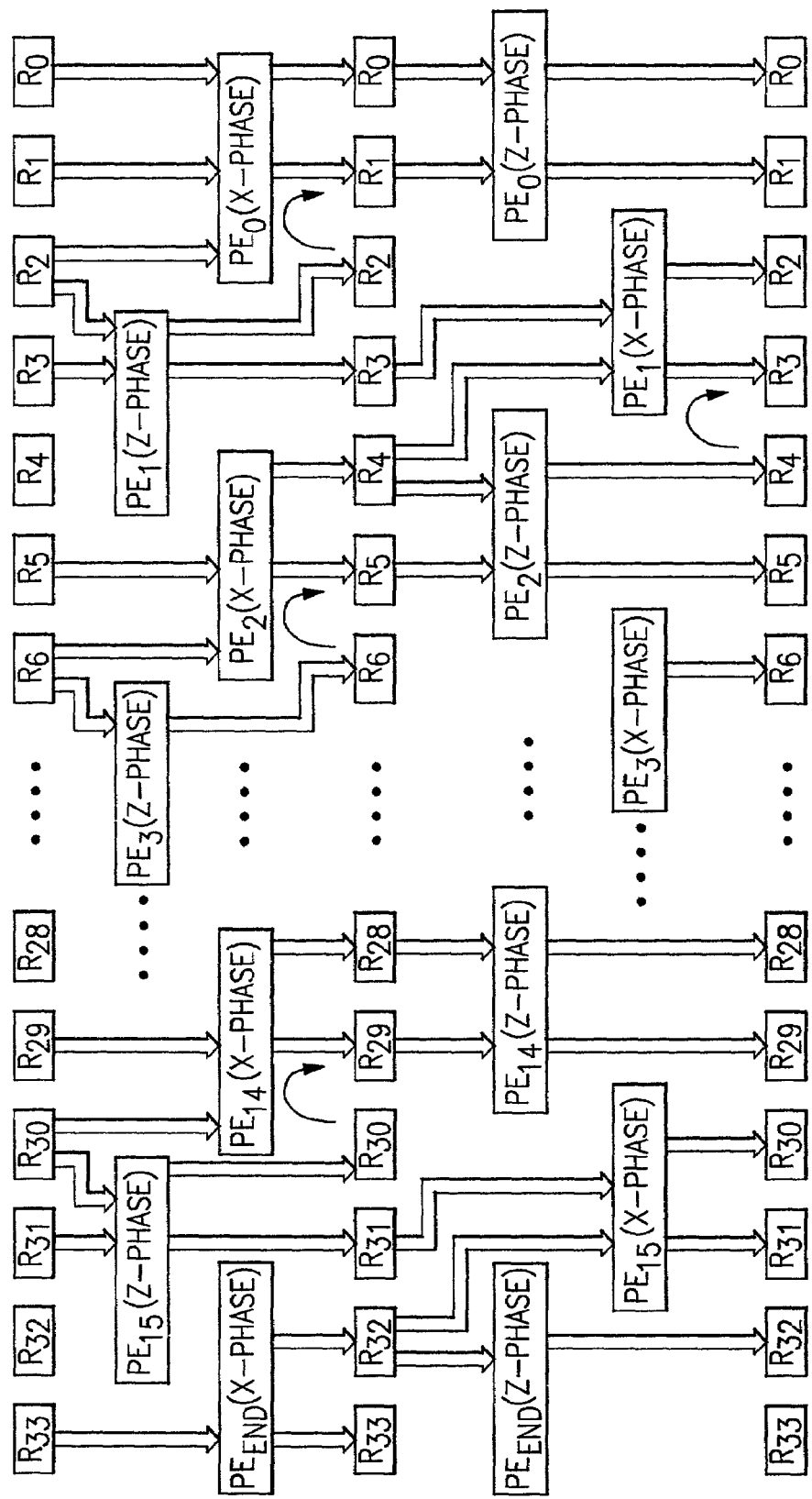
FIG. 9 is a block diagram illustrating the use of processor elements in a pipelined fashion.

However, for purposes of better understanding the utilization of the processing elements in a pipelined fashion, attention is specifically directed to FIG. 9. In the pipelined approach, it is the case that, in a given clock cycle, any two adjacent processing elements are always in different phases with the processing element processing the less significant slice of data always being one clock cycle ahead. As seen by the circular arrows in FIG. 9, it is unfortunately the case that, while a given processing element is in the X-phase, it requires, as input, a 32-bit value from the Z-phase that is being calculated at the same time by the next processing element in the chain that is still in the previous Z-phase. For example, as shown in FIG. 8, the rightmost processing element $PE_0$ on the top right is in the X-phase. This requires, as an input, the value in $R_2$ from processing element $PE_1$, which is one clock cycle behind in the Z-phase. This problem is solved by adding a feedback paths from the next processing element in the chain, which links to a k-bit adder (see reference numeral 235 in FIG. 10 and reference numeral 135 in FIG. 11). This solution creates additional delay due to the presence of a new k-bit adder. However, the maximum working frequency is not significantly affected since a k-bit adder is a relatively fast circuit. Additionally, it is noted that the previous signal path, before this change, was not a critical path. The original critical path occurred in the rightmost processing element $PE_0$ due to the calculation of the constant y. The advantage to this particular solution is that there is no need to modify the formulas in the algorithm; however, on the other hand, the maximum frequency is nonetheless slightly effected. Additional variations, to be considered more particularly below, consider this minor problem and provide yet another solution which eliminates the delay introduced by adder 235 and 135. In any event, either of the two pipelining solutions presented is an improved solution over that provided by the purely parallel approach illustrated in FIG. 8.

Figure 10:
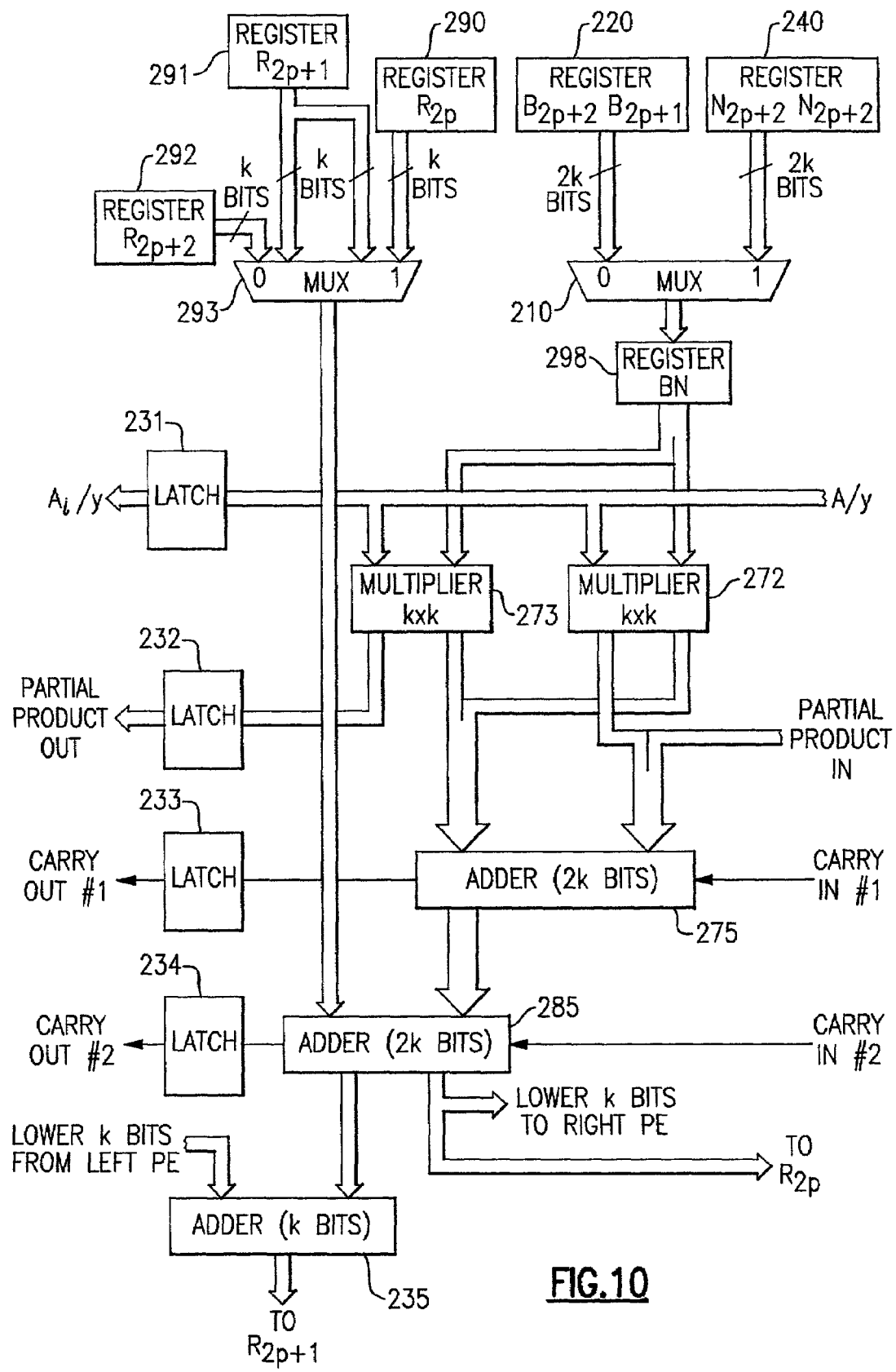
FIG. 10 is a block diagram illustrating a typical processor element as configured for use in a pipelining mode.
Figure 11:
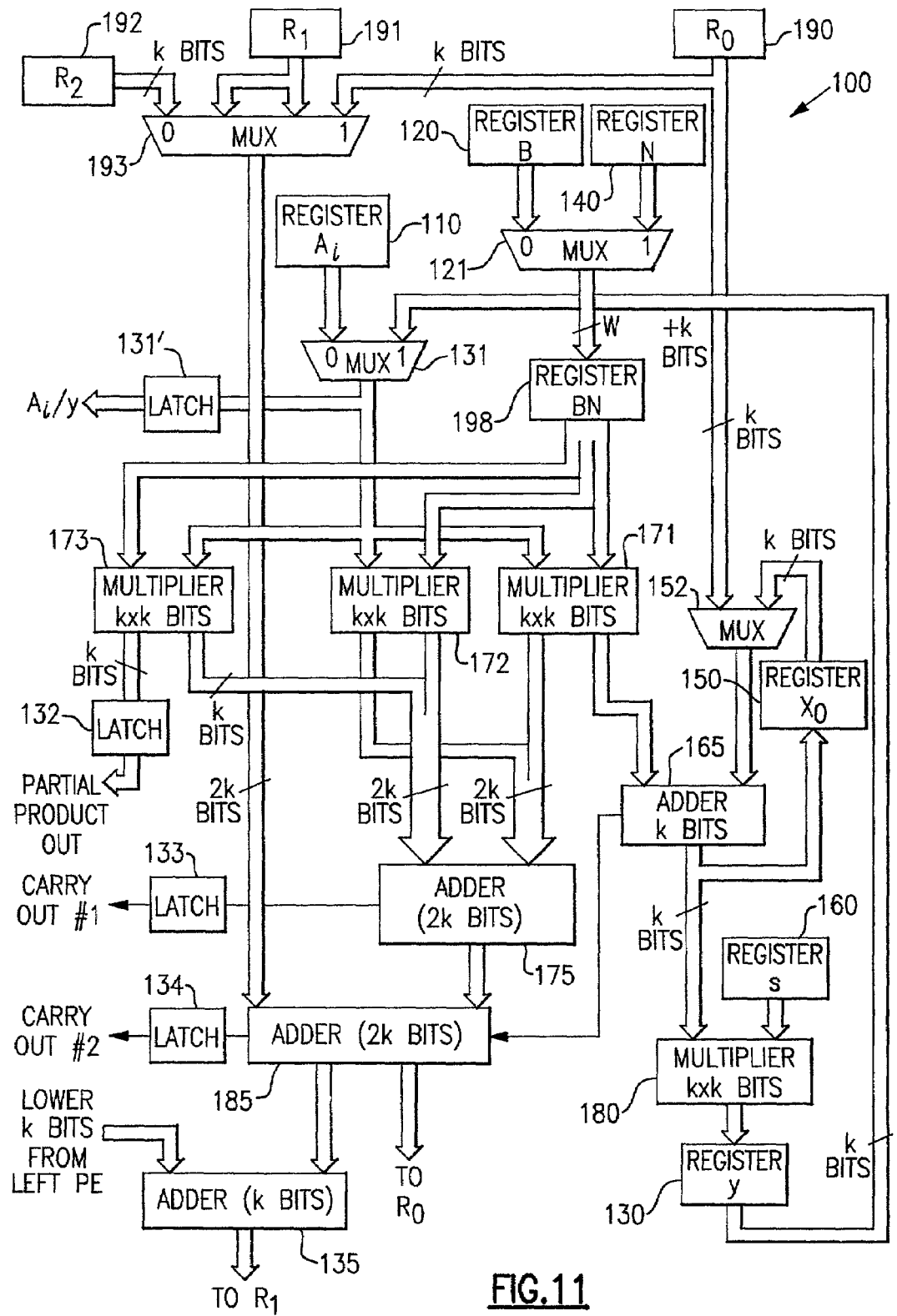
FIG. 11 is a block diagram similar to FIG. 10 but more particularly illustrating a processor element to be used in the rightmost or lower order position.

As pointed out above, FIG. 10 is similar to FIG. 5, but more particularly illustrates the inclusion of extra hardware elements that are used to achieve smooth operation in a pipelined fashion. In particular, latches 232, 233, and 234 are added as temporary storage mechanisms between processors elements for holding the k bit wide partial products out (PPO), and the single bit carry-out lines 1 (from adder 275) and 2 (from adder 285). Additionally, it is noted that latch 231 stores either the selected k bit wide portion of multiplier factor $A_l$ or the constant y. This is provided in an alternating fashion from multiplexor 131 (as shown in FIG. 11). Additionally, it is noted that the lower k bits from the output of adder 285 are supplied to the adjacent adder 235 which is actually present in the preceding processing element, namely the one to the right. In a similar fashion, the lower k bits from the next (that is, the left) processing element are supplied to adder 235. Additionally, there is a feedback connection (not shown for reasons of drawing congestion) from the output of adder 235 to the corresponding segment of the register "set," namely, to $R_{2p+1}$.

Similar changes in the circuit are made to the rightmost processing element $PE_0$, as shown in FIG. 11. In particular, latches 131, 132, 133, and 134 are added to serve a function that is the same as that provided by latches 231, 232, 233, and 234 in FIG. 10. And as in FIG. 10, adder 135 is now included to incorporate the extra addition step for pipelined operations. It is also noted that latch 131' in FIG. 11 is supplied from multiplexor 131. It is from this latch that values of $A_l$ and y are supplied to subsequent processing elements in the chain. In this regard, it is also noted that register 110 containing the value $A_l$ is illustrated in FIG. 11 as a k bit register, while in fact the preferred embodiment is the one illustrated in FIG. 1 in which a long A register with n+1 bits provides information to a multiplexor which selects subsequent k bit wide chunks from the contents of the A register. Accordingly, register 110 in FIG. 11 is preferably constructed as illustrated from register 10 and multiplexor 11 in FIG. 1. The simplification shown in FIG. 11 is only for clarity and for ease of understanding. Also, as is seen in the corresponding portion of FIG. 4, the output of multiplexor 121 is preferably W+k bits wide where W is the width of the data chunks processed by each of the generic processing elements.

Figure 12:
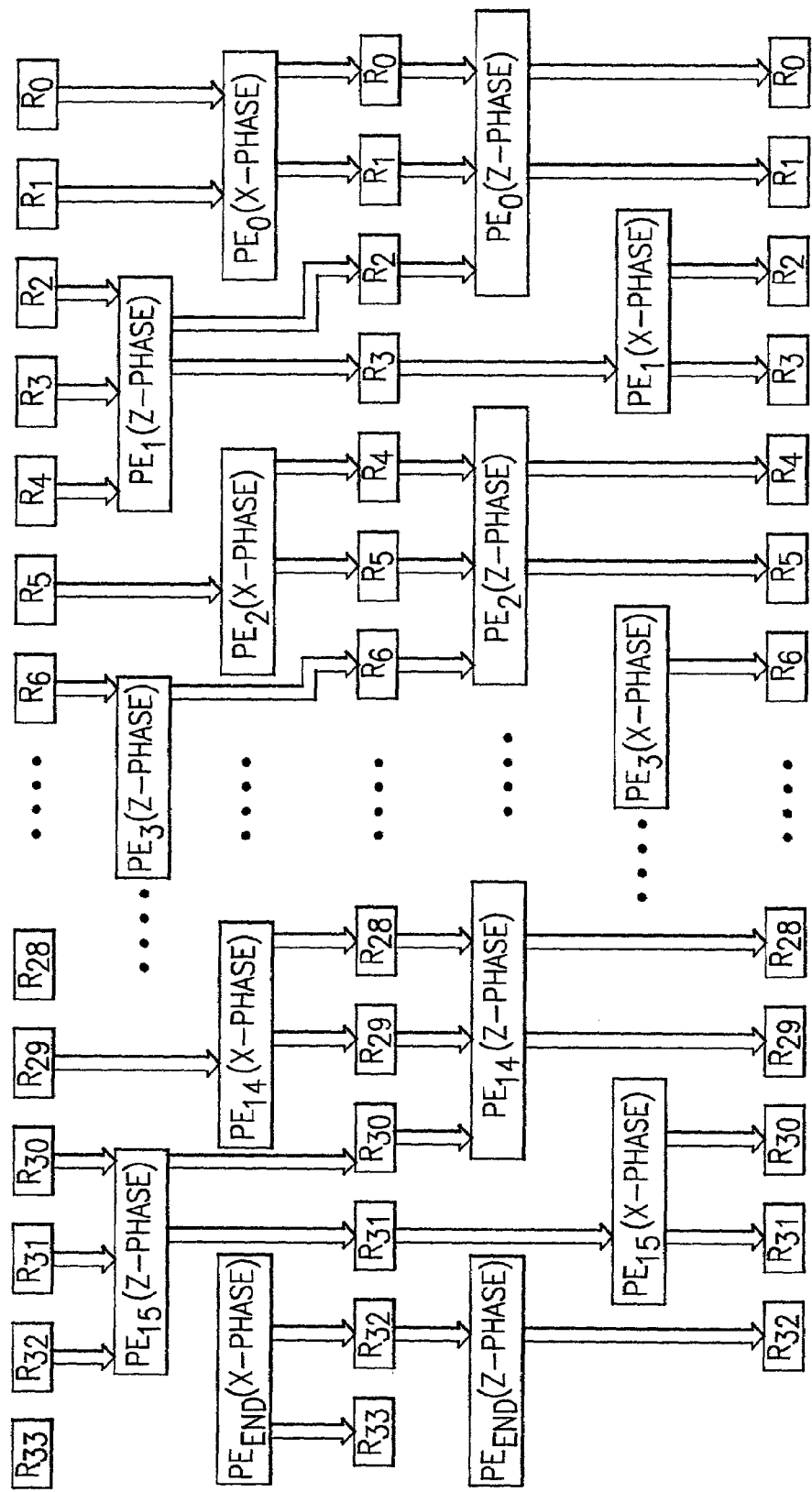
FIG. 12 is a block diagram similar to FIG. 8 but more particularly showing a variation in the utilization of pipelining to speed up processing time by eliminating an adder from a critical path.

Before proceeding to a discussion of yet another preferred embodiment of the present invention, it is worthwhile to consider the development described so far so in order to provide some overall perspective. In particular, a first preferred embodiment of the present invention provides a circuit such as that shown in FIG. 1 which employs relatively large multiplier and adder arrays. In a second preferred embodiment, the adder and multiplier arrays are partitioned so as to be deployed in a chained sequence of individual processing elements with each one possessing the same structure and passing information from the rightmost to the leftmost processing elements in a system which efficiently carries out the same operations as shown in FIG. 1. In a third preferred embodiment of the present invention, the processing elements are further provided with an additional adder and latches which enable the processing elements to be operated in a pipelined fashion, such as illustrated in FIG. 9. In the next preferred embodiment of the present invention which is now considered in detail below, additional adders 135 and 235 are repositioned in the circuit so as not to negatively impact critical dataflow paths. It is now this embodiment which is described. In particular, in this embodiment, the processing elements and register sets are configured as shown in FIG. 12. In particular, it is noted that, in FIG. 12, the register connections to the individual processing elements are in fact different. This difference is due to the repositioning of the adder.

Figure 13B:
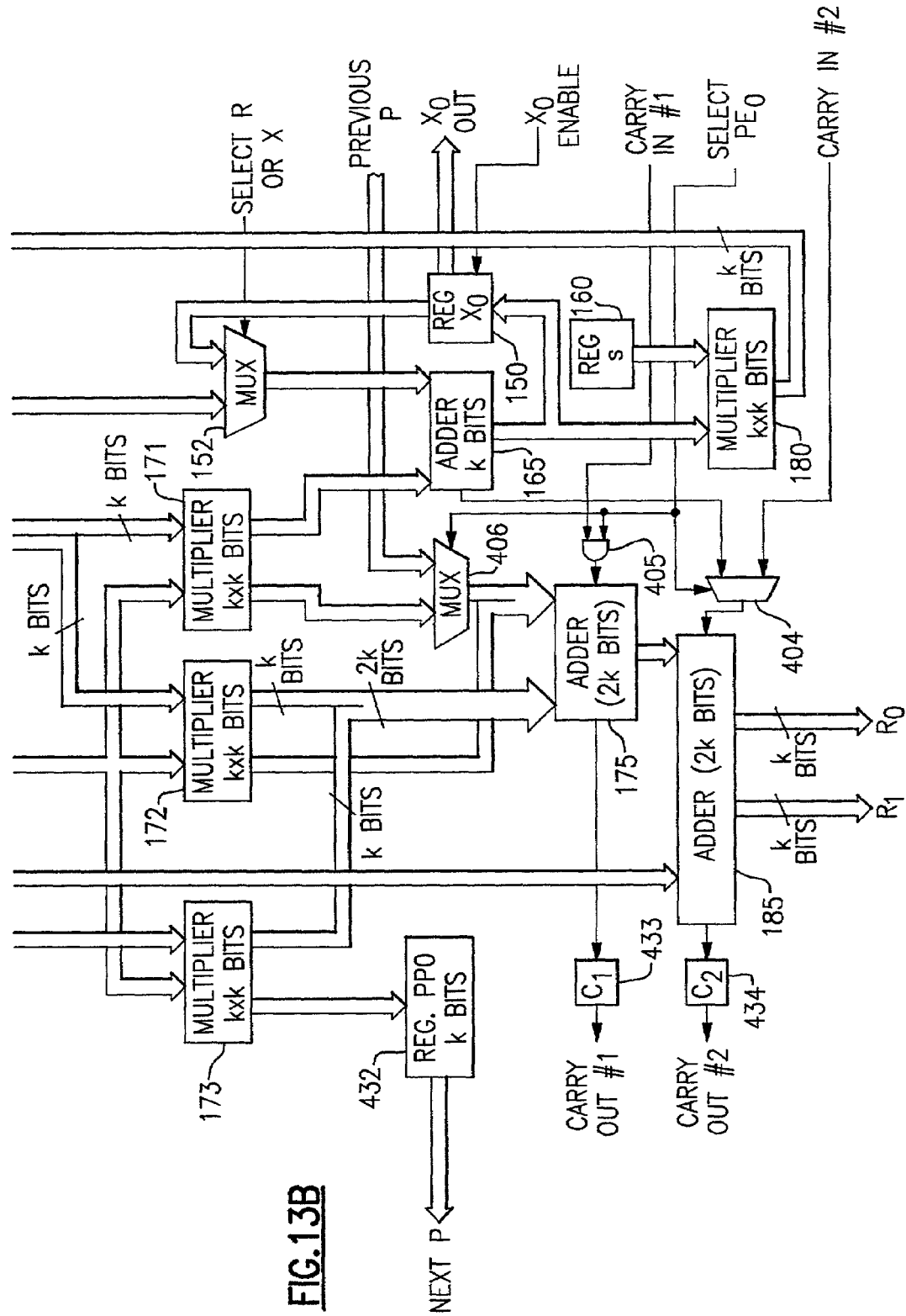
FIG. 13 (depicted as FIGS. 13A and 13B in the drawings) is a block diagram illustrating an improved rightmost processor element in which an adder in a critical path has been moved to improve performance.
Figure 14:
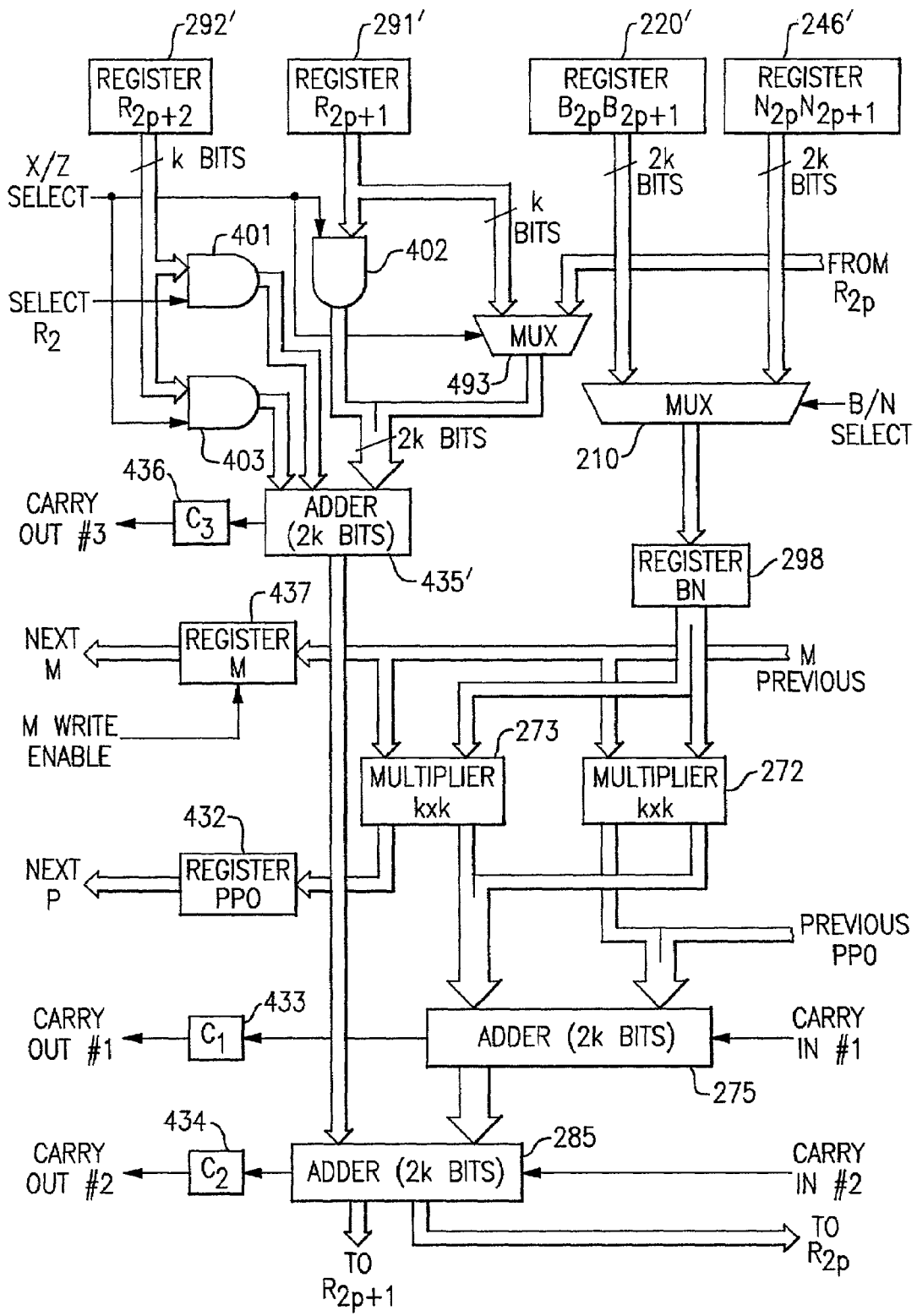
FIG. 14 is a block diagram similar to FIG. 13 but more particularly illustrating a typical processor element for use in an improved pipeline operation.

In particular, FIG. 13 illustrates the repositioning of adder 135 from FIG. 11 and likewise, FIG. 14 illustrates the repositioning of adder 235 from FIG. 10 to the position shown as adder 435' as shown in FIG. 14. Accordingly, the design illustrated in FIGS. 10 and 11 for pipelined operations is improved even further by moving the indicated adder to the input stage of the processing elements which is facilitated by eliminating certain feedback paths between the processing elements, as shown. The adder is moved from the output of the processing element to the partial product input (R register path) and works in parallel with the slower multiplier function blocks. This eliminates an adder from a critical path. From FIG. 9, it can be seen that when processor element $PE_p$ is in the X-phase, it requires an input from both register portions $R_{2p+2}$ and $R_{2p+1}$. The $R_{2+1}$ value is actually updated by the $p^{th}$ processor element during its previous clock cycle. The "problem" is that the value in $R_{2p+2}$, which is supposed to be contain the value of $Z_{2p+2}$ is updated in the same clock cycle by processor element p+1 ($PE_{p+1}$). It is noted that during the X-phase, processor element $PE_p$ adds the value $Z_{2p+2}$ contained in $R_{2p+2}$ to the upper k bits of its output and loads the result into $R_{2p+1}$ (this is the $X_{2p+1}$ value). Given that the contents of register $R_{2p+1}$ are used and updated exclusively by $PE_p$, one can proceed as follows: (1) during the X-phase, processor element $PE_p$ does not add the value of $R_{2p+2}$ to its output before loading $R_{2p+1}$; and (2) during the Z-phase $PE_p$ receives as an extra input, the value in register $R_{2p+2}$ (which at this time has been updated by $PE_{p+1}$ with $Z_{2p+2}$ and adds this immediately to the $R_{2p+1}$ input before any further processing). The modifications to the circuit shown in FIG. 11, which are illustrated in the circuit of FIG. 13, are designed to accomplish these goals.

The consequence of step (1) recited in the previous paragraph is that at this point the value generated by the processing elements during the X-phase is not any more the same as described in the algorithm set forth above. In order to compensate for this difference, another term is added during the Z-phase. The benefit of this change is an increase in the maximum frequency of operation and a reduction in the power of the needed by the circuit. Additionally, there are also advantages in terms of a reduced need for silicon area (that is, chip "real estate") together with advantages in having a more uniform and repeatable circuit design. Accordingly, FIG. 12 illustrates the new flow of data between the R register "set" and the processing elements. Likewise, FIGS. 13 and 14 illustrate the presence of additional circuitry to accomplish the objectives stated above.

The specific changes to the rightmost processing element for the improved pipelining version of the present invention are now specifically set forth. As above, a partial product out from multiplier 173 is latched up into k-bit wide register 432. Additionally, the variable M from multiplexor 131 is latched up into latch 437.

Repositioned adder 435 is an adder having a width of 2k bits. It also receives a carry input signal (carry-in 3) and includes two input signal lines. A 2k bit wide signal comes from a combination of the output from AND-gate 402 which is supplied from register $R_1$ (reference numeral 191). Register 191 also supplies multiplexor 193 which has as its other input the k bit output signal from register $R_0$ (reference numeral 190). The output of multiplexor 193 under the control of the "X/Z Select" signal line which causes the supply of either the output of register $R_1$ or register $R_0$ as the rightmost k bits for the right input to adder 435. (Note though that adders and multipliers are symmetric with respect to the use of left and right inputs since the desired operations are commutative.) The first (rightmost) 2k bit input to adder 435 is either $(R_1, R_0)$ or $(000 \ldots 0, R_1)$ depending on the "X/Z Select" signal being 1 or 0, respectively. The "x/Z Select" signal configures the circuits for X-phase or for Z-phase operation. During the X-phase, adder 435 executes the following operation: $(00 \ldots 0, R_1)+0$ which result is sent to adder 135. In comparison with FIG. 11, it is seen that adder circuit 185 in FIG. 13 receives $(R_1, R_0)$ but can also receive the additional signal input $(R_2, 00 \ldots 0)$. The reason for this option is based on pipelining operations because in such a mode the Processing Element (PE) on the left is always behind one clock cycle. For example, since $PE_1$ in FIG. 11 is responsible for updating the $R_2$ register with the Z value, this means that during the X-phase $PE_0$ needs the Z value stored in $R_2$ in $PE_1$ which is still generating it. Thus, in FIG. 11, adder 135 is used to transform the X value in $R_2$ to the successive Z value. However, in contrast in FIG. 13, the value in $R_2$ is added later in the next phase (a Z phase) via adder 435 which is not in a critical path.

The signal "Select $R_2$" is always 'zero' while the signal "X/Z Select" controls the X and Z phase during modular multiplication. This signal, when set to 'one' provides the capability of performing regular multiplication as opposed to modular multiplication as needed, or as desired. For regular multiplication, the "X/Z Select" signal line is always "zero" while the "Select $R_2$" signal line is always "one."

The other input to adder 435 is a 2k bit wide signal whose rightmost k bits, driven by the AND-gate 401, are all zeros during a modular multiplication or equal to the Register $R_2$ value during a standard multiplication as determined by the signal "Select R2". The output of AND-gate 401 is connected now to the lower k bits of the leftmost 2k bit input to adder 435. The leftmost k bits of this second input comes from register $R_2$ (reference numeral 192) under the control of the "X/Z Select" signal line which controls AND-gate 403. AND-gate 403 is, like multiplexor 193, also under control of the "X/Z Select" signal line, as shown. The reconfiguration of the adder's input signals is necessitated by the repositioning of adder 135 to a position which is not in a time-critical path.

The functioning of signal line "Select $PE_0$" is now more particularly described. The inclusion and functioning of this control line is not related to the repositioning of adder 435. When signal line "Select $PE_0$" is "one" the hardware in the processing element becomes equivalent to the generic hardware processor element P, ($1 \leq i \leq d$). When the "Select $PE_0$" signal line is set to "one," multiplier 406 selects the "Previous P" input signal bus and provides it to adder 175 (which is equivalent to adder 275 in $PE_1$). The output of AND-gate 405 changes from "zero" (in the case of $PE_0$ functioning) to the value driven by the carry input signal line for adder 175 (or 275 in $PE_1$ functioning). Multiplexor 404 selects the "Carry In 2" signal line and provides it as a carry input to adder 185 or 285 in $PE_1$ functioning). Accordingly, the "Select $PE_0$" signal line is used to "disable" the following devices so that the processing element operates as a generic PE, rather than as $PE_0$: multiplier 171, adder 165, multiplexor 152, multiplier 180, register 150 and register 160.

There are two cases in which it is desired that the "Select $PE_0$" signal line should be driven into the "one" state. This means that the PE behaves specifically like a generic $PE_1$ as opposed to the rightmost $PE_0$.

The first case is when the system is designed comprising two separate chains of Processing Elements. For example, each of the two chains is made up of a concatenation of one $PE_0$ together with seven $PE_1$'s (that is, with eight Processing Elements per chain). These two chains (with eight PE's each) are particularly useful in carrying out operations of modular multiplication involving public key cryptography algorithms such as the RSA algorithm using the Chinese Remainder Theorem (CRT). In such cases, each of the two chains operates independently to perform two modular multiplications. In the case of modular multiplication as described above, there is thus provided a command which effectuates this operation together with an exponentiation function which is described in more detail below. In this case, the two chains of Processing Elements are concatenated to form a longer chain that is thus able to process more data in the same amount of time. In this case, the "$PE_0$" on the rightmost position of the left chain behaves as a $PE_1$ and receives the inputs from $PE_7$ (here "7" is used as an example which is in harmony with the exemplary chain size of eight, as recited above) from the right chain. This is accomplished by setting the "Select $PE_0$" signal to "one." These two chains may be represented diagrammatically as follows:

$PE_{7B}\ PE_{6B}\ \ldots\ PE_{1B}PE_{0B}\ \mathrm{<\!\!-\!\!-\!\!-\!\!-\!\!-\!\!-\!\!-\!\!->}\ PE_{7A}\ PE_{6A}\ \ldots\ PE_{1A}PE_{0A}$ In the event that the hardware herein is not being operated in the Chinese Remainder Theorem mode (to be discussed in more detail below), $PE_{OB}$ acts as a $PE_1$ and its "Select $PE_0$" signal input line is set to "one." There is also one other input control signal that is set to "one" in order to have $PE_{OB}$ act as a $PE_1$. In particular, this signal line is labeled "Auxiliary Select" in FIG. 13.

More particularly, control line "Select $PE_0$" controls the operation of multiplexors 404 and 406 and AND-gate 405. In the $PE_0$ mode of operation, the carry-in 1 signal line is supplied to adder 175 together with the signal from the previous PE signal line coming in to the modified rightmost processing element shown in FIG. 13. If it is not in "$PE_0$ mode," no carry input is supplied to adder 175. Likewise, based upon the state of the "Select $PE_0$" signal line, multiplexor 404 operates to select, as a carry input to the low order position of adder 175, either the usual carry-out signal from adder 165 or, in the event of non-$PE_0$ mode operation, the signal supplied to the carry input of adder 185 is the carry-in 2 signal. Apart from these variations, the rest of the circuits shown in FIG. 13 operate in substantially the same manner as their counterparts in FIG. 11.

FIG. 13 also introduces several other signal lines for proper operation in various hardware modes. As described above the "Auxiliary Select" signal line is a 2 bit signal taking on the values "00," "01," or "10." The "Auxiliary Select" line has the value "10" to $PE_{OB}$ above to concatenate $PE_{OB}$ with $PE_{7A}$ on its right in the case of non-CRT operation. This is the only time that the "Auxiliary Select" signal bus is set to this value. In the other cases, this signal line is set to "01" during the Z-phase (Select X/Z=1). The "00" value of "Auxiliary Select" selects the A, input used for the X-phase while the "01" value for this signal line selects the Y input for the Z-phase of operation.

With respect to the other signal lines present in FIG. 13, the "Select R or X" signal line is equivalent to "Select X/Z"; and the "Select $R_2$" signal line is driven independently when the Processing Elements are used to perform standard multiplication operations as opposed to modular multiplication. The "Select B or N" signal line assumes the value given by "Select X/Z" during the next clock cycle (that is, the anticipated version of "Select X/Z"). The reason for this is that the output of multiplexor 121 is used to select what is stored in BN register 198 which contains B during an X-phase and n during a Z-phase.

FIG. 14 illustrates modifications made to the circuit shown in FIG. 10 to accommodate repositioning adder 235 in FIG. 10 to a position in the signal flow path which reduces time criticality with respect to addition operations. With respect to the specific differences between FIGS. 10 and 14, it is noted that, in FIG. 14, it is no longer necessary to supply the low order k bit output from adder 285 to the processing element to the right. Additionally, it is noted that instead of the signal line being labeled $A_j/y$, the input signal line is labeled M to reflect the fact that multiplexor 131 in FIG. 13 now has three possible inputs to select from rather than just $A_j$ or y. The third input of multiplexor 131 (that is, the "Previous M" signal line) is used to concatenate $PE_{OB}$ to $PE_{7A}$ (as per the example given above) during non-CRT operations. This allows on-the-fly construction of a long chain of Processing Elements (sixteen in the example) versus two independent chains of half as many (that is, eight in the example) Processing Elements.

Additionally, adder 435' which is 2k bits wide is now interposed between its corresponding register set segment and adder 285. In particular, the output of adder 435' is supplied as the second input to adder 285 and the carry out of adder 435' is supplied to latch $C_3$ (reference numeral 436) which supplies the carry-out 3 signal line. The contents of register $R_{2p+2}$ (reference numeral 292') which is k bits in width is supplied as the lower k-bit portion of the left adder input under control of AND-gate array 401 which is in turn controlled by the signal line "Select $R_{2p+2}$." The contents of register $R_{2p+2}$ are also supplied as the upper k-bit portion of the left adder input under control of AND-gate array 403 which is in turn controlled by the "X/Z Select" signal line. The right input to adder 435' is also 2k bits in width and is supplied from AND-gate array 402 and from multiplexor 493. Under control of the "X/Z Select" signal line, multiplexor 493 provides either the contents of register $R_{2p+1}$ (reference numeral 291') or the contents of register $R_{2p}$ from the processing element on the right. The 2k-bit data portion supplied to the left input of adder 435' is controlled by AND-gate 401 and by AND-gate 403. The right 2k-bit input to adder 435' includes two portions one of which is a high order k bit wide portion which is either zero or the k-bit data portion coming from register $R_{2p+2}$ (reference numeral 292') control of AND-gate array 401 which is also under control of the "Select $R_2$" signal line. The lower order k bit wide portion of the right input to adder 435' is selected by multiplexor 493 to be either the contents of register 291' (that is, $R_{2p+1}$) or the contents of the 292' register (that is, $R_{2p}$) in the processing element to the right. The operation of the circuits described produces the result that adder 285 (FIG. 14) accumulates the results of the multiplication operations performed by multipliers 272 and 273 together with the output of adder 275. The left input of adder 285 is dependent on the phase of the operation for the Processor Element containing adder 285. For example, during the X-phase, the result is (00 . . . 0, $R_{2i+1}$) while during the Z-phase, the result is the binary sum ($R_{2i+1}$, $R_{2i}$)+($R_{2i+2}$, 00 . . . 0), where "00 . . . 0" is k bits wide. The term including $R_{2i+1}$ is added only during the Z-phase since, during the X-phase, this register value is still being updated by the Processing Element to the left. This aspect is best seen in FIG. 12.

Figure 15:
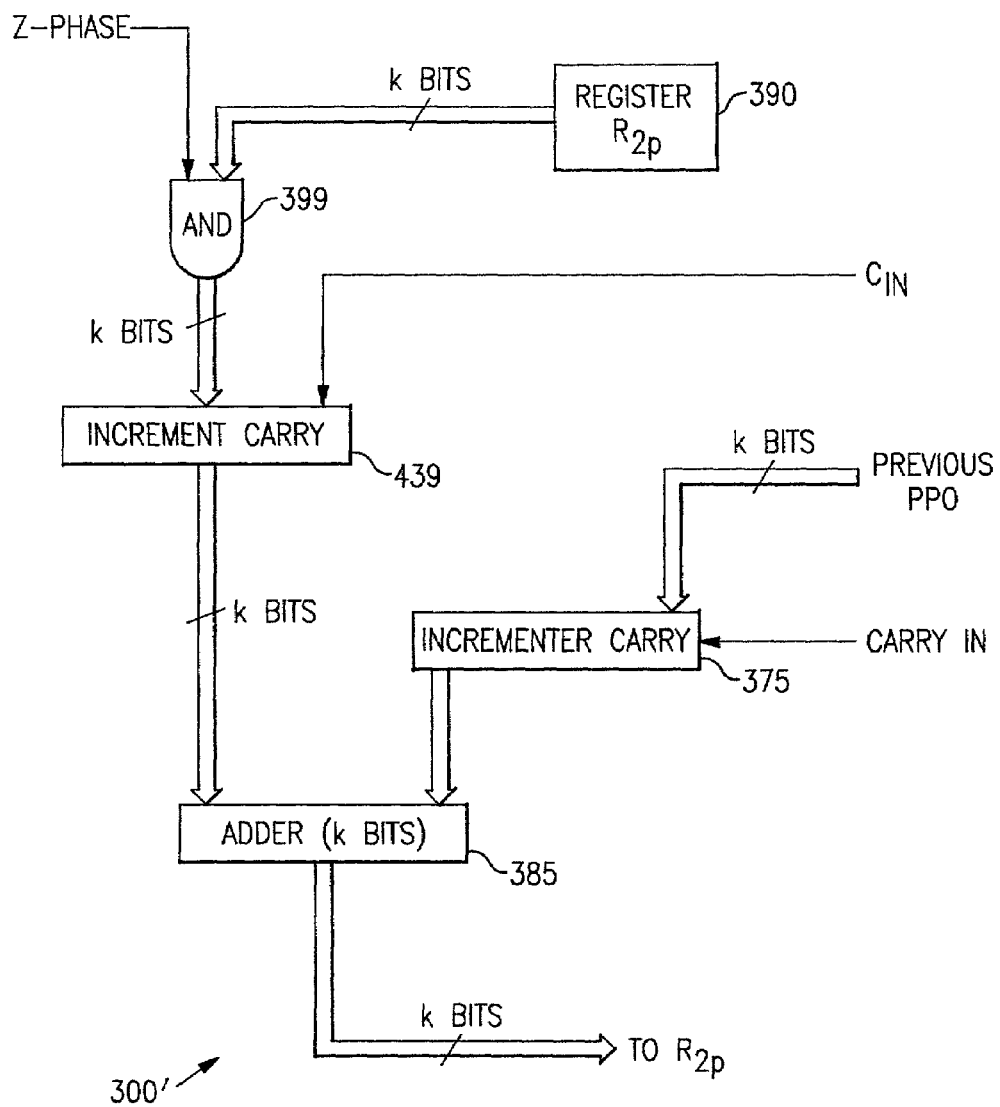
FIG. 15 is a block diagram illustrating a preferred design for the leftmost processor element in an improved pipelined configuration.

Additionally, it is noted that if one desires to employ a simplified leftmost processing element such as one that is similar to that shown in FIG. 6, modifications are made to this circuit to accommodate the improved pipelining version associated with FIGS. 13 and 14. In particular, this is accomplished by the inclusion of an increment-carry circuit 439 between previously employed AND-gate array 399 and k bit wide adder 385. The other signals supplied to increment carry circuit 439 is a carry input $C_m$, which comes from latch 436 in the processing element to the immediate right of the circuit shown in FIG. 15. In particular, this signal line is designated as carry-out 3 in FIG. 14. As above, the use of a simplified leftmost processing element ($PE_d$) is optional but is clearly desired for purposes of circuit simplification, speed, and cost. The Processing Element $PE_{END}$ or $PE_d$ includes the function of adding the previous PPO (Partial Product Out) from the PE to its right to the potential carryout signal from adder 435' which signal is temporarily stored in latch $C_3$ (436). This result is stored in register $R_{2p}$. During the Z-phase, the result of this operation is accumulated in register $R_{2p}$, as shown.

Figure 16:
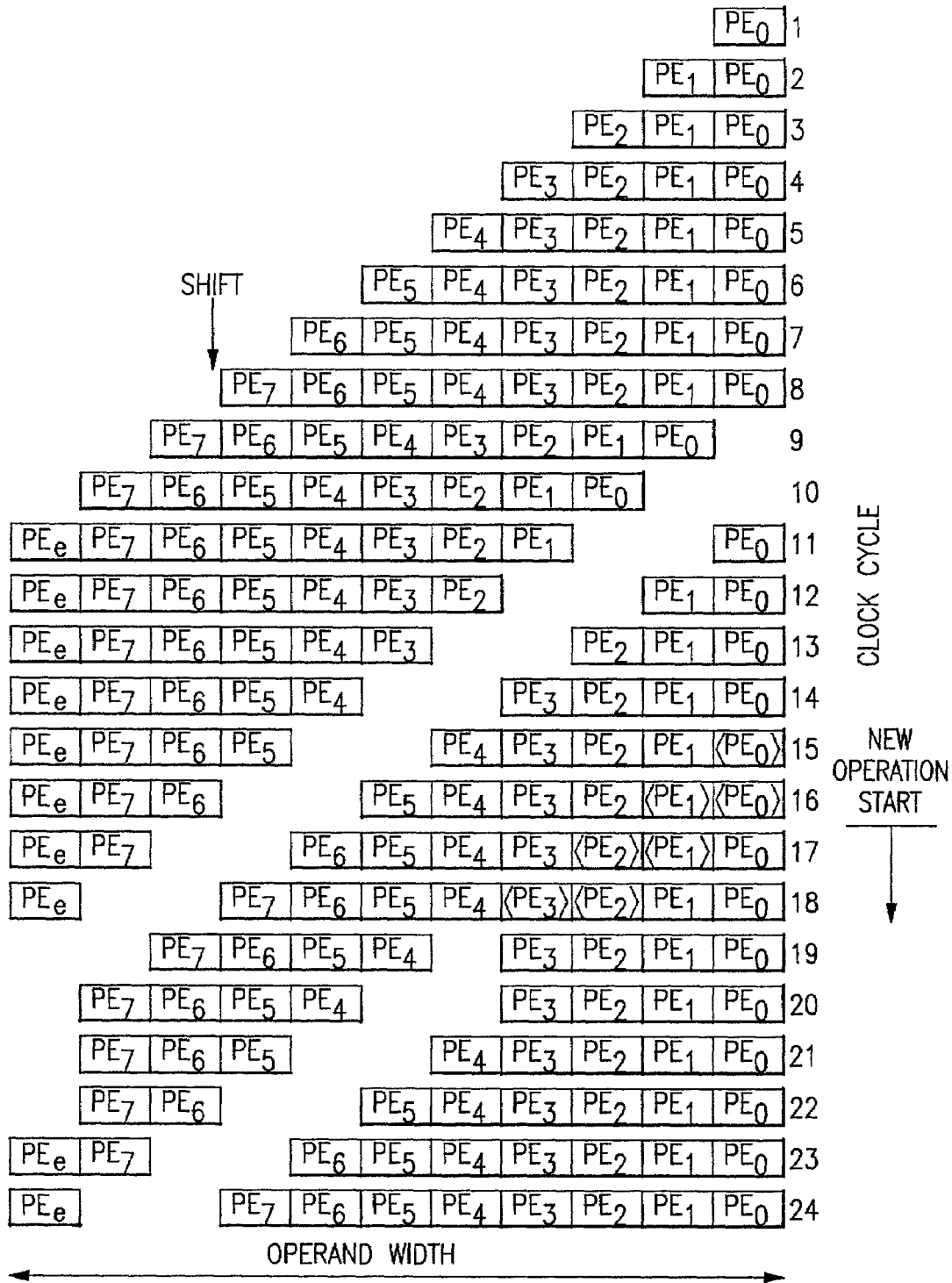
FIG. 16 illustrates processor element utilization in pipelined operations.

It is noted that it is also possible to utilize the pipelined version of the present invention to process operands that are actually in fact wider than the hardware present in the processing element chain width (n>>Wd or equivalently n>>mk). The method for carrying out this extra wide operation processing is illustrated in FIG. 16. In particular, each horizontal line in FIG. 16 represents a single clock cycle and each vertical column represents a slice of the data that is to be processed. Assuming that each processing element processes 64 bits of data (2k bits typically), the first column indicates that the lower k bits of the data are always processed by processing element $PE_0$. During the first clock cycle, only processing element $PE_0$ is active. All of the other processing elements are activated sequentially, clock cycle after clock cycle. This provides sufficient time to the previous processor element to generate the pipelined data for the next processing element. In fact, it is possible that the width of the operand is larger than the processing element chain itself. For example, in the discussions herein, the situation in which n=512 bits has been considered. However, in accordance with this aspect of the present invention, it is possible to process operands that are longer than 512 bits using a pipelined hardware structure which is designed for 512 bits. In such circumstances the clock cycle after the first processing element is activated, the entire processing element chain is shifted left by 2k bits (see FIG. 16) leaving the lower two k bits unprocessed. This shifting continues until the upper processing element (in this case, $PE_8$) is capable of processing the upper 2k bits of the operand. Following this, the processing element chain, instead of shifting back to the home position, stays in place with the exception of the rightmost processing element $PE_0$. The lower processing element, after the others go into a home position, continues processing the lower two k-bit slice of the operand. When all of the processor elements are back in their home positions, the entire chain starts a shift left as before. This mechanism allows all of the processing elements to be busy all of the time and, accordingly, achieves a maximum performance level. Additionally, a new operation can start before the previous operation is finished. The approach described herein provides maximal performance in the sense that all of the Processing Elements are always busy. Additionally, the next operation can be started immediately without any delay and without idling any of the Processor Elements. Furthermore, these operations are fully compatible with the pipelined approach as described above.

Figure 17:
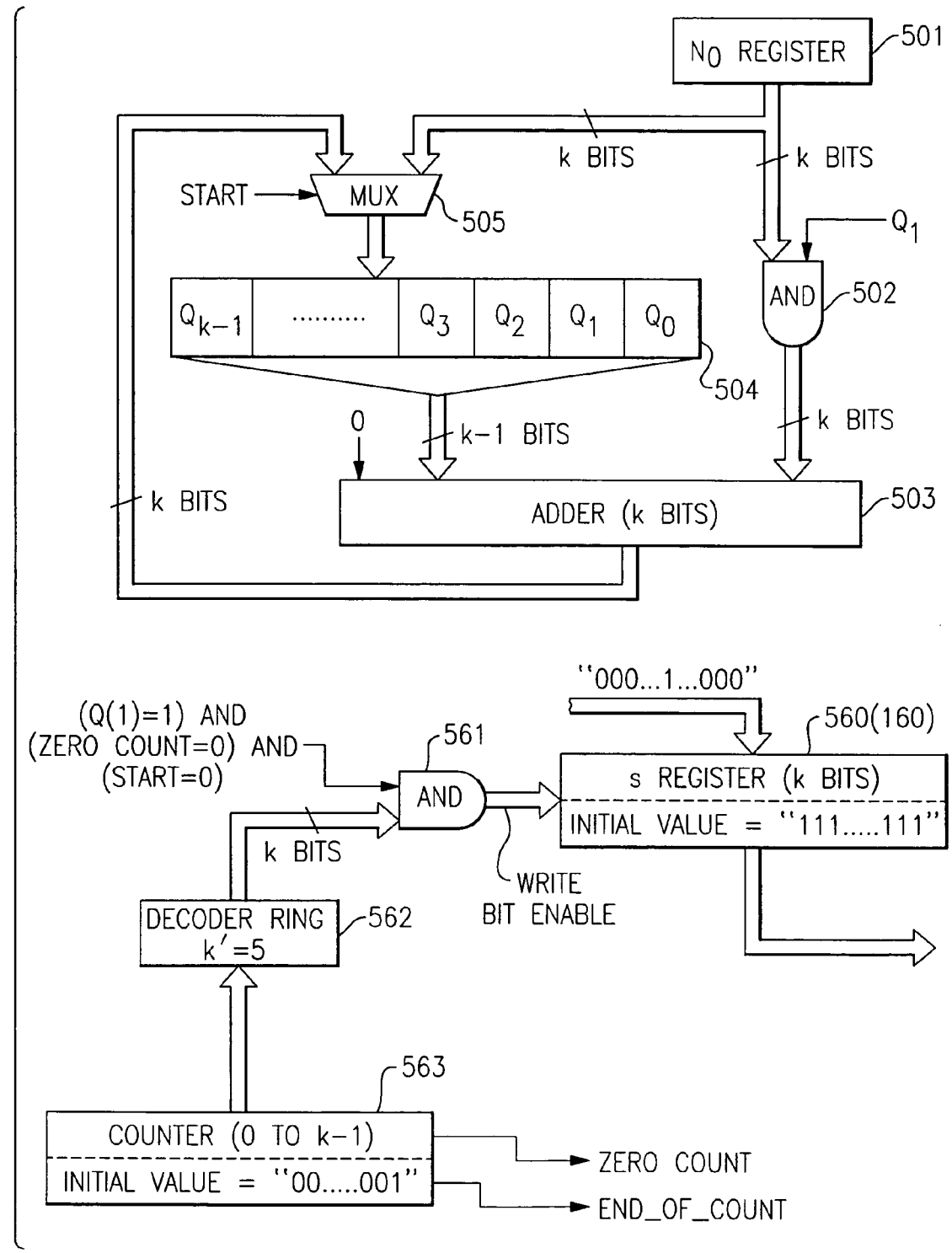
FIG. 17 is a block diagram illustrating a circuit for calculating the negative modular inverse of a number.

As indicated very early above in the description for the present algorithm for computing AB mod N, it is desirable to begin the calculation with a value s which is equal to the negative inverse of the value $N_0$ where the inverse is now taken modulo R where $R=2^k$. That is to say, in the initial presentation of the algorithm employed herein, the availability of the value $s=-1/N_0$ mod R was assumed. A circuit for carrying out this calculation is illustrated in FIG. 17 which shows, in its upper portion, a circuit for calculating successive values of the variable Q and correspondingly illustrates a circuit in its lower portion for calculating a companion variable S which ultimately becomes the desired $s=-1/N_0$ mod $2^k$. In this regard, it is noted that the circuit shown in FIG. 17 actually performs two operations. Firstly, it computes a multiplicative inverse modulo, a number which is a power of 2, and also at the same time computes the additive inverse of the multiplicative inverse. In ordinary, non-modular arithmetic, the computation of an additive inverse is a relatively simple operation requiring either the addition or change of a single bit at the leftmost portion of a representative number or at most the addition of a 1 to the low order position depending upon the format in which the numbers are stored. However, in the case of modular addition, it is noted that the operation cannot be carried out as simply as it is for ordinary, non-modular arithmetic. Accordingly, it is noted that the circuit shown in FIG. 17 actually carries out simultaneously two nontrivial operations modulo R. In particular, it computes a multiplicative inverse while at the same time ensures that the final result is the negative additive inverse modulo $R=2^k$.

In the context of the present invention, the algorithm set forth above for computing AB mod N employs the variable $s=-1/N_0$ modulo R. However, the circuit shown in FIG. 17 is capable of generating the negative multiplicative inverse of any k-bit number A initially stored in the $N_0$ register (reference numeral 501). The method employed for carrying out the formation of the desired negative multiplicative inverse is set forth below. The inputs to the process are the values k and the number whose negative multiplicative is desired, namely, A which is expressible as an ordered k-tuple of the form $(a_{k-1}, \ldots, a_1, a_0)$. The desired output of this process is a variable $s=-1/A$ modulo $2^k$. In the process described below, the variable s is initially set equal to the value $2^k-1$. The variable A is also initially loaded into the Q register (reference numeral 504) at the start of the process. Accordingly, if the "Start" signal line is "1," then multiplexor 505 selects as its output the contents of register 501 which contain the value $N_0$ or, more generally, a variable A whose negative multiple inverse is to be generated. Multiplexor 505 also receives as an input the output of k bit adder 503. This adder has two inputs, namely, the leftmost k−1 bits from Q register 504 and a k bit input the value of A as stored in register 501. Adder 503 also effectively performs a shift right operation under circumstances to be described more particularly below, and accordingly, a zero high-order bit is added as appropriate to effect this shift operation with zeros being shifted into the high-order position.

The process for carrying out the desired calculation resulting in the variable S being transformed to $-1/A$ mod $2^k$ is set forth below:

Set $S=2^k-1$
Set Q=A
For i=1 to (k−1) do:
   Right shift Q one bit
   If rightmost bit of Q, namely $Q_i=1$, then
      $S=S-2^i$;
      Q=Q+A
   end if,
End for.

Accordingly, it is seen that the process in this embodiment of the present invention occurs in k−1 steps. At the last step, the contents of the S register are equal to the desired negative multiplicative inverse of A (or $N_0$ for the specific purposes of the present invention). It is also seen that the process for calculating the negative multiplicative inverse employs the concomitant calculation and updating of two variables, S and Q. The upper portion of FIG. 17 illustrates the updating and calculation of the variable Q. In particular, it is noted that if the rightmost bit of Q (that is, $Q_1$) is 1 then, via the utilization of AND-gate array 502, the contents of register 501 are added to the current value of Q from Q register 504 with the output being stored back in the Q register via multiplexor 505. It is noted that, at this stage of operation, the "Start" signal line is not equal to "1" and, accordingly, multiplexor 505 selects as its input the output of adder 503. Otherwise, the initialization Q=A is carried out.

The circuit in the lower portion of FIG. 17 calculates the companion variable S which is also the desired output at the end of the process. It is noted that in the updating of the variable S, in accordance with the process indicated above, one performs a subtraction from the current value of S by an amount which is equal to a power of 2 ($S=S-2^i$). To effect the desired process, S register 560 is initially loaded with a value which is "all ones" representing the integer $2^k-1$.

AND-gate array 561 controls the writing of particular bits into the S register. In particular as seen in FIG. 17, a k bit wide vector from AND-gate array 561 is available for writing into register 560. AND-gate array 561 permits, during each clock cycle if necessary, the writing of a k bit vector into S register 560. The selection of which vector is controlled by the current value in counter 563 which counts upwards from 0 to k−1, and then immediately back to zero again in a rollover fashion. In the examples of the present invention described above, k is typically equal to 32 bits. As such, counter 563 need contain only 5 bits. In general, counter 563 contains k'=$\log_2$ k. Thus, decoder ring 562 receives k'=5 bits and produces as an output a k bit vector, only one of whose entries is 1. This is the essential operational feature of a decoder circuit. Counter 563 also supplies a signal line "ZeroCount" which is a "1" when the counter is all zeros. This signal line is also supplied to AND-gate array 561 which triggers a write-enable bit when Q(1) is "1" and the ZeroCount signal line is false and the Start signal line is false. Accordingly, under these circumstances, AND-gate array 561, in accordance with the algorithm described above, then permits the writing of a 0 bit into the corresponding portion of S register 560 as determined by the current value in register 563 which, in effect, contains the variable i recited in the algorithm listed above for negative multiplicative inverse calculation. It is in this fashion that the value of S is updated to S=S−$2^i$. Finally, at the end of the calculation, the value in the S register, which is initially set equal to all ones, is now equal to the negative multiplicative inverse modulo R of the value that was stored in the $N_0$ register 501.

If instead of (−1/A) mod N, one wishes to calculate (1/A) mod N, one can employ the following algorithm:

Set S=1
Set Q=A
For i=1 to (k−1) do:
   Right shift Q one bit
   If rightmost bit of Q, namely $Q_1$=1, then
     S=S+$2^i$ (that is, set bit i to 1);
     Q=Q+A
   end if,
End for.

Accordingly, there is provided a circuit and a process for producing in a single set of operations not only the multiplicative inverse modulo R of a given number, but also, its arithmetic negative value modulo the same value R. For purposes of the multiplication algorithm of AB mod N described above, it is noted that it is the circuits shown in FIG. 17 which are preferably employed for the calculation of the variable s=−1/$N_0$ mod R which is stored in registers 60 in FIG. 1, 160 in FIGS. 4 and 4A, 160 in FIG. 11, and 160 in FIG. 13.

As discussed above, a primary purpose of the present invention is the multiplication of large integers modulo N for cryptographic purposes. Since cryptography often involves the exponentiation operation, the use of the present hardware to perform exponentiation is now described.

The relevant circuits and materials described above can be considered as implementing a specific function, f, with the following properties:

f(A, B)=A B $2^{-mk}$ mod N;
f(A $2^{mk}$, B $2^{mk}$)=A B $2^{mk}$ mod N;
f(A $2^{mk}$, 1)=A mod N;
if A<$2^N$ and B<$2^N$, then f(A, B)<2N; and
if A<$2^N$ and A∂N, then f(A, 1)<N.

In the above, the problem has been partitioned into m "words" of k bits each where mk≧n+2 where n is the number of bits in the binary representation of N. And as above, $N^o$ is the least significant k bits of N. And N is, of course, odd.

In the discussion above, it was pointed out that multiplication modulo N would normally be carried out in a two step process:

Step 1: $Result_1$=f(A, B)=A B $2^{-mk}$ mod N
Step 2: $Result_2$=f($Result_1$, $2^{2mk}$)=A B mod N.

From the above properties of f, it is seen that premultiplication of either A or B by $2^{mk}$ produces the same result in one step:

Result=f(A $2^{mk}$, B)=f(A, B $2^{mk}$)=A B mod N.

This is clearly the preferred approach for performing modular multiplication in one shot situation since premultiplication by $2^{mk}$ is easily performed via a shift operation. However, in the case of exponentiation, one uses the modular multiplication function, as implemented in the hardware described above, in a repeated fashion. In the present case then, exponentiation is carried out in a repeated fashion, but now one must deal with the fact hat there is a factor of $2^{-mk}$ present in the output of each iteration of the function, f; that is to say, f(A, B)=A B $2^{-mk}$ mod N. Accordingly, in the present invention, the hardware implemented function f is used but with the factor $2^{mk}$ being "preapplied" to both of the multiplicands, A and B, as follows: f(A $2^{mk}$, B $2^{mk}$)=A B $2^{-mk}$ mod N. This way, since the function f introduces a factor of $2^{-mk}$ at each step, repeated iterations using preapplication of the $2^{mk}$ factor to both operands keeps a constant factor of $2^{mk}$ as part of the result. As a last step this factor is removed using the function f as implemented by the present hardware in the following manner: f(A $2^{mk}$, 1)=A mod N. Therefore, at the last iteration in an exponentiation operation, A is the output from previous repeated applications of the function f.

In order to see that this value of A going into the f function hardware at this stage is constructed as an appropriate exponential, consider the general case of constructing the value $A^E$ mod N where E is an integer and in particular is an integer represented by the t+1 bit binary value $$e_t 2^t + e_{t-1} 2^{t-1} + \ldots + e_2 2^2 + e_1 2 + e_0 = \sum_{i=0}^{t} e_i 2^i,$$

where $e_l$ is either "1" or "0." Here, advantage is taken of the fact that a sum in an exponent becomes a product ($a^{x+y}$=$a^x a^y$) so that:

$$A^E = \prod_{i=0}^{t} A^{2^i e_i} = \prod_{i=0}^{t} (A^{2^i})^{e_i} = \prod_{i=0}^{t} (A^2)^{i \cdot e_i}.$$

Based upon this expression for $A^E$ in terms of the binary integer E, it is seen that the following algorithm provides a method for using the hardware for the function f herein to produce the result $A^E$ mod N, a result which is very important for cryptographic operations and particularly important for public key cryptographic systems. Here, N, K, M, $N_0$ and s (=−1/$N_0$ mod R where R=$2^k$) are as given above. The inputs to the method are the values A and E with E being a t+1 bit binary integer. The method is summarized in the following outline:

Set $C=2^{2mk}$ mod N
$Z_0=f(A, C)$
$Z=Z_0$
For i=1 to t
 $Z=f(Z, Z)$
 If $e_{i-4}=1$, then $Z=f(Z, Z_0)$, else continue
End For
$Z=f(1, Z)$ Thus, at the end of this method the value stored in the Z register is $A_E$ mod N, as desired. This procedure is also summarized in the flow chart shown as FIG. 18.

Figure 19:
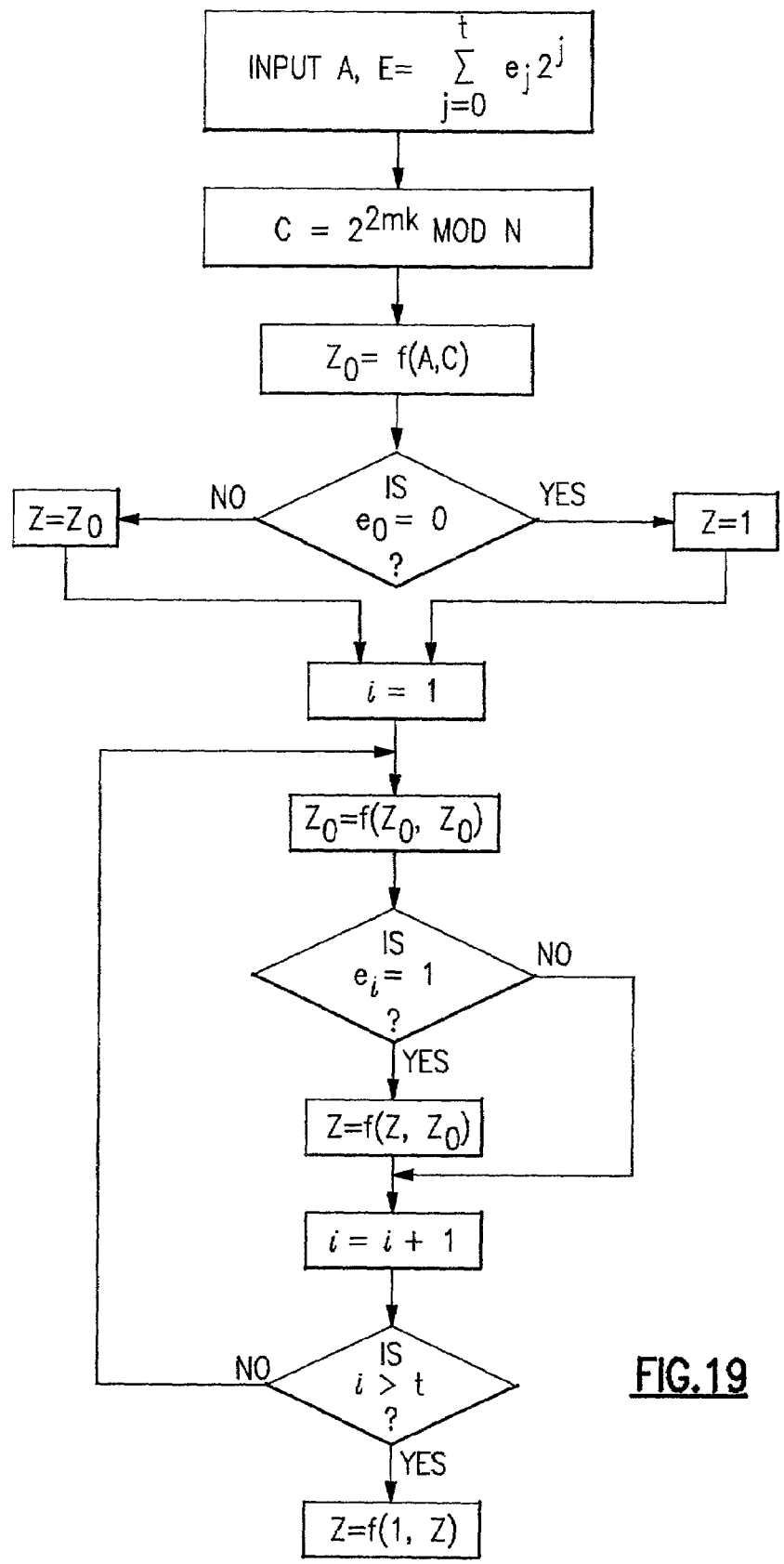
FIG. 19 is a flow chart similar to FIG. 18 but exhibiting an alternative algorithm for implementing a modular exponentiation function.

A slightly different form of the exponentiation algorithm is implemented in FIG. 19. It is also described in the pseudo code provided below:

Set $C=2^{mk}$ mod N
$Z_0=f(A, C)$
If $e^0=0$, then set Z=1, else set $Z=Z_0$.
For i=1 to t
 $Z_0=f(Z_0, Z_0)$
 If $e_i=1$, then $Z=f(Z, Z_0)$, else continue
End For
$Z=f(1, Z)$ In constructing circuits for implementing either of these methods for modular exponentiation, it should be noted that f is a symmetric function so that f(A, B)=f(B, A). If f is instead viewed as an operator, this condition is referred to as commutivity. Thus, circuits implementing f can have their inputs switched with no change in operation. One also notes in the algorithm set forth immediately above that $e_0$ is the lowest order bit in the binary representation for the exponent E. As such, for the cryptographic purposes described herein, one notes that N is an odd number. Thus, it's lowest order bit position is always 1. Thus, for cryptographic purposes the step which tests to see if $e_0=0$ can be eliminated.

Figure 20:
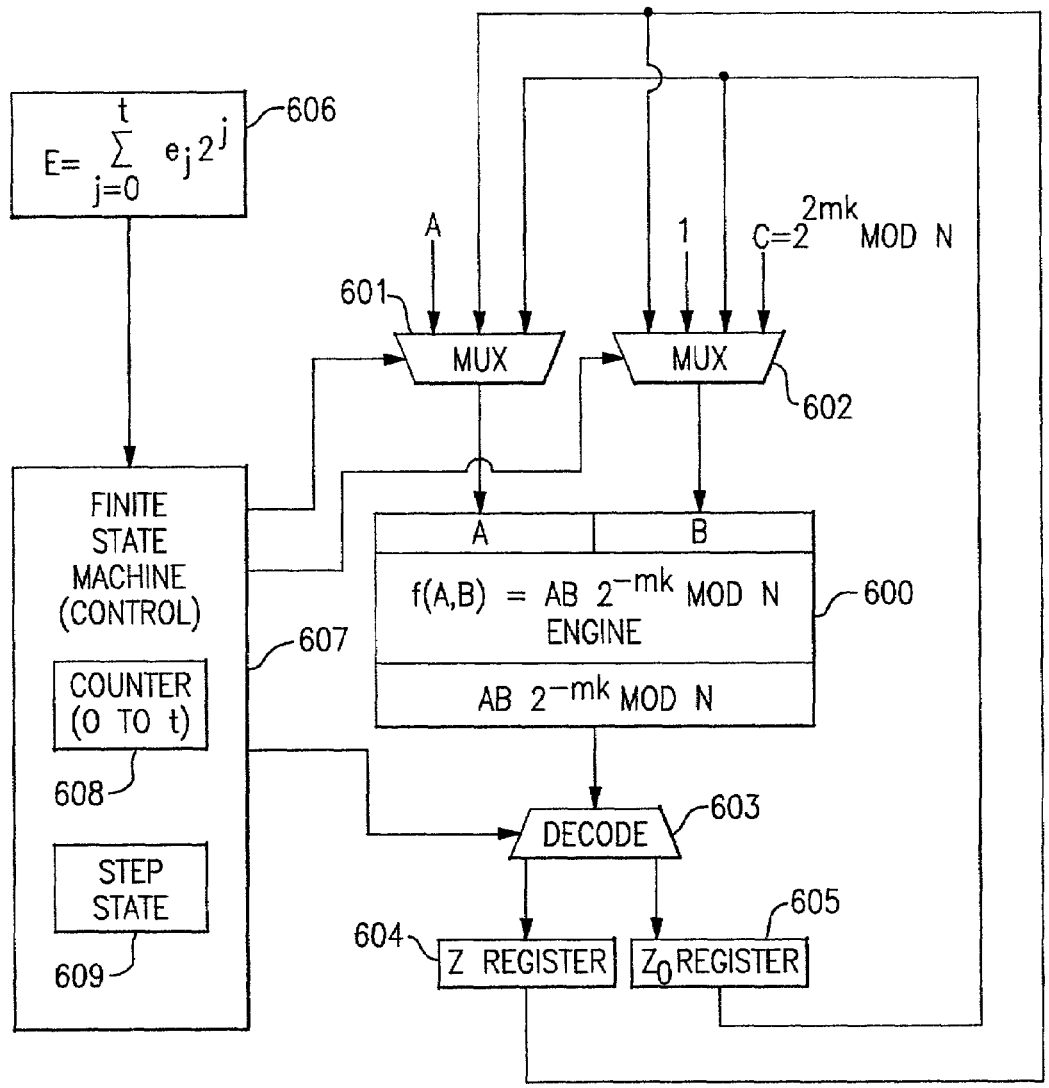
FIG. 20 is a block diagram of a circuit for implementing either one of the algorithms shown in FIG. 18 or 19.

As an example, a circuit which can implement either one of the algorithms for exponentiation is shown in FIG. 20. The core of this exponentiation circuit is provided by an engine which implements the f(A, B)=A B $2^{-mk}$ mod N function. Thus, engine 600 may be implemented by means of any of the hardware components described above which performs this function. The output from multiplication modulo N engine 600 is provided to decoder 603 which operates under control of finite state machine (FSM) 607 to store this output either in Z register 604 or in $Z_0$ register 605, or in both (to provide the $Z=Z_0$ step in the algorithm of FIG. 18), as needed. Thus, decoder 603 does not always function in accordance within the standard operational definition of a "decoder" which would normally have only one set of output lines carrying information. If the circuit of FIG. 20 is intended to implement either of the exponentiation algorithms herein, then the outputs of registers 604 and 605 (Z and $Z_0$) are both provided as inputs to multiplexors 601 (for input A) and 602 (for input B). These multiplexors are also provided with constants 1 and $C=2^{-2mk}$ mod N. It is noted, however, that the constant "1" could also have been provided instead as an input to multiplexor 601. However, the constant C and the input A (which is used for computing $A^E$ mod N) need to be provided to different ones of multiplexors 601 and 602 for the purpose of calculating the value $Z_0=f(A, C)$. Multiplexors 601 and 602 and decoder 603 all operate under control of controller 607 which is preferably implemented as a Finite State Machine which can have as few as 6 states which depend only on the contents of index counter 608 (which counts from 0 to t and then resets back to 0) and on the $i^{th}$ selected bit $e_i$ from register 606 which contains the exponent E in binary form.

Figure 18:
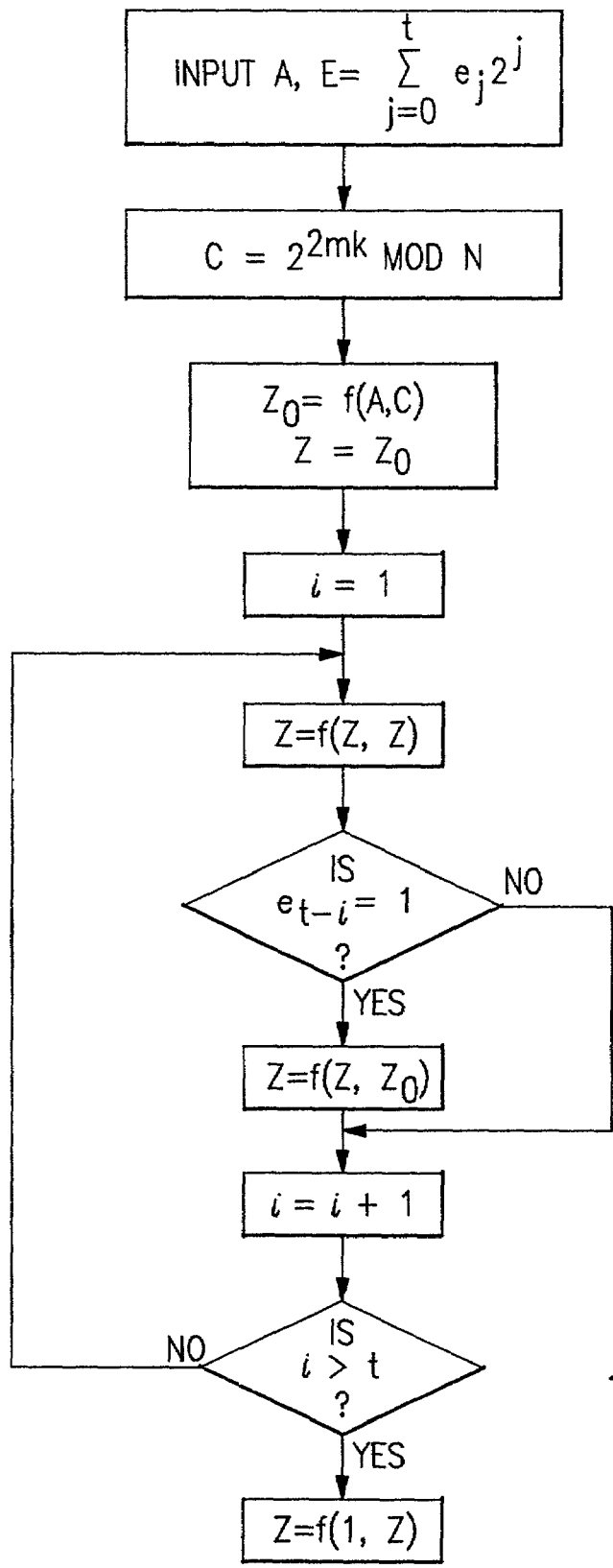
FIG. 18 is a flow chart illustrating a method for using circuits which implement modular multiplication in a fashion so as to further implement the exponentiation function.

For example, in implementing the algorithm illustrated in FIG. 18, when counter 608 is at 0, controller 607 selects the A input for multiplexor 601 and the C input for multiplexor 602. It is also noted that, for both algorithms, the initialization and repetition aspects both involve two steps. Accordingly, FSM 607 also includes one-bit register 609 (step state register) which is indicative of this step state. Having used multiplexors 601 and 602 to select A and C as inputs to engine 600, FSM 607 also controls decoder (or router, if you will) 603 to store the output f(A, C)= A C $2^{-mk}$ mod N into $Z_0$ register 605. The design of FSM's for such purposes is standard and is well known and is, for example, described in the text "Digital Logic and Computer Design" by M. Morris Mano, Copyright 1979 by Prentice-Hall.

In the use of the CRT as described above it is seen that one requires the constant C defined as $2^{+2mk}$ mod N. While the constant $2^{2mk}$ is generally easy to determine and construct, the inclusion of the need for this to be modulo N is a complicating factor. Note here too that it is the case that mk≧n+2 where n is the number of bits in N and that m is picked to be the smallest integer satisfying this relationship. Thus $2^{+2mk}$ is always going to be greater than N and hence the modulo N form is needed. However, this constant is readily calculable using the f engine described above. One first calculates $T=2^{mk+t}$ for a small value of t. The f engine is then used repeatedly as follows:

$$f(T, T) = 2^{mk+t}2^{mk+t}2^{-mk} \bmod N,$$
$$= 2^{mk+2t} \bmod N$$
$$f(2^{mk+2t}, 2^{mk+2t}) = 2^{mk+4t} \bmod N,$$
$$f(2^{mk+4t}, 2^{mk+4t}) = 2^{mk+8t} \bmod N, \text{ etc.}$$

This process is repeated until the first time that the result is greater than N.

In public key cryptographic systems someone who wants to receive information picks two (large) prime numbers $N_p$ and $N_q$ and publishes only their product $N=N_p N_q$. The potential receiver then generates (or otherwise creates, often randomly) a public key E which is also published. Before publication, however, the receiver-to-be checks to make sure that E is relatively prime with the respect to the product $(N_p-1)(N_q-1)$. This is easily done since the receiver knows both $N_p$ and $N_q$. With N and E thus known to the public, anyone wishing to transmit a message A destined for the receiver can form the encrypted version c of the message by computing $c=A^E$ mod N. Thus, encryption is an exponentiation operation modulo N. It is the "modulo N" aspect which makes this a nonstandard arithmetic problem. However, the systems provided herein are particularly capable of performing the $A^E$ mod N operation.

At the receiving end the message is decrypted as $A=c^D$ mod N, where, as above, c is the received/encrypted message and where D is a private key known only to the receiver and which is calculated as $D=E^{-1}$ mod $[(N_p-1)(N_q-1)]$. This is something which can be computed by the receiver since the receiver (and only the receiver) knows the values $N_q$ and $N_p$. (Since $N=N_p N_q$ is a large number, typically with thousands of bits, even though N be known, its factors, the prime numbers $N_q$ and $N_p$ are very hard to determine. This fact lies at the heart of public key cryptography.) The receiver also computes, actually precomputes, several other values that are useful in efficient decryption. In particular, the receiver computes two values U, $D_p$ and $D_q$ as follows:

$U=(1/N_q)$ mod $N_p$,
$D_p=D$ mod $(N_p-1)$,
$D_q=D$ mod $(N_q-1)$.

Figure 21:
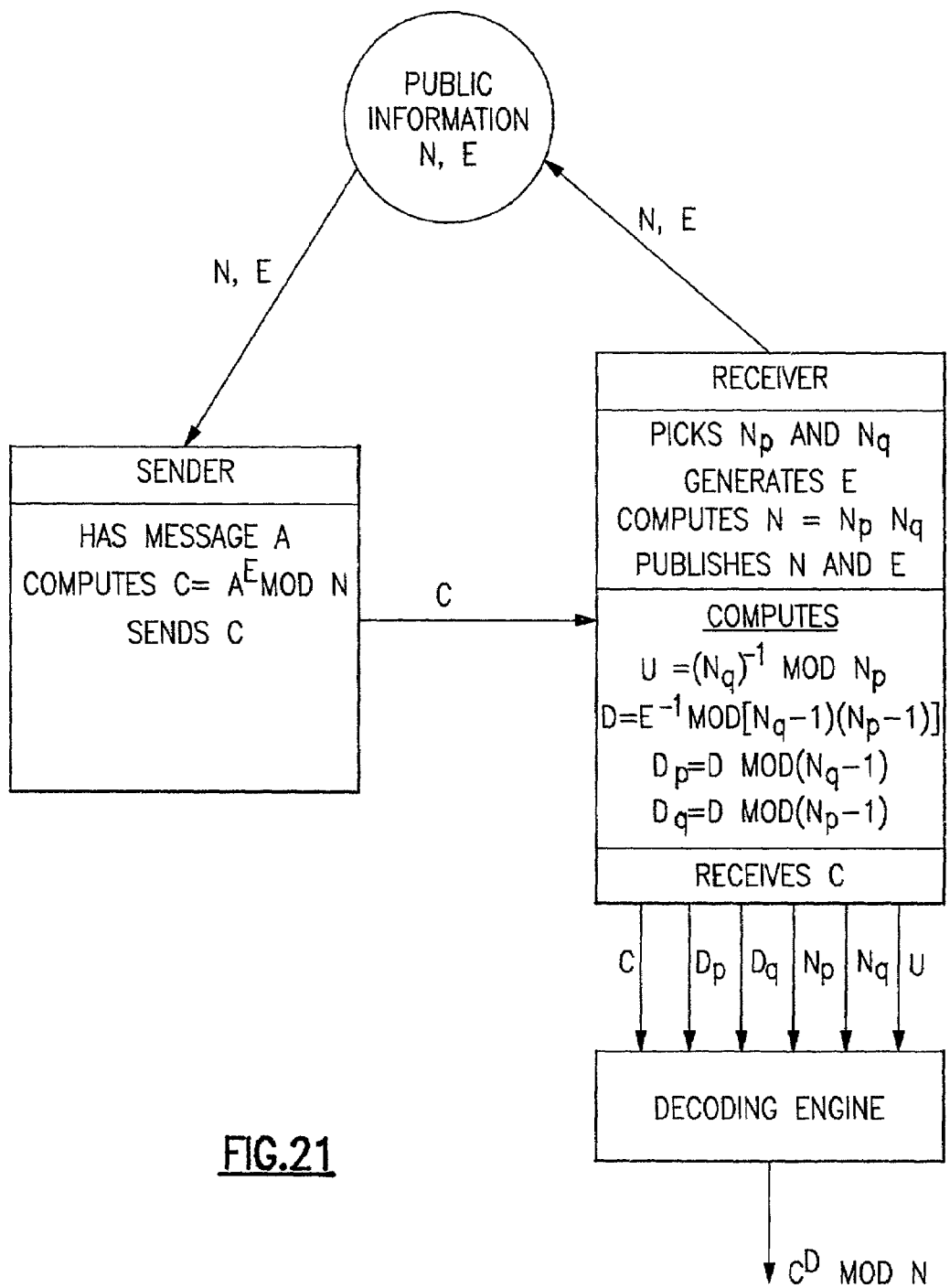
FIG. 21 is a block diagram illustrating public key encryption and decryption processes particularly as it employs exponentiation operations, and more particularly illustrates the presence of signal variables used for efficiency improvements.

These values render it possible to more efficiently construct the desired result which is $C_D$ mod N. This process is more particularly illustrated in FIG. 21. (Coded message c is not to be confused with the constant $C=2^{+2mk}$ used above.)

Advantage is now taken of the fact that the receiver, knowing $N_p$ and $N_q$ is able to calculate U, $D_p$ and $D_q$ so that advantage maybe taken of the Chinese Remainder Theorem. The coded message c is an integer between 0 and $N=N_p N_q$ where gcd $(N_p, N_q)=1$ end where "gcd" stands for "greatest common denominator." If $c_p=c$ mod $N_p$ and $c_q=c$ mod $N_q$ then the CRT implies that c may be computed as follows:

$c=c_q+(N_q((c_p-c_q) \bmod N_p)U)$ mod $N_p$, where U is as defined above. This result is now more particularly applied to the computation of $C^D$ mod N, one first considers $(c^D)_p$ which is defined as $c^D$ mod $N_p$. Likewise, one also considers $(C^D)_q$ which is similarly defined as $c^D$ mod $N_q$. Note that (c mod $N_p)^D$ mod $N_p$=(c mod $N_p)^{D_p}$ where $D_p=D$ mod $(N_p-1)$. Similarly, (c mod $N_q)^D$ mod $N_q$=(c mod $N_q)D_q$ where, similarly $D_q= D$ mod $(N_q-1)$. Thus, given c, $D_p$, $D_q$, $N_p$, $N_q$ and U the exponential $c^D$ mod N can be calculated in three steps:

Step 1. $c_p=c$ mod $N_p$; $c_q=c$ mod $N_q$.
Step 2. $(c_p)_D=(c_p)^{D_p}$ mod $N_p$; $(C_q)D=(C_q)^{D_q}$ mod $N_q$.
Step 3. $c^D$ mod $N=(c_q)_D+[N_q(((c_p)_D-(c_q)_D) \bmod N_p)$ U] mod $N_p$.

Step 2 above is readily carried out using the methods set forth in FIGS. 18 and 19. Step 3 is a straightforward calculation not involving exponentiation. Furthermore, as indicated above it is possible to split the sequence of Processing Elements into two chains which together calculate $(c_p)_D$ and $(c_q)_D$ simultaneously.

Attention is now directed to a method for further simplifying the computation shown in step 1 immediately above. Since the input to the process is a relatively large number, perhaps being represented by as many as 2,048 bits, the calculation can be time consuming. However, the modular reduction is based on numbers $N_p$ and N, which are often roughly only half that size. Suppose then that, phrased more generally, one wishes to compute $A_p=A$ mod $N_p$ and likewise $A_q=A$ mod $N_q$. Without loss in generality one may assume that $N_p>N_q$. Suppose further that $n_p$ and $n_q$ are the number of bits in the binary representations for $N_p$ and $N_q$, respectively. Suppose even further that one picks values $m_p$ and $m_q$ such that these are the smallest integers for which:

$m_p k \geq n_p+2$, and
$m_q k \geq n_q+2$, where k is the word size in the circuits described above for modular multiplication. With these parameters one may now write A in either of the two forms:

$A=A_{1p}2_{2mpk}+A_{0p}$,
or
$A=A_{1q}2^{mqk}+A_{0q}$, depending on whether one wishes to compute either $A_p$ or $A_q$, both of which are employable in the application of the CRT as described above. If A is of the order of 2,048 bits, then: $n_p+n_q \leq 2048$; and in general: $0 \leq A_{0p} \leq 2^{mpk}$; $0 \leq A_{0q} \leq 2^{mqk}$; $0 \leq A_{1p} \leq N_p$; and $0 \leq A_{1q} \leq N_p$. One further defines two constants $C_p=2^{+2mpk}$ mod $N_p$ and $C_q=2^{+2mqk}$ mod $N_q$. These constants have substantially the same role as the constant $C=2^{+2mk}$ mod N discussed above, but now these new constants are employed to facilitate computation on a smaller scale problem in accordance with the representation of A as having two parts ($A_{1p}$ and $A_{0p}$, for the mod $N_p$ calculation and $A_{1q}$ and $A_{0q}$ for the mod $N_q$ computation.)

As indicated above the present inventors have provided circuits for construction of an engine which implements the function $f(A, B)=A B \, 2^{-mk}$ mod N. This engine/circuit is also fully capable of implementing different functions in dependence on the m and N parameters. Accordingly, the functions $f_p$ and $f_q$ are defined as follows:

$f_p(A, B)=A B \, 2^{-mpk}$ mod $N_p$,
and
$f_q(A, B)=A B \, 2^{-mqk}$ mod $N_q$.

Consider first the use of $f_p$ in the calculation of $A_p$ based on the use of the two part representation of A as $A_{1p}2^{mpk}+A_{0p}$:

$$a = f_p(A_{0p}, 1) = A_{0p}2^{-mpk} \bmod N_p$$
$$b = f_p(A_{1p}2^{mpk}, 1) = A_{1p} \bmod N_p$$
$$g = a + b = A_{1p} + A_{0p}2^{-mpk} \bmod N_p$$
$$\begin{aligned} f_p(g, C_p) &= g2^{-mpk}2^{+2mpk} \bmod N_p, \\ &= g2^{mpk} \bmod N_p, \\ &= A_{1p}2^{mpk} + A_{0p} \bmod N_p \\ &= A \bmod N_p \\ &= A_p \end{aligned}$$

In the same manner one uses the circuits herein to compute $A_q$ using the parameters $m_q$ and $N_q$ to produced $f_q$ as defined above.

Figure 22:
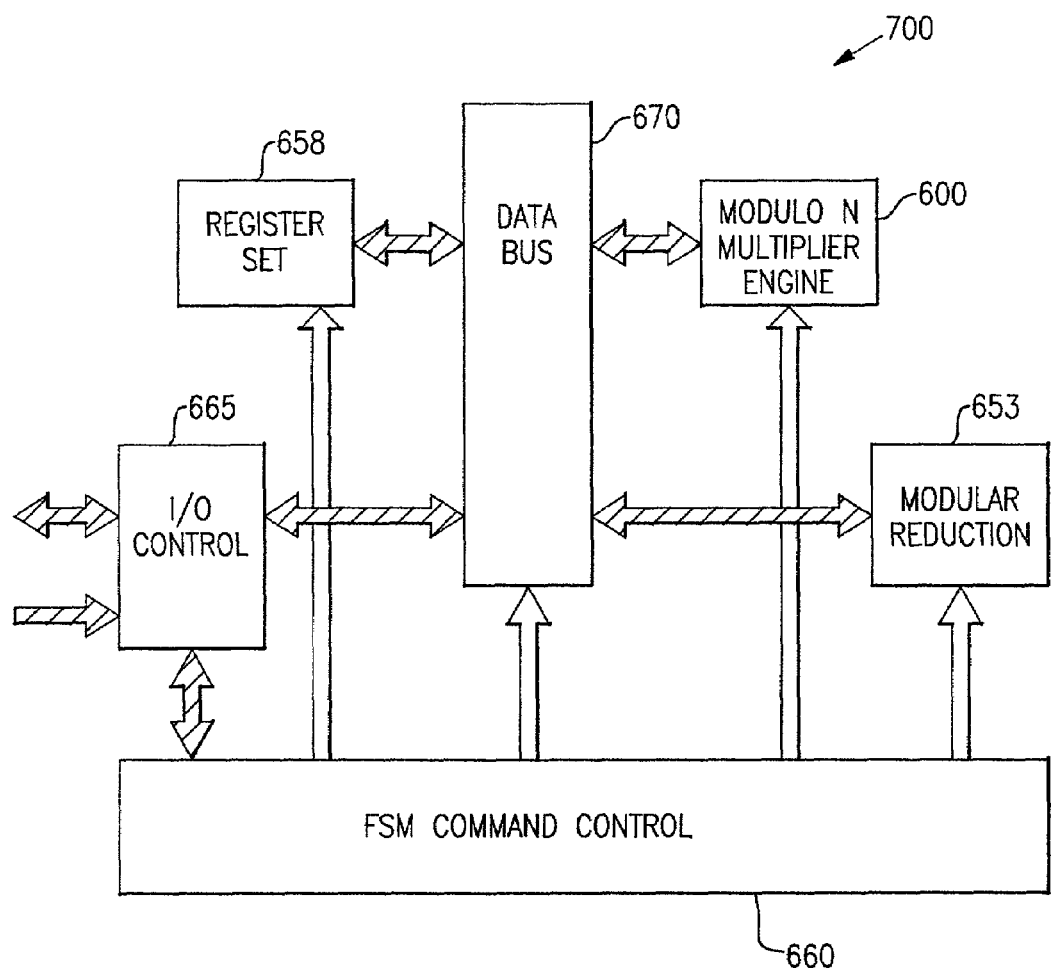
FIG. 22 is an overall block diagram view illustrating one embodiment of a cryptographic engine constructed in accordance with the present invention.

The overall structure for a preferred embodiment of cryptographic engine 700 employing the circuit and operational principles set forth above is shown in FIG. 22. The main feature of cryptographic engine 700 is the inclusion of modulo N multiplier 600 as described above. It is noted that, as implemented herein as a sequence of independent Processing Elements (PE's), multiplier engine 600 is dividable into two pieces by the operation of electrically controlling a Processing Element so as to cause it to operate as a "$PE_0$" element. This is particularly useful during decryption operations since in this circumstance the receiver knows both $N_p$ and $N_q$, whereas during encryption the sender knows only the product $N=N_p N_q$.

For the calculation of $A^B$ mod N, register set 658 contains registers for holding the following values: A, $B_p$, $B_q$, $N_p$, $N_q$ and U, where $B_p=B$ mod $(N_p-1)$ and $B_q=B$ mod $(N_q-1)$. Register set 658 also preferably includes at least two utility registers for holding temporary and/or intermediate results. In particular two such utility registers are preferably employed to contain the values $A_{1q}$ and $A_{0q}$ as described above, with $A_{0p}$ and $A_{1p}$ being thus stored in the AH and AL registers respectively. Clearly, the roles of these two utility registers are interchangeable. Register set 658 also includes an output register which contains output results from multiplier engine 600.

Cryptographic engine 700 also includes modular reduction unit 653 (also described herein as Auxiliary Computation circuit in FIG. 23) which performs addition and subtraction operations and performs single shot modular reductions.

The flow of signals across databus 670 between register set 658 to and from multiplier engine 600 and modular reduction unit 653 is carried out under control of Finite State Machine (FSM) Command Control Unit 660 in accordance with the methods, algorithms, and protocols set forth above for carrying out any or all of the following: modular multiplication, constant C generation, exponentiation and the use of the Chinese Remainder Theorem (CRT) for calculating modular numbers and for efficient exponentiation.

I/O control unit 665, besides implementing the decoding and control function necessary to supply values such as A, B, N, $B_p$, $B_q$, $N_p$, $N_q$ and U to the registers set 658 through databus 670, provides two important functions in the case of modular exponentiation with CRT: The first important function is that it dynamically calculates the value of m or $m_p$ and $m_q$ and it also calculates the lengths of the exponents B or $B_p$ and $B_q$. Each value of the m's is a function of the length of a modulus (position of the leading 1) and is a key parameter used throughout the operations. The length of an exponent is simply used to determine when to stop the exponentiation process. The traditional solution is the use of a length detector that monitor the value of each bit in this large registers. This approach has disadvantages in terms of requiring more silicon area and also in terms of electrical loading on the output of the registers. The approach used in the I/O control logic is much less wasteful and is based on the detection of the leading '1' in the k bit word being written and the associated address. Every time a non-zero k bit word is written, a small piece of logic is used to calculate the location of the most significant '1' which is being written, based on the address of the word itself, and is compared with a value stored in a register that is the result of the loading of the previous k bit word. If the new value calculated is larger than the value stored in the register, the register is updated accordingly. The calculation of the m parameter follows a similar approach and thus saves the need for a lookup table and another large leading '1' detector. The second important function is that in preparation for performing modular exponentiation with the CRT, the values of $A_{1p}$, $A_{0p}$, $A_{1q}$, and $A_{0q}$, as described previously, are calculated and loaded into separate registers under control of I/O control unit 665.

Commands which externally govern the operation of engine 700 are also supplied via I/O control unit 665. Attention is now directed to a checking system and method which takes the fullest advantage of the modular multiplication circuits described above. In general, there are several ways to provide checking for the results of the hardware operations carried out by the system of the present invention. However, most of the standard approaches to checking are negatively impacted by size, economies of chip real estate and/or by the fact that the arithmetic operations carried out are modulo N operations. For example, result checking based on a straight forward duplication of hardware is very expensive in terms of "silicon real estate." Error checking for the various function blocks employed (multipliers, adders, controls, etc.) is also very expensive and complicated. Lastly, the use of residue arithmetic check sum methods is not directly applicable to checksums for the modular multiplication hardware that implements the $Z=f(A, B)=AB\ 2^{-mk}$ mod N function described above. For example, if Z', A', and B' are the check sums of Z, A, and B, respectively, then it is still unfortunately the case that Z' is not necessarily equal to f(A', B'). Accordingly, driven by the inappropriateness of standard approaches to hardware operation checking, there is provided herein a method and system which is closely tied to the architecture described above and which is particularly tied to the fact that the systems herein perform modulo N multiplication using X and Z phases of operation and employ a plurality of Processing Elements based on the notion of partitioning the operands involved into a plurality, m, of k bit words.

For an easier understanding of the checking method and system herein, one starts with an understanding of the process described above:

Process inputs: A, B, N (where N is, of course, odd)
    n=number of bits in the binary representation of N
    k=number of bits in a word (i.e., in each chunk processed by one of the Processing Elements.
    m=smallest integer for which mk$\geq$, n+2
    $N_0$=least significant k bits of N
    $R=2^k$
    $s=(-1/N_0)$ mod R $$A = \sum_{i=0}^{m-1} A_i R^i$$

Process output: $Z=f(A, B)=AB\ 2^{-mk}$ mod N

Process:
    Set $Z_0=0$
    For i=0 to m-1 do:
        X-phase:
            $X_1=Z_1+A$, B
            $Y_{i+l}=s\ x_{l,0}$ mod R (where $x_{1,0}$=least significant k bits of $X_l$)
        Z-phase:
            $Z_{i+l}=(Xl_1+Y_{i+l}N)/R$
    End for.

Based on the above algorithm, structure, and process, the following equations lie at the heart of the model employed herein for checking the operation of the modulo N multiplication circuits:

$$A = \sum_{i=0}^{m-1} A_i R^1$$

$$B = \sum_{i=0}^{m-1} B_i R^i$$

$$N = \sum_{i=0}^{m-1} N_i R^i$$

$$Z = \sum_{i=0}^{m-1} Z_i R^i$$

$$f(A, B) = (A\ B)/R^m + N\sum_{i=0}^{m-1} Y_i/R^{m-1} Z\ mod(R-1)$$

$$= \sum_{i=0}^{m-1} Z_i\ mod(R-1)$$

$$= AB + N\sum_{i=0}^{m-1} Y_i\ mod(R-1)$$

$$= \left[\left(\sum_{i=0}^{m-1} A_i\ mod(R-1)\right)\left(\sum_{i=0}^{m-1} B_i\ mod(R-1)\right) + \right.$$

$$= \left(\sum_{i=0}^{m-1} N_i\ mod(R-1)\right)\left(\sum_{i=0}^{m-1} N_i\ mod(R-1)\right)$$

$$= \left.\left(\sum_{i=0}^{m-1} Y_i\ mod(R-1)\right)\right]\ mod(R-1)$$

The hardware which calculates the function f(A, B) is therefore checkable through the use of the following relationship (referred to below as Equation (1)):

$$\sum_{i=0}^{m-1} Z_i \bmod (R-1) = \left[\left(\sum_{i=0}^{m-1} A_i \bmod (R-1)\right)\left(\sum_{i=0}^{m-1} B_i \bmod (R-1)\right) + \left(\sum_{i=0}^{m-1} N_i \bmod (R-1)\right)\left(\sum_{i=0}^{m-1} Y_i \bmod (R-1)\right)\right] \bmod (R-1) \quad (1)$$

Figure 24:
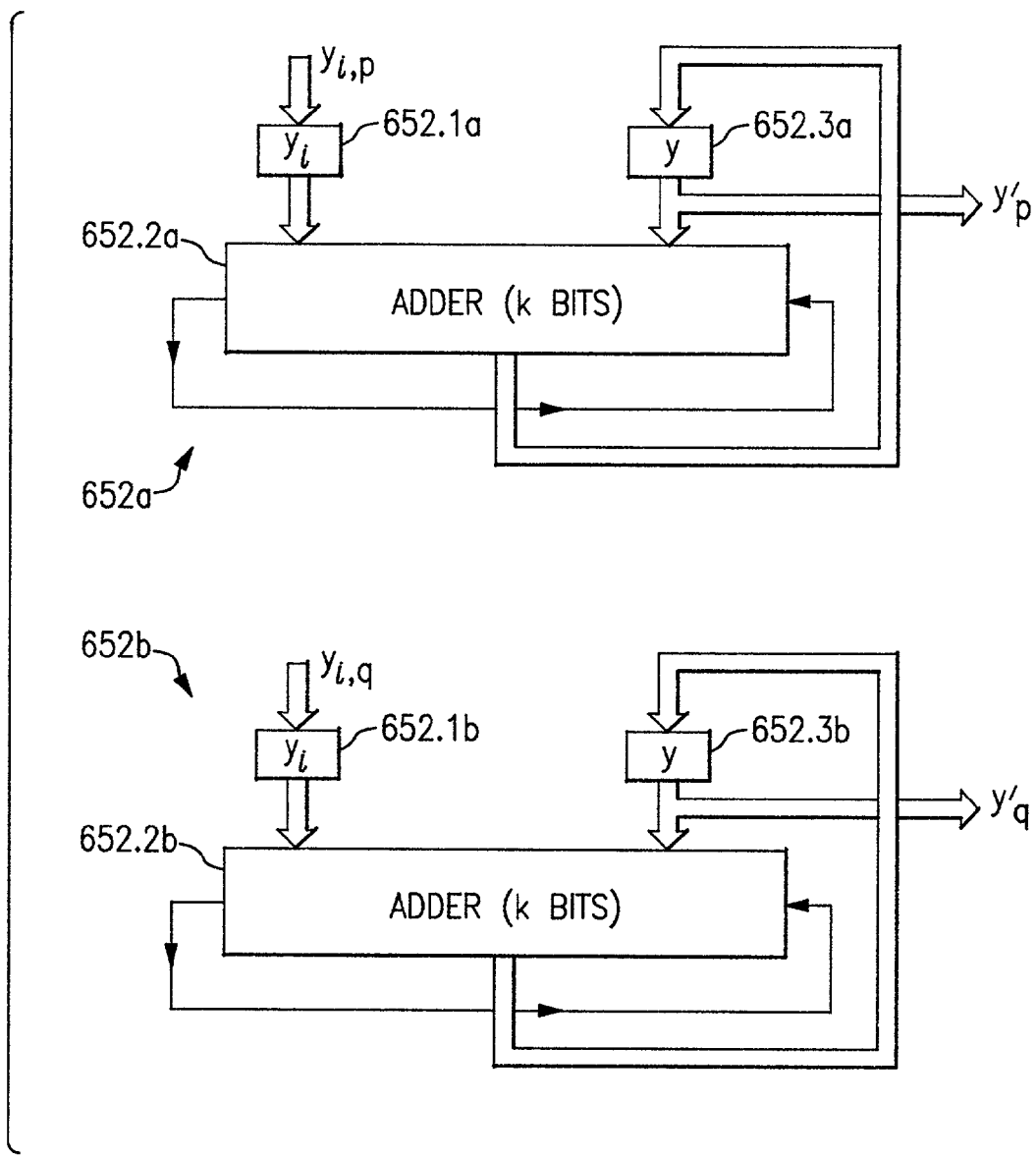
FIG. 24 is a block diagram illustrating generically applicable circuits for generating intermediate checksum values using modulo (R−1) addition.

The fortunate part of this checksum calculation is that it is computed on the fly. For example, the circuitry necessary for the calculation of $$\sum_{i=0}^{m-1} Y_i \bmod (R-1)$$

mod (R−1) is shown in FIG. 24. It is noted, however, that the circuit(s) shown in FIG. 24 are provided for the specific case of the use of the Chinese Remainder Theorem where $N_p$ and $N_q$ are known and the Processing Elements are split into two independent chains, one for calculating multiplication modulo $N_p$ and the other for calculating multiplication modulo $N_q$. In the case of modulo $N_p$ calculations, accumulating register Y (reference numeral 652.3a; not to be confused with the $y_l$ variable used above to describe the algorithm) is initially set to zero with its output being used as an input to adder 652.2a along with the input $y_{i,p}$ from the corresponding portion of register for the Processing Element partition which generates the $y_l$ values. The input from register 652.1a is added to the current $Y_p$ value to produce a running accumulation which is stored between cycles in register Y (reference numeral 652.3a). At the end of m cycles the contents of this register is the value $Y'_p =$ $$\sum_{i=0}^{m-1} Y_{i,p} \bmod (R-1).$$

mod (R−1). Likewise, the corresponding circuit shown in the lower portion of FIG. 24 operates in an identical fashion to compute $$Y'_q = \sum_{i=0}^{m-1} Y_{i,q} \bmod (R-1).$$

mod (R−1). In the case of both the $Y'_p$ the $Y'_q$ computations, adders 652.2$_a$ and 652.2$_b$ respectively are each k bit integer binary adders with carries out of the high order position being fed back as carry inputs to the low order positions. In this way addition modulo (R−1) is carried out.

Figure 25:
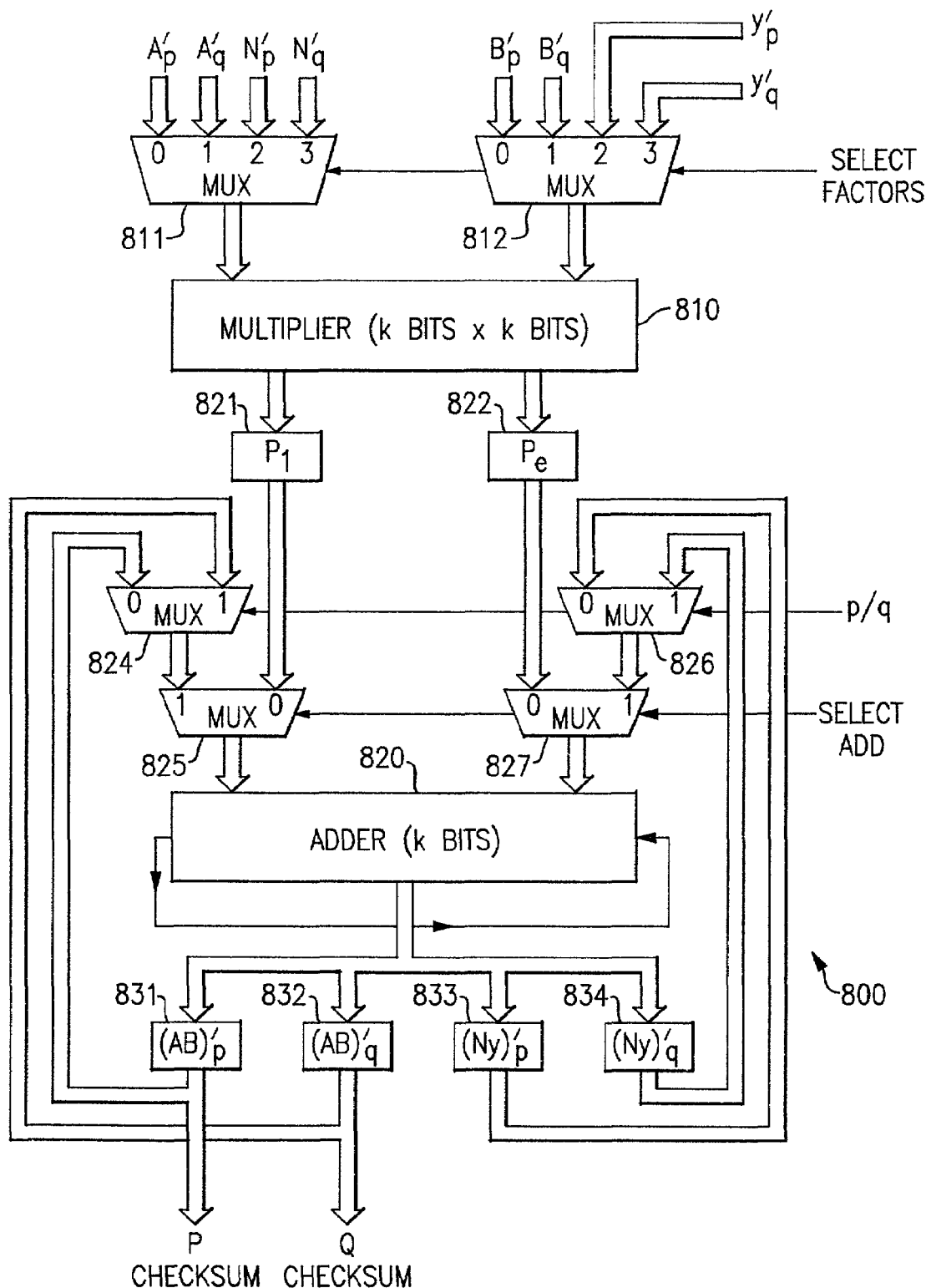
FIG. 25 is a block diagram illustrating circuits for performing checksum operations used in a final checksum comparison operation which provides error indications.

Thus, the circuits shown in FIG. 24 supply check sum values $Y'_p$ and $Y'_q$ to check sum predictor circuit 800 of FIG. 25. It is noted that circuits (not shown) very similar to those of FIG. 24 are likewise provided for the generation of checksum values $A'_p$ and $A'_q$ from accumulated sums (modulo (R−1)) of the values $A_{i,p}$ and $A_{i,q}$ respectively for i=0, 1, ..., m−1. Similarly, checksum values $B'_p$ and $B'_p$ are generated from similar circuits (also not shown). Similar circuits also generate the values $N'_p$ and $N'_q$ from the $N_{i,p}$ and $N_{i,q}$ values. Since these circuits are identical in structure and operation and differ only in the naming of the signal components, like the circuits mentioned just above they are also not shown herein.

The addition operation indicated in Equation (1) is carried out by adder 820 which performs addition modulo (R−1) and accordingly, like the other adders in the checksum system, includes a high order carry out signal output which is fed back as a low order carry input, as shown. Multiplexors 824, 825, 826, and 827 are operated under control of two signal lines. A first signal control line (p/q) controls multiplexors 824 and 826 to select between the two independent Processor Element chains for $N_p$ and $N_q$ processing. A second signal control line (Select Add) controls multiplexors 825 and 827 to effect the cumulative addition operation indicated by the summation from i=0 to (m−1) in Equation (1). In order to calculate the intermediate checksum values $A'_p$ $B'_p$ and $A'_q$ and $B'_q$ a final addition operation is performed which adds together the contents of the $P_0$ and $P_1$ registers (reference numerals 821 and 822, respectively) via operation of the Select Add control line. Adder 820 is also responsible for the final addition which generates (AB)$'_p$ and (AB)$'_q$ by adding together the previous checksum values, stored in registers 831 and 832, with the cumulative checksums (NY)$'_p$ and (NY)$'_q$. This results in the generation of the P Checksum and Q Checksum values from registers 831 and 832 respectively. These signal lines are supplied to main checksum generation block 670 (in FIG. 23). In particular, the P Checksum and Q Checksum signal lines are supplied to comparators 657a and 657b, respectively, as shown in FIG. 26.

Figure 26:
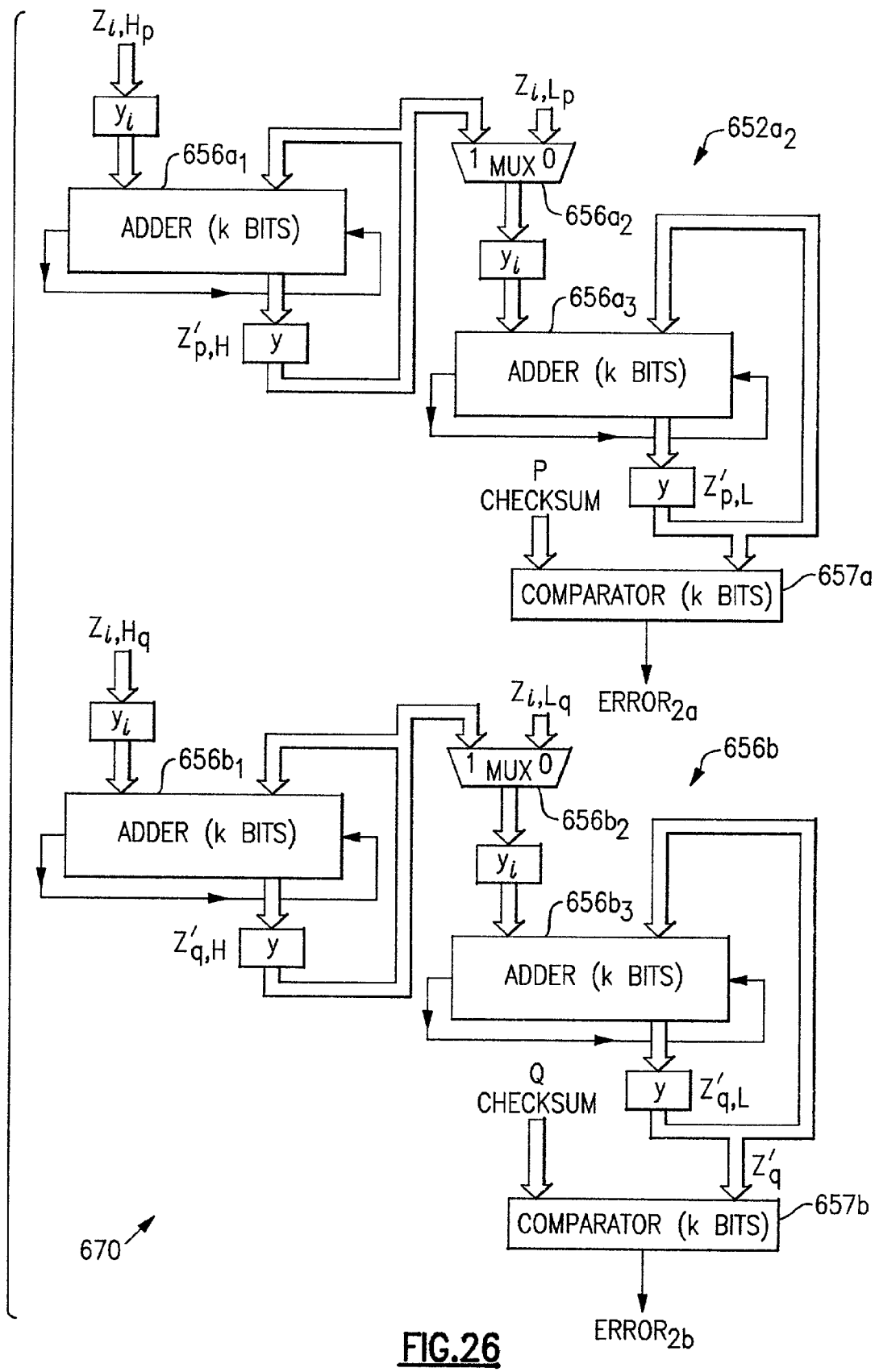
FIG. 26 is a block diagram illustrating circuits for generating checksum variables to be compared using, pairs of modulo (R−1) adders.

Accordingly, attention is now focused on the structure and operation of FIG. 26. The main function of block 670 is the calculation of the left hand side of equation (1). As above, this circuit has two parts devoted to split calculations based on $N_p$ and $N_q$ operations as when the Processor Elements in FIG. 7 are split by controlling a middle Processing Element so as to force it into operating in the PE$_0$ mode.

Each Processing Element chain (the $N_p$ chain or the $N_q$ chain) outputs results of the modular multiplication operation 2k bits at a time. Accordingly, the circuit for generating the checksum value Z' for the Z variable is implemented as two adders with k bits each. Additionally, because of the splitting, there are actually a total of four adders shown in FIG. 26. For the $N_p$ chain, for example, adder 656a, processes the high order bits output from the multiplication operation that produces each high order k bit output from the chain working on the modulo $N_p$ multiplication. After all of the 2k bit portions have been added together, multiplexor 656a$_2$ is operated to add together the sums in the high order register Z'$_{p,H}$ and the low order register Z'$_{p,L}$. This resulting sum is compared with the P Checksum value by comparator 657a to produce an error indication Error$_{2a}$, if there is no match. It is also noted that the adders in FIG. 26 all perform addition modulo (R−1) and include a carry feedback out of the high order position into the low order position. The bottom circuit shown in FIG. 26 is structured and operates in the same way as the upper circuits. However, as is clearly evident the bottom circuit is associated with and operates on signals generated during calculations modulo $N_q$ based on the splitting of the Processor Element chain as described. Accordingly, the lower circuit in FIG. 26 generates the Z'$_q$ checksum signal from the modulo $N_q$ calculations, which resultant value is compared in comparator 657b to generate error signal $\text{Error}_{2b}$, if there is no match. Thus, the output of block 670 is describable as: $\text{Error}_{2a}$ OR $\text{Error}_{2b}$. Thus, at the end of each modular multiplication operation, an error signal is available which functions to provide an indication that all hardware elements have worked as designed to produce the intended result.

Figure 23:
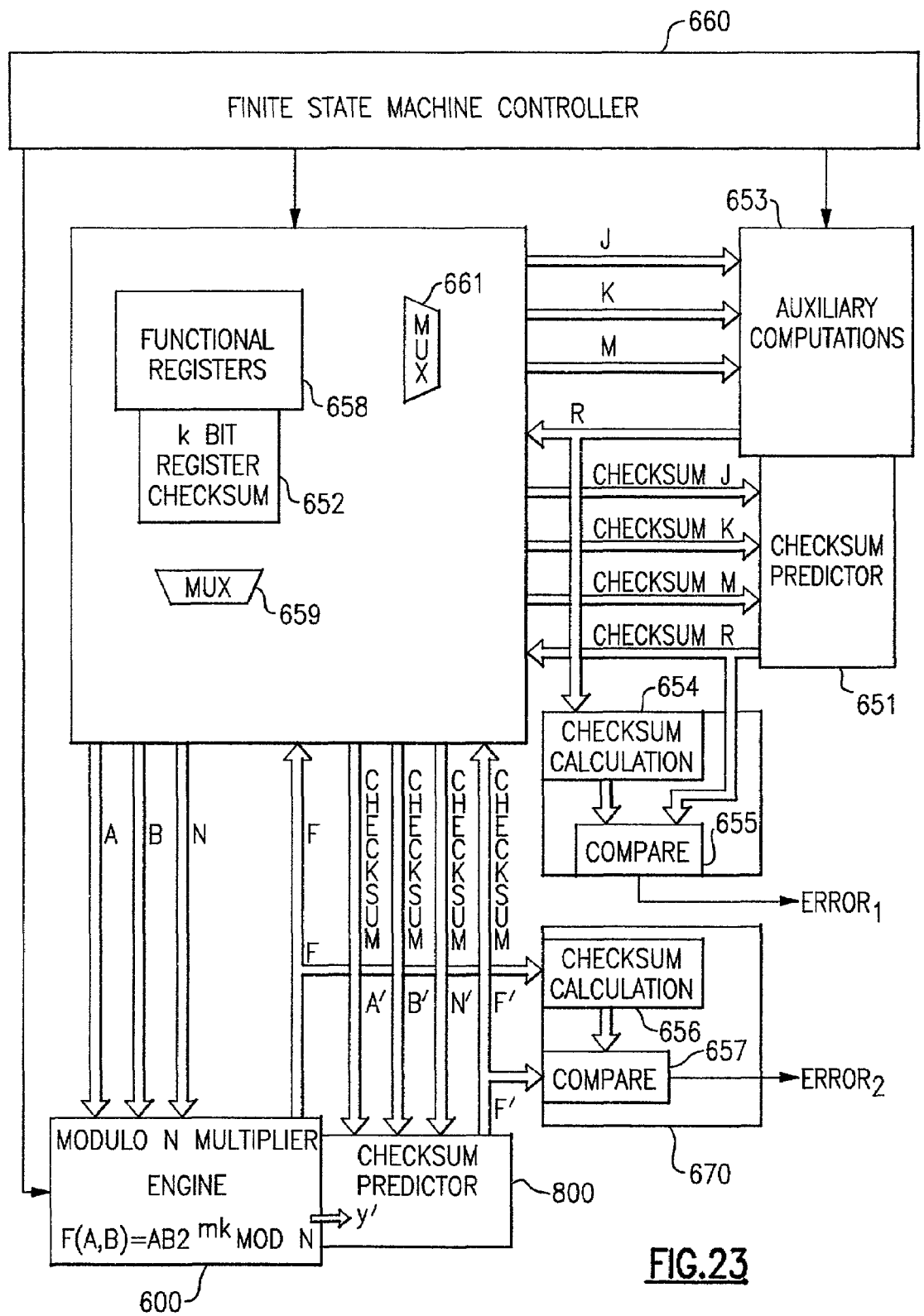
FIG. 23 is a block diagram illustrating the inclusion of a checksum mechanism consonant with a modulo N multiplication system.

Additionally, FIG. 23 also shows the inclusion of Auxiliary Computation circuit 653. This circuit is used to perform auxiliary operations such as Z=J+K, Z=J−K and Z=J mod N. Checksum operations for these calculations are optional but preferable. The calculations carried out by Auxiliary Computation circuit 653 are relatively simple in comparison with the modular multiplication features. Residue checking for these calculations are also relatively simple. For the addition operation Z=J+K, the checking mechanism is to make sure that the value of Z mod (R−1) is the same as the value of the modulo (R−1) sum of (J mod R−1) and (K mod R−1), where R is an even integer. Similarly, to check the operation of Z=J−K, one is to check if the value of Z mod (R−1) is the same as the value of the modulo (R−1) difference of (J mod R−1) and (K mod R−1). As for the operation of the modular reduction Z=J mod N that is implemented by a long division, Z is the remainder of J divided by N. One has the expression J= QN+Z, where Q is the quotient. The error checking for this modular reduction operation can be carried out by comparing the value of J mod (R−1) and the modulo sum of (Q mod (R−1))(N mod (R−1)) and (Z mod (R−1)).

While many of the concepts presented above have been couched in terms of what are seemingly purely mathematical algorithms, the applications involved are really directed to the encryption, transmission and decryption of messages in whatever form these messages may be represented, as long as they are in digital form, or its equivalent (octal, binary coded decimal or hexadecimal). In these methods for encryption, transmission and decryption, messages are represented by large integers expressed in binary form so that for purposes explaining the theory, operation and value of the methods and devices presented herein, the description is necessarily of a mathematical nature. Nonetheless, the devices and methods describes herein provide practical methods for ensuring secure communications. As such the devices and methods described herein represent practical implementations of mathematical concepts.

It is also noted that the operation of the circuits described herein are meant to occur over a repeated number of cycles. The description herein sets forth the ideal number of cycles generally required for proper operation in the most general situations. However, neither the specification nor claims should be interpreted as being limited to the most general cases. In particular, it is noted that suboptimal control methods can sometimes lead to operation of the circuits for more cycles than is absolutely necessary, either by accident or by design. The scope of the claims herein should not be so narrowly construed as to forego this inclusion. Likewise, for certain input situations, the full number of cycles normally required for the most general cases is not required. Accordingly, some of the claims herein recite the operation for at most t cycles. Clearly, for its intended use in encryption and decryption, the circuits herein have been designed to handle the most general cases. The claims, however, should not be construed to be so narrow as to exclude either the simpler cases or the cases of deliberate operation over more than the necessary number of cycles.

Accordingly, from the above, it is seen that all of the objectives indicated are achieved by the circuits and processes described herein. In particular, it is seen that there is provided a circuit and process for carrying out multiplication of relatively large numbers modulo N using either multiplier and adder arrays or a plurality of nearly identical processing elements. It is also seen that these same circuits can be used not only to implement modular exponentiation but can also be employed as part of hardware circuits for implementing solutions to problems based on the Chinese Remainder Theorem. It is even further noted that the objective of providing pipelined operations for a series of connected processing elements is achieved in a manner in which all of the processing elements are functioning at all times to produce desired final or intermediate results. And it is also seen that circuits are provided for carrying out functions which are ancillary to the processes described above and, in particular, circuits and processes for producing negative multiplicative inverses. While such inverses are providable in a data processing system via software or by means of prior (and perhaps separate) computation, the processes and circuits shown herein are capable of providing this function in a short period of time with relatively simple hardware which takes advantage of already existing circuit registers and other elements.

From the above, it is clear that the circuits shown in applicants' figures fulfill all of the objects indicated. Additionally, it is noted that the circuit is easy to construct and takes full advantage of the parallelism brought about by structuring one of the operands in the multiplication process as m blocks of k bits each. In particular, it is seen that the circuit shown herein carries out a two-phase operation, one of which computes $X_l$ and $y_l$, with the second phase computing a value for $Z_l$ which eventually, at the last step, becomes a desired result. In particular, it is seen that the circuit shown in applicants' figures provides a desired trade off between multipliers which have to be n bits by n bits in size and between serial circuits which operate with only one bit of a factor being considered at each step.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for calculating the multiplicative inverse of an odd binary number, A, modulo R, where R is a positive integer power of two, $2^k$, said method comprising the steps of:
   initializing a first storage element having k bits, for a variable S, to a binary 1;
   initializing a second storage element having k bits, for a variable Q, with the number A whose multiplicative inverse modulo R is to be determined;
   for sequential values of i running from 1 to k−1, carrying out the following operations:
   (a) shifting the contents of the second storage element right by one bit position;
   (b) determining the current rightmost bit in said second storage element; and
   (c) upon said rightmost bit position being determined to be a 1, increasing the value stored in said first storage element by $2^i$ and increasing the value stored in said second storage element by A.

2. A method for calculating the negative multiplicative inverse of an odd binary number, A, modulo R, where R is a positive integer power of two, $2^k$, said method comprising the steps of:
   initializing a first storage element having k bits, for a variable S, to a value of $2^{k-1}$;

initializing a second storage element having k bits, for a variable Q, with the number A whose negative multiplicative inverse modulo R is to be determined;

for sequential values of i running from 1 to k−1, carrying out the following operations:
  (a) shifting the contents of the second storage element right by one bit position;
  (b) determining the current rightmost bit in said second storage element; and
  (c) upon said rightmost bit position being determined to be a 1, decreasing the value stored in said first storage element by $2^i$ and increasing the value stored in said second storage element by A.

3. A circuit for determining the negative multiplicative inverse of an odd binary number A, modulo R, where R is a positive power of two, $2^k$, said circuit comprising:
  a first k bit register, for storing a variable S;
  a second k bit register, for storing a variable Q;
  a third k bit register, for storing said number A;
  a counter capable of counting from 1 to k−1;
  a decoder receiving count output from said counter;
  means for setting bits from said decoder into said first register upon the condition that the next to rightmost bit in said second register is a one;
  an adder having as a first input the leftmost k−1 bits of said second register, and a second input from said third register said second input being conditioned on the next to rightmost bit in said second register, with the output of said adder being supplied to said second register; and
  a multiplexor, having k bits, whose output is supplied as input to said second register and whose inputs are selected from output of said adder upon the condition that said counter is greater than 1 and said third register upon the condition that said counter is equal to 1.

* * * * *